United States Patent

Okada

[11] Patent Number: 6,003,371
[45] Date of Patent: *Dec. 21, 1999

[54] ANGULAR VELOCITY SENSOR

[75] Inventor: Kazuhiro Okada, Ageo, Japan

[73] Assignee: Wacoh Corporation, Saitama, Japan

[*] Notice: This patent is subject to a terminal disclaimer.

[21] Appl. No.: 08/822,538

[22] Filed: Mar. 19, 1997

Related U.S. Application Data

[62] Division of application No. 08/601,794, Feb. 15, 1996, Pat. No. 5,668,318.

[30] Foreign Application Priority Data

Feb. 21, 1995 [JP] Japan .................................. 7-056690

[51] Int. Cl.$^6$ .................................................. G01P 9/00
[52] U.S. Cl. ................................................ 73/504.02
[58] Field of Search ......................... 73/504.11, 862.042, 73/862.043, 504.02, 504.03, 504.04, 504.13

[56] References Cited

U.S. PATENT DOCUMENTS

| | | | |
|---|---|---|---|
| 3,323,377 | 6/1967 | Frasier | 73/348 |
| 3,375,722 | 4/1968 | Riordan | 73/504.03 |
| 3,486,383 | 12/1969 | Riordan | 73/504.09 |
| 4,431,935 | 2/1984 | Rider | 73/504.11 |
| 4,445,376 | 5/1984 | Merhav | 73/564.03 |
| 4,590,801 | 5/1986 | Merhav | 73/510 |
| 4,870,588 | 9/1989 | Merhav | 73/504.08 |
| 4,905,523 | 3/1990 | Okada | 73/862.04 |
| 4,967,605 | 11/1990 | Okada | 73/862.04 |
| 4,969,366 | 11/1990 | Okada | 73/862.08 |
| 5,014,415 | 5/1991 | Okada | 29/621.1 |
| 5,035,148 | 7/1991 | Okada | 73/862.04 |
| 5,092,645 | 3/1992 | Okada | 294/86.4 |
| 5,182,515 | 1/1993 | Okada | 324/259 |
| 5,263,375 | 11/1993 | Okada | 73/862.042 |
| 5,295,386 | 3/1994 | Okada | 73/1 D |
| 5,343,765 | 9/1994 | Okada | 73/862.043 |
| 5,365,799 | 11/1994 | Okada | 73/862.041 |
| 5,392,658 | 2/1995 | Okada | 73/862.093 |
| 5,406,848 | 4/1995 | Okada | 73/517 R |
| 5,421,213 | 6/1995 | Okada | 73/862.043 |
| 5,437,196 | 8/1995 | Okada | 73/862.043 |
| 5,492,020 | 2/1996 | Okada | 73/862.626 |
| 5,493,909 | 2/1996 | Araki | 73/504.08 |
| 5,497,668 | 3/1996 | Okada | 73/862.626 |
| 5,531,002 | 7/1996 | Okada | 29/25.41 |
| 5,531,092 | 7/1996 | Okada | 73/1 D |
| 5,571,972 | 11/1996 | Okada | 73/862.043 |
| 5,639,973 | 6/1997 | Okada | 73/862.043 |
| 5,646,346 | 7/1997 | Okada | 73/504.04 |
| 5,668,318 | 9/1997 | Okada | 73/504.11 |
| 5,682,000 | 10/1997 | Okada | 73/862.043 |
| 5,744,718 | 4/1998 | Okada | 73/514.33 |

*Primary Examiner*—Hezron Williams
*Assistant Examiner*—Richard A. Moller
*Attorney, Agent, or Firm*—Ladas & Parry

[57] ABSTRACT

An angular velocity sensor for detecting angular velocity components about three axes with high response is provided. A weight body carries out a circular movement along a circular orbit within the XY-plane with the origin being as a center. The weight body is supported so that it can be moved with a predetermined degree of freedom within a sensor casing. A Coriolis force Fco exerted in the Z-axis direction to the weight body is detected when the weight body passes through the X-axis at the point Px and an angular velocity ωx about the X-axis is obtained based on the detected force. Further, a Coriolis force Fco exerted in the Z-axis direction to the weight body is detected when the weight body passes through the Y-axis at the point Py and an angular velocity ωy about the Y-axis is obtained based on the detected force. In addition, a force exerted in the X-axis direction to the weight body at the point Px is detected and an angular velocity ωz about the Z-axis is obtained based on the detected force by eliminating a centrifugal force.

7 Claims, 26 Drawing Sheets

FIRST DETECTION PRINCIPLE

SECOND DETECTION PRINCIPLE

FIRST DETECTION PRINCIPLE

SECOND DETECTION PRINCIPLE

ANGULAR VELOCITY SENSOR

CROSS-RELATED APPLICATION

This application is a division of application Ser. No. 08/601,794 filed Feb. 15, 1996 and now issued as U.S. Pat. No. 5,668,318.

BACKGROUND OF THE INVENTION

This invention relates to an angular velocity sensor, and more particularly to a sensor capable of detecting multi-dimensional angular velocity components every respective axes.

In the automobile industry, machinery industry, and the like, there has been an increased demand for sensors capable of precisely detecting physical action such as acceleration or angular velocity. In general, an acceleration in an arbitrary direction and an angular velocity in an arbitrary rotational direction are applied to an object which carries out free movement in a three-dimensional space. For this reason, in order to precisely grasp movement of the object, it is necessary to independently detect acceleration components every respective coordinate axis directions and angular velocity components about respective coordinate axes in the XYZ three-dimensional coordinate system, respectively. Therefore, there has been an increased demand for multi-dimensional acceleration sensors or multi-axial angular velocity sensors which are compact and has high accuracy, and which can suppress the manufacturing cost.

Hitherto, multi-dimensional acceleration sensors of various types have been proposed. For example, in the International Publication No. WO88/08522 based on the Patent Cooperation Treaty (U.S. Pat. No. 4,967,605 and U.S. Pat. No. 5,182,515), the International Publication No. WO91/10118 based on the Patent Cooperation Treaty (U.S. patent application Ser. No. 07/761,771), the International Publication No. WO92/17759 based on the Patent Cooperation Treaty (U.S. patent application Ser. No. 07/952,753), and the like, there are disclosed acceleration sensors in which applied acceleration components are detected every respective coordinate axes directions. The feature of these acceleration sensors is that a plurality of resistance elements, electrostatic capacitance elements or piezoelectric elements are arranged at predetermined positions of a substrate having flexibility to detect applied acceleration components on the basis of changes in resistance values of the resistance elements, changes in capacitance values of the electrostatic capacitance elements or changes in voltages produced by the piezoelectric elements. A weight body is attached on the substrate having flexibility. When an acceleration is applied, a force is generated at the weight body so that bending occurs in the flexible substrate. By detecting this bending on the basis of the above-described changes in resistance values, capacitance values or voltage values, it is possible to obtain values of acceleration components in respective axial directions.

On the contrary, the description of the multi-axial angular velocity sensors can be hardly found in the literatures up to now, and such angular velocity sensors have not been put into practical use. Ordinarily, angular velocity sensors are utilized for detecting an angular velocity of a power shaft, etc. of a vehicle, and only have a function to detect an angular velocity about a specific single axis. In such cases of determining a rotational velocity of the power shaft, it is sufficient to use an one-dimensional angular velocity sensor. However, in order to detect angular velocity with respect to an object which carries out free movement in a three-dimensional space, it is necessary to independently detect angular velocity components about respective axes of the X-axis, the Y-axis and the Z-axis in the XYZ three-dimensional coordinate system. In order to detect angular velocity components about respective axes of the X-axis, the Y-axis and the Z-axis by using the one-dimensional angular velocity sensor conventionally utilized, it is necessary that three sets of such one-dimensional angular velocity sensors as described above are prepared to attach them in such specific directions to permit detection of angular velocity components about respective axes. For this reason, the structure as the entirety of the sensor becomes complicated, and the cost also becomes high.

Under these circumstances, the inventor of the present application has proposed a novel multi-axial angular velocity sensor which is compact and has high accuracy, and which can suppress the manufacturing cost. This novel sensor has been disclosed in the International Publication No. WO94/23272 based on the Patent Cooperation Treaty. Moreover, the inventor of the present application has disclosed several improved sensors thereof in the Japanese Patent Application No. 191081/1994, the Japanese Patent Application No. 225894/1994 and the Japanese Patent Application No. 258909/1994. In accordance with these novel sensors, it is possible to detect three-dimensional angular velocity components about respective axes. This utilizes the principle that when an object is oscillated in the Z-axis direction in the state where angular velocity $\omega x$ about the X-axis direction is applied, Coriolis force is applied in the Y-axis direction. For example, an a.c. voltage is applied to a particular piezoelectric element disposed on a flexible substrate to oscillate a weight body attached on the flexible substrate in the Z-axis direction. When the angular velocity $\omega x$ about the X-axis is applied, Coriolis force is exerted on the weight body in the Y-axis direction. Accordingly, the weight body is caused to undergo displacement in the Y-axis direction. When this displacement is detected by charges produced by another piezoelectric element, the applied angular velocity $\omega x$ can be indirectly detected.

In the above-described multi-axial angular velocity sensor, it is relatively easy to carry out angular velocity detection about two axes. For example, if Coriolis force applied in the Y-axis direction can be detected in the state where the weight body is oscillated in the Z-axis direction, it is possible to obtain an angular velocity $\omega x$ about the X-axis. In contrast, if Coriolis force applied in the X-axis direction can be detected, it is possible to obtain an angular velocity $\omega y$ about the Y-axis. Namely, under the state where the weight body is oscillated in the same Z-axis direction, it becomes possible to obtain both the angular velocity $\omega x$ about the X-axis and the angular velocity $\omega y$ about the Y-axis. However, under the state where the weight body is oscillated in the Z-axis direction, it is impossible to obtain an angular velocity $\omega z$ about the Z-axis. In order to obtain the angular velocity $\omega z$ about the Z-axis, it is necessary to make a change to allow the weight body to be oscillated in the X-axis or Y-axis direction.

However, in order to change the oscillating direction of a weight body, which has a mass to some degree, from a first direction to a second direction perpendicular to the first direction, it is necessary to once stop the oscillation of the weight body thereafter to start to oscillate it in the second direction. Ordinarily, in order to stop the oscillating object, it takes time to some extent. In addition, in order to oscillate the object in a different direction to allow it to be brought into the stable oscillating state, it also takes a time to some extent. For this reason, in the case where detection of angular velocity about three axes is carried out, there was the problem that the response is lowered.

SUMMARY OF THE INVENTION

With the above in view, an object of this invention is to provide an angular velocity sensor which can detect, with good response, angular velocity components with respect to plural different axes.

(1) The first mode of this invention is directed to an angular velocity sensor comprising:

a weight body having mass;

a sensor casing for accommodating the weight body therewithin;

supporting means for supporting the weight body so that it can be moved with a predetermined degree of freedom with respect to the sensor casing;

driving means for allowing the weight body to carry out an orbital movement along a predetermined orbit within a range of the predetermined degree of freedom;

detecting means for detecting a Coriolis force applied to the weight body in a first axial direction perpendicular to a tangential direction of the orbital movement; and operation means for obtaining an angular velocity about a second axis perpendicular to both the tangential direction and the first axial direction on the basis of a tangential velocity of the weight body along the orbit and the detected Coriolis force.

(2) The second mode of this invention is directed to an angular velocity sensor according to the first mode:

wherein the weight body carries out a circular movement within a predetermined plane wherein the first axis is located in a direction perpendicular to the plane and the second axis is located in a radial direction of the circular movement;

wherein a component in the first axis direction of a force applied to the weight body is detected as a Coriolis force; and wherein an angular velocity about the second axis is obtained on the basis of a tangential velocity of the weight body and the Coriolis force.

(3) The third mode of this invention is directed to an angular velocity sensor according to the first mode:

wherein the weight body carries out a circular movement within a predetermined plane;

wherein the first axis is located in a radial direction of the circular movement and the second axis is located in a direction perpendicular to the plane;

wherein a Coriolis force is detected by eliminating a centrifugal force component based on the circular movement from a component in the first axial direction of a force applied to the weight body; and wherein an angular velocity about the second axis is obtained on the basis of a tangential velocity of the weight body and the Coriolis force.

(4) The fourth mode of this invention is directed to an angular velocity sensor according to the first mode:

wherein the weight body carries out a circular movement within an XY-plane of an XYZ three-dimensional coordinate system having an X-axis, a Y-axis and a Z-axis; and wherein a Coriolis force is detected when the weight body passes through the X-axis and the Y-axis respectively thus to obtain angular velocity components at least about two axes in the XYZ three-dimensional system.

(5) The fifth mode of this invention is directed to an angular velocity sensor according to the fourth mode:

wherein a component in the Z-axis direction of a force applied to the weight body is detected as a Coriolis force when the weight body passes through the X-axis with a predetermined instantaneous velocity along the Y-axis direction and an angular velocity component about the X-axis is obtained on the basis of the instantaneous velocity and the detected Coriolis force;

wherein a component in the Z-axis direction of a force applied to the weight body is detected as a Coriolis force when the weight body passes through the Y-axis with a predetermined instantaneous velocity along the X-axis direction and an angular velocity component about the Y-axis is obtained on the basis of the instantaneous velocity and the detected Coriolis force; and wherein a component in the X-axis direction of a force applied to the weight body is detected when the weight body passes through the X-axis with a predetermined instantaneous velocity along the Y-axis direction, a Coriolis force is detected by eliminating a centrifugal force component based on the circular movement from the detected component of force and an angular velocity component about the Z-axis is obtained on the basis of the instantaneous velocity and the detected Coriolis force;

thus to obtain angular velocity components about three axes of the X-axis, the Y-axis and the Z-axis.

(6) The sixth mode of this invention is directed to an angular velocity sensor according to the first to the fifth mode:

wherein an XYZ three-dimensional coordinate system having an X-axis, a Y-axis and a Z-axis is defined so that the weight body is positioned at an origin of the coordinate system;

wherein the driving means comprises a first force generator for applying a force to the weight body in a positive direction of the X-axis, a second force generator for applying a force to the weight body in a positive direction of the Y-axis, a third force generator for applying a force to the weight body in a negative direction of the X-axis, and a fourth generator for applying a force to the weight body in a negative direction of the Y-axis; and wherein the first to fourth force generators are periodically operated so that the weight body carries out an orbital movement within an XY-plane.

(7) The seventh mode of this invention is directed to an angular velocity sensor according to the first to the fifth mode:

wherein the supporting means comprises a flexible substrate having flexibility, a peripheral portion of the flexible substrate being fixed to the sensor casing and the weight body being fixed at a central portion of the flexible substrate, wherein the driving means comprises a plurality of force generators for applying a force in a predetermined direction at a predetermined portion of the flexible substrate, the force generators being disposed on the flexible substrate; and wherein the detecting means comprises a plurality of displacement detectors for detecting a displacement in a predetermined direction of a predetermined portion of the flexible substrate, the detecting means being disposed on the flexible substrate.

(8) The eighth mode of this invention is directed to an angular velocity sensor according to the seventh mode:

wherein the flexible substrate comprises an annular groove located between the peripheral portion and the central portion on a surface of the flexible substrate so that a flexible portion with a thin thickness is formed in order to provide a structure such that the central portion produces displacement with respect to the peripheral portion by bending of the flexible portion.

(9) The ninth mode of this invention is directed to an angular velocity sensor according to the seventh or eighth mode:

wherein an XYZ three-dimensional coordinate system having an X-axis, a Y-axis and a Z-axis is defined so that a surface of the flexible substrate is in parallel to an XY-plane;

wherein four force generators are provided for applying a force in a direction along the Z-axis, the four force generators being located in positive and negative areas of the X-axis and positive and negative areas of the Y-axis, respectively; and wherein the four force generators are periodically operated so that the weight body carries out an orbital movement within the XY-plane.

(10) The tenth mode of this invention is directed to an angular velocity sensor according to the seventh or eighth mode:

wherein an XYZ three-dimensional coordinate system having an X-axis, a Y-axis and a Z-axis is defined so that a surface of the flexible substrate is in parallel to an XY-plane;

wherein three force generators are provided for applying a force in a direction along the Z-axis, the three force generators being located in positive and negative areas of the X-axis and an area in a vicinity of an origin of the coordinate system, respectively; and wherein the three force generators are periodically operated so that the weight body carries out an orbital movement within an XZ-plane.

(11) The eleventh mode of this invention is directed to an angular velocity sensor according to the seventh or eighth mode:

wherein an XYZ three-dimensional coordinate system having an X-axis, a Y-axis and a Z-axis is defined so that a surface of the flexible substrate is in parallel to an XY-plane;

wherein first two force generators are provided for applying a force in a direction along the X-axis, the first two force generators being located in positive and negative areas of the X-axis, respectively;

wherein second two force generators are provided for applying a force in a direction along the Y-axis, the second two force generators being located in positive and negative areas of the Y-axis, respectively; and wherein the first two force generators and the second two force generators are periodically operated so that the weight body carries out an orbital movement within the XY-plane.

(12) The twelfth mode of this invention is directed to an angular velocity sensor according to the seventh or eighth mode:

wherein an XYZ three-dimensional coordinate system having an X-axis, a Y-axis and a Z-axis is defined so that a surface of the flexible substrate is in parallel to an XY-plane and an inside area in the vicinity of an origin and an outside area therearound are defined on the flexible substrate, respectively;

wherein four force generators are provided for applying a force in a direction along the X-axis, the four force generators being located in the inside area and the outside area of a positive area of the X-axis and the inside area and the outside area of a negative area of the X-axis, respectively; and wherein the four force generators are periodically operated so that the weight body carries out an orbital movement within the XZ-plane.

(13) The thirteenth mode of this invention is directed to an angular velocity sensor according to the seventh or eighth mode:

wherein an XYZ three-dimensional coordinate system having an X-axis, a Y-axis and a Z-axis is defined so that a surface of the flexible substrate is in parallel to an XY-plane;

wherein four displacement detectors are provided for detecting a displacement in a direction along the Z-axis, the four displacement detectors being located in positive and negative areas of the X-axis and positive and negative areas of the Y-axis, respectively; and wherein a Coriolis force applied in the X-axis direction of the weight body is detected by using the displacement detectors disposed in both the positive and negative areas of the X-axis and a Coriolis force applied in the Y-axis direction of the weight body is detected by using the displacement detectors disposed in both the positive and negative areas of the Y-axis.

(14) The fourteenth mode of this invention is directed to an angular velocity sensor according to the seventh or eighth mode:

wherein an XYZ three-dimensional coordinate system having an X-axis, a Y-axis and a Z-axis is defined so that a surface of the flexible substrate is in parallel to an XY-plane;

wherein first two displacement detectors are provided for detecting a displacement in a direction along the X-axis, the first two displacement detectors being located in positive and negative areas of the X-axis, respectively;

wherein second two displacement detectors are provided for detecting a displacement in a direction along the Y-axis, the second two displacement detectors being located in positive and negative areas of the Y-axis, respectively; and wherein a Coriolis force applied in the X-axis direction of the weight body is detected by using the first two displacement detectors and a Coriolis force applied in the Y-axis direction of the weight body is detected by using the second two displacement detectors.

(15) The fifteenth mode of this invention is directed to an angular velocity sensor according to the seventh or eighth mode:

wherein the force generator and the displacement detector comprise a capacitance element comprising a pair of electrodes of a first electrode fixed on the flexible substrate and a second electrode fixed on a fixed substrate which is fixed to the sensor casing and located so as to opposite to the flexible substrate.

(16) The sixteenth mode of this invention is directed to an angular velocity sensor according to the seventh or eighth mode:

wherein the force generator and the displacement detector comprise a first electrode fixed on the flexible substrate, a piezoelectric element fixed to the first electrode so that bending of the flexible substrate is transmitted and a second electrode fixed to the piezoelectric element at a position opposite to the first electrode.

(17) The seventeenth mode of this invention is directed to an angular velocity sensor according to the seventh or eighth mode:

wherein the force generator and the displacement detector comprise a first electrode, a second electrode and a piezoelectric element provided between the first and second electrodes, the first electrode being fixed on the flexible substrate and the second electrode being fixed on a fixed substrate which is fixed to the sensor casing and located so as to opposite to the flexible substrate.

(18) The eighteenth mode of this invention is directed to an angular velocity sensor according to the seventh or eighth mode:

wherein a double functional element having a function as a force generator and a function as a displacement detector is prepared and the driving means and the detecting means are constituted by the double functional element.

(19) The nineteenth mode of this invention is directed to an angular velocity sensor according to the first to the fifth mode:

wherein the supporting means comprises a fixed substrate fixed to the sensor casing and a piezoelectric element fixed on a lower part of the fixed substrate;

wherein the weight body is fixed at a lower part of the piezoelectric element;

wherein driving means comprises means for delivering charges to a predetermined position of the piezoelectric element; and wherein the detecting means comprises means for measuring charges produced at a predetermined position of the piezoelectric element.

In accordance with the angular velocity sensors conventionally used, an approach was employed to detect, under the state where the weight body is oscillated (subjected to reciprocating movement) in a first direction, a Coriolis force applied in a second direction to thereby obtain an angular velocity about a third axis. For this reason, in order to obtain angular velocity components about different axes, it was necessary to vary the oscillating direction or the detecting direction of the Coriolis force.

The fundamental idea of this invention resides in that the weight body is caused to undergo orbital movement in place of oscillating it. If an object which carries out an orbital movement is grasped moment by moment, it has velocity components in a tangential direction of the orbital movement. Accordingly, if it is possible to detect a Coriolis force applied to the weight body with respect to the first axis direction perpendicular to the tangential direction at the moment, it is possible to obtain, by operation (calculation), an angular velocity component about the second axis perpendicular to both the tangential direction and the first axis direction.

An oscillating movement is a reciprocating movement along one axis at all times where a direction of a velocity component of the movement is that along the one axis at all times. On the contrary, a direction of a velocity component of an orbital movement is caused to be along a tangential line (tangent) of the orbital movement locus, and varies moment by moment. For this reason, if detecting time point of a Coriolis force is suitably set, angular velocity detections with respect to wide variety of directions can be made.

While the weight body may be caused to carry out any orbital movement from a theoretical point of view, it is preferable from a view point of practical use to allow the weight body to carry out a circular movement as a representative orbital movement. The circular movement can be realized by relatively simple mechanism, and thus becomes very stable movement. In addition, since a direction (tangential direction) of a velocity component is regularly changed, detecting processing of a Coriolis force also becomes simple. Particularly, if an approach is employed to allow the weight body to carry out a circular movement within the XY-plane of the XYZ three-dimensional coordinate system and to detect a Coriolis force when the weight body passes through the X-axis and the Y-axis, it becomes possible to obtain, by simple operation (calculation), angular velocity components about respective axes in the XYZ three-dimensional coordinate system.

In order to allow the weight body to carry out an orbital movement, the weight body is movably supported with a predetermined degree of freedom within a sensor casing. Particularly, if a flexible substrate of which peripheral portion is fixed at the casing is used as supporting means and the weight body is fixed at the central portion of the flexible substrate, it is possible to easily carry out an orbital movement within the plane of the flexible substrate or within the plane perpendicular thereto.

Namely, supposing that a plurality of force generators for applying a force in a predetermined direction to a predetermined portion of the flexible substrate are disposed on the flexible substrate to operate these force generators alternately or in succession, the weight body is permitted to carry out an orbital movement. Moreover, with respect to detection of a Coriolis force, supposing that a plurality of displacement detectors for detecting a displacement in a predetermined direction of a predetermined portion of the flexible substrate are disposed on the flexible substrate, detection of a Coriolis force applied in the predetermined direction can be made. It should be noted that while in the case where a centrifugal force by the orbital movement is applied, it is necessary to eliminate a force based on the centrifugal force to detect a genuine Coriolis force. When the weight body is caused to carry out a constant orbital movement in advance, the applied centrifugal force takes a known value so that detection of the genuine Coriolis force is facilitated.

A force generator or a displacement detector may be constituted with a capacitance element or a piezoelectric element. For example, a capacitance element comprised of a pair of electrodes can be utilized as a force generator which generates Coulomb's force by applying a predetermined voltage across both the electrodes. Moreover, if the distance between both the electrodes is varied by displacement of one electrode, the electrostatic capacitance of the capacitance element is varied. Thus, such a change can be electrically detected as well. Accordingly, this capacitance element may be also utilized as a displacement detector. Similarly, a piezoelectric element can be utilized as a force generator for generating a stress in a predetermined direction by delivering a predetermined quantity of charges thereto. In addition, when stress is applied to the piezoelectric element by displacement, charges are produced in the piezoelectric element. Accordingly, such charges are electrically detected, thereby making it possible to use such piezoelectric element as a displacement detector.

DESCRIPTION OF THE PREFERRED EMBODIMENTS

This invention will now be described below in accordance with the embodiments shown.

§1 Detection Principle of Angular Velocity

Figure 1:
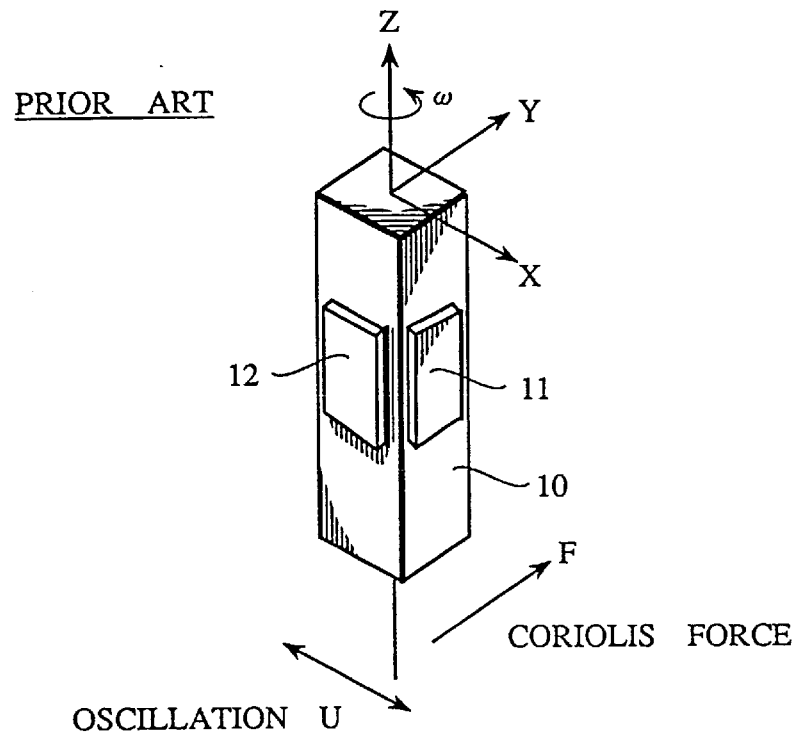
FIG. 1 is a perspective view showing the fundamental principle of a conventionally proposed uniaxial angular velocity sensor utilizing Coriolis force.

Initially, a detection principle of an angular velocity by a uniaxial angular velocity sensor which forms the foundation of a multi-axial angular velocity sensor according to this invention will be briefly described. FIG. 1 is a view showing a fundamental principle of an angular velocity sensor disclosed in Japanese Magazine "THE INVENTION" complied under the supervision of the Japanese Patent Office, vol. 90, No. 3 (1993), page 60. An oscillator 10 in a square pillar form is prepared and consideration is now made in connection with an XYZ three-dimensional coordinate system in which X-, Y- and Z-axes are defined in directions as shown. In such a system, in the case where the oscillator 10 is carrying out rotational movement at an angular velocity ω with the Z-axis being as the axis of rotation, it is known that a phenomenon as described below takes place.

Namely, when the oscillator 10 is caused to produce such an oscillation U to reciprocate it in the X-axis direction, a Coriolis force F takes place in the Y-axis direction. In other words, when the oscillator 10 is rotated with the Z-axis being as a center axis in the state where it is oscillated along the X-axis of the figure, a Coriolis force F is produced in the Y-axis direction. This phenomenon is a dynamical phenomenon known for long as Foucault's pendulum. A Coriolis force F produced is expressed as follows:

$$F = 2m \cdot v \cdot \omega$$

In the above expression, m is mass of the oscillator 10, v is an instantaneous velocity with respect to oscillation of the oscillator 10, and ω is an instantaneous angular velocity of the oscillator 10.

The uniaxial angular velocity sensor disclosed in the previously described magazine serves to detect an angular velocity ω by making use of the above phenomenon. Namely, as shown in FIG. 1, a first piezoelectric element 11 is attached on a first surface of the oscillator 10 in square pillar form, and a second piezoelectric element 12 is attached on a second surface perpendicular to the first surface. As piezoelectric elements 11, 12, an element in a plate form comprised of piezoelectric ceramic is used. In order to allow the oscillator 10 to produce oscillation U, the piezoelectric element 11 is utilized. Further, in order to detect a Coriolis force F produced, the piezoelectric element 12 is utilized. Namely, when an a.c. voltage is applied to the piezoelectric element 11, this piezoelectric element 11 repeats expansive and contractive movements and oscillates in the X-axis direction. This oscillation U is transmitted to the oscillator 10, so the oscillator 10 oscillates in the X-axis direction. As stated above, when the oscillator 10 itself rotates at an angular velocity ω with the Z-axis being as a center axis in the state where the oscillator 10 is caused to undergo oscillation U, a Coriolis force F is produced in the Y-axis direction by the above-described phenomenon. Since this Coriolis force F is exerted in a thickness direction of the piezoelectric element 12, a voltage V proportional to the Coriolis force F is produced across both the surfaces of the piezoelectric element 12. Accordingly, by measuring this voltage V, it becomes possible to detect an angular velocity ω.

Figure 2:
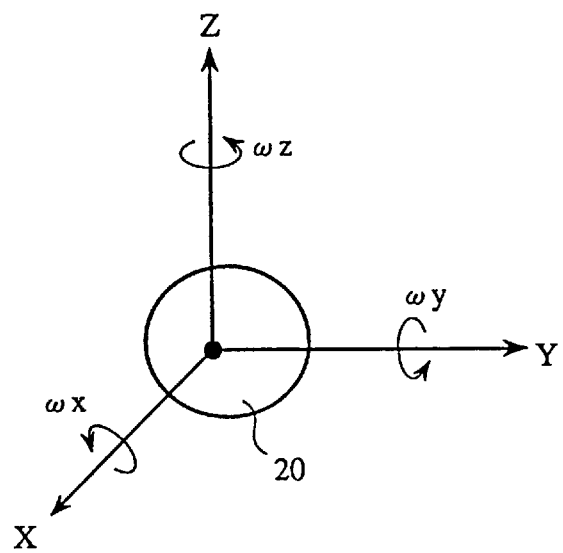
FIG. 2 is a view showing angular velocity components about respective axes in the XYZ three-dimensional coordinate system, which are subjected to detection in the angular velocity sensor.

The above-described angular velocity sensor serves as a uniaxial angular velocity sensor to detect an angular velocity component about the Z-axis, and is therefore unable to detect an angular velocity component about the X-axis or the Y-axis. Multi-axial angular velocity sensors for which demand is required at present in the field of industry are, as shown in FIG. 2, a multi-axial angular velocity sensor capable of independently detecting an angular velocity component ωx about the X-axis (hereinafter simply referred to as an angular velocity ωx depending upon circumstances), an angular velocity component ωy about the Y-axis (hereinafter simply referred to as an angular velocity ωy depending upon circumstances), and an angular velocity component ωz about the Z-axis (hereinafter simply referred to as an angular velocity ωz depending upon circumstances), respectively, in the XYZ three-dimensional coordinate system with respect to a predetermined object 20.

Figure 3:
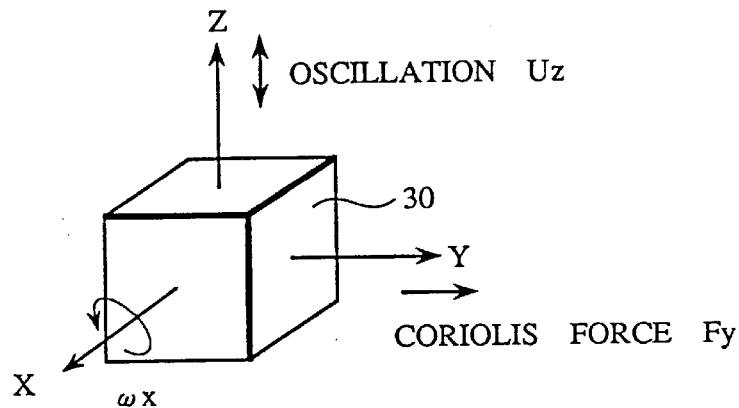
FIG. 3 is a view for explaining the fundamental principle to detect angular velocity component ωx about the X-axis by using an angular velocity sensor according to this invention.
Figure 4:
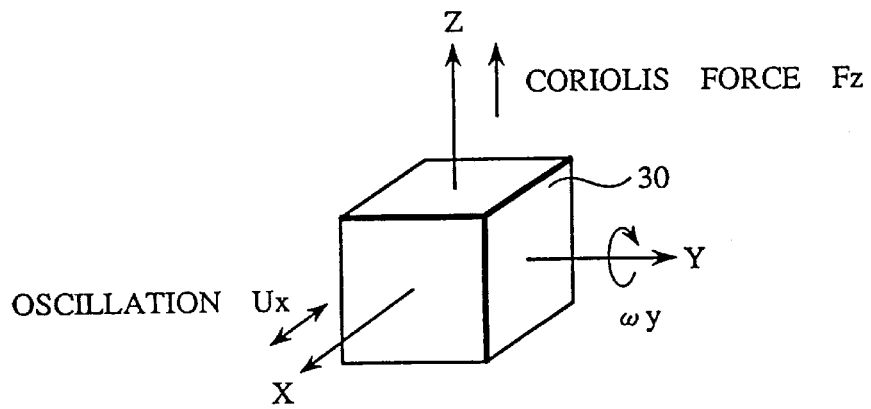
FIG. 4 is a view for explaining the fundamental principle to detect angular velocity component ωy about the Y-axis by using the angular velocity sensor according to this invention.
Figure 5:
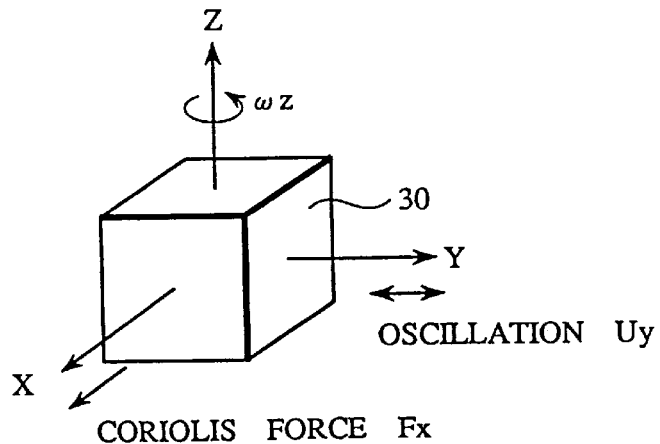
FIG. 5 is a view for explaining the fundamental principle to detect angular velocity component ωz about the Z-axis by using the angular velocity sensor according to this invention.

The fundamental principle thereof will now be described with reference to FIGS. 3 to 5. It is now assumed that an oscillator 30 is placed at the origin position of the XYZ three-dimensional coordinate system. In order to detect angular velocity component ωx about the X-axis of the oscillator 30, it is sufficient to measure a Coriolis force Fy produced in the Y-axis direction when the oscillator 30 is caused to undergo oscillation Uz in the Z-axis direction as shown in FIG. 3. The Coriolis force Fy takes a value proportional to angular velocity ωx. Further, in order to detect angular velocity ωy about the Y-axis of the oscillator 30, it is sufficient to measure a Coriolis force Fz produced in the Z-axis direction when the oscillator 30 is caused to undergo oscillation Ux in the X-axis direction as shown in FIG. 4. The Coriolis force Fz takes a value proportional to angular velocity ωy. In addition, in order to detect angular velocity component ωz about the Z-axis of the oscillator 30, it is sufficient to measure a Coriolis force Fx produced in the X-axis direction when the oscillator 30 is caused to undergo oscillation Uy in the Y-axis direction as shown in FIG. 5. The Coriolis force Fx takes a value proportional to angular velocity ωz.

Figure 6:
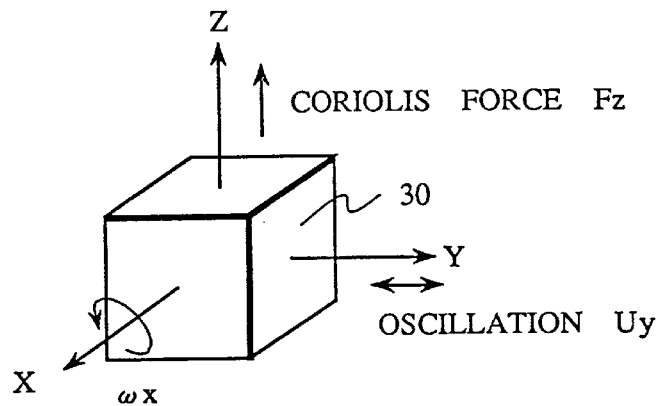
FIG. 6 is a view for explaining another fundamental principle to detect angular velocity component ωx about the X-axis by using the angular velocity sensor according to this invention.
Figure 7:
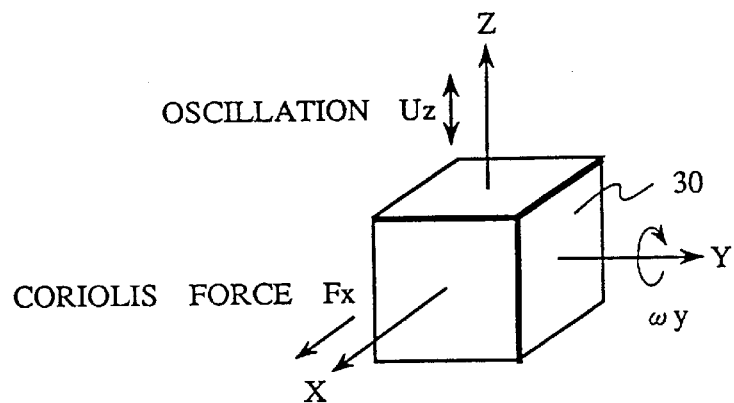
FIG. 7 is a view for explaining another fundamental principle to detect angular velocity component ωy about the Y-axis by using the angular velocity sensor according to this invention.
Figure 8:
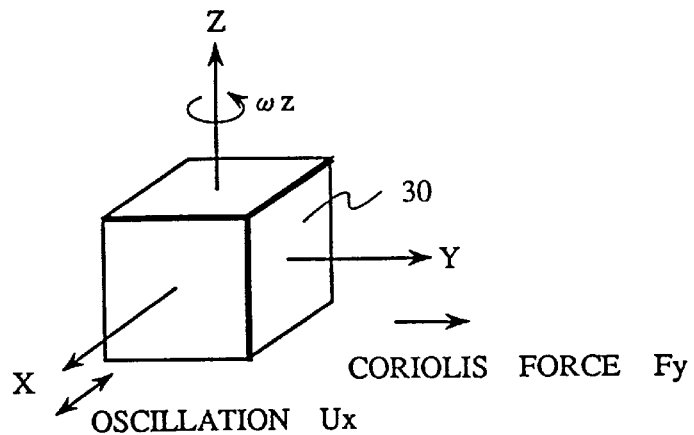
FIG. 8 is a view for explaining another fundamental principle to detect angular velocity component ωz about the Z-axis by using the angular velocity sensor according to this invention.

Eventually, in order to detect angular velocity components every respective axes in the XYZ three-dimensional coordinate system, the mechanism for oscillating the oscillator 30 in the X-axis direction, the mechanism for oscillating it in the Y-axis direction and the mechanism for oscillating it in the Z-axis direction; and the mechanism for detecting Coriolis force Fx in the X-axis direction exerted on the oscillator 30, the mechanism for detecting Coriolis force Fy in the Y-axis direction exerted thereon and the mechanism for detecting Coriolis force Fz in the Z-axis direction exerted thereon are required. Nevertheless, in order to detect angular velocity components about three axes, it cannot be necessarily said that the above-mentioned mechanisms are all required. In place of the above-described principle shown in FIGS. 3 to 5, detection using the principle shown in FIGS. 6 to 8 can be made. Namely, an angular velocity ωx about the X-axis of the oscillator 30 can be detected by measuring Coriolis force Fz produced in the Z-axis direction when the oscillator 30 is caused to undergo oscillation Uy in the Y-axis direction as shown in FIG. 6. Moreover, angular velocity ωy about the Y-axis of the oscillator 30 can be detected by measuring Coriolis force Fx produced in the X-axis direction when the oscillator 30 is caused to undergo oscillation Uz in the Z-axis direction as shown in FIG. 7. In addition, an angular velocity ωz about the Z-axis of the oscillator 30 can be detected by measuring Coriolis force Fy produced in the Y-axis direction when the oscillator 30 is caused to undergo oscillation Ux in the X-axis direction as shown in FIG. 8.

Accordingly, in the case of detecting angular velocity components about two axes, it is sufficient that one oscillating mechanism and two detecting mechanisms are provided. For example, in the case of detecting angular velocity ωx about the X-axis by the principle shown in FIG. 3 and detecting angular velocity ωy about the Y-axis by the principle shown in FIG. 7, it is sufficient that the mechanism for producing oscillation in the Z-axis direction, the mechanism for detecting Coriolis force Fy in the Y-axis direction and the mechanism for detecting Coriolis force Fx in the X-axis direction are provided. In this case, it is possible to detect angular velocity components about the X-axis and the Y-axis under the state where the oscillator 30 is caused to undergo oscillation in the Z-axis direction. However, it is impossible to detect angular velocity ωz about the Z-axis under the state where the oscillator 30 is caused to undergo oscillation in the Z-axis direction. In order to detect angular velocity ωz about the Z-axis, it is necessary to make a change to allow the oscillator 30 to be oscillated in the X-axis (FIG. 8) direction or in the Y-axis (FIG. 5) direction.

As stated above, in order to detect angular velocity components about three axes in the conventionally proposed angular velocity sensor, it is necessary to oscillate the oscillator 30 at least in two directions. However, in practice, in order to change oscillating direction of the oscillator, it is necessary to stop oscillation of the weight body thereafter to allow it to undergo oscillation in a new oscillating direction for a second time. For this reason, a time is required to some extent. Particularly, in order to obtain a detection value of high accuracy, it is necessary to wait until the oscillating state becomes stable. As a result, response would be lowered to much degree. For example, it is possible to detect angular velocity ωx about the X-axis and angular velocity ωy about the Y-axis in the state where the oscillator is caused to undergo oscillation in the Z-axis direction. However, in order to subsequently detect angular velocity ωz about the Z-axis, it is necessary to allow the oscillator to be stationary and thereafter to oscillate it, e.g., in the X-axis direction for a second time. In addition, it is impossible to detect angular velocity ωz about the Z-axis until the oscillation in the X-axis direction becomes stable. Accordingly, in the case where there is a necessity of sequentially detecting, on real time basis, angular velocity components ωx, ωy, ωz about three axes, there would result relatively lower response.

An object of this invention is to provide an angular velocity sensor which solves such problems with the prior arts, and which can detect, with good response, angular velocity components with respect to plural different axes.

§2 Detection Principle of Angular Velocity Sensor According to This Invention

Figure 9:
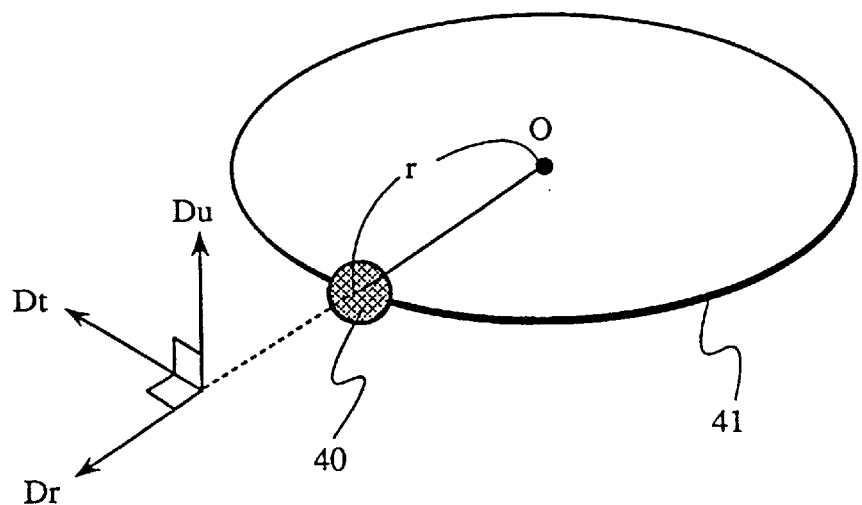
FIG. 9 is a view showing respective axes participating in detection of angular velocity in the case where the weigh body 40 is caused to undergo a circular movement along a circular orbit 41.

Subsequently, the detection principle of the angular velocity sensor according to this invention will be described below. It is now assumed that an object (hereinafter referred to as a weight body in this specification) 40 having a predetermined mass m carries out an orbital movement along a predetermined orbit 41, as shown in FIG. 9. The "orbital movement" mentioned here may be any movement along an orbit comprised of a closed loop. Accordingly, an elliptical movement or movement on an orbit including parabola, hyperbola, free curve may be employed. However, it is preferable in practice that a circular movement is employed because it is the simplest. In view of the above, explanation will be given in connection with the example where the weight body 40 is caused to undergo a circular movement in all of embodiments described below, but this invention is not limited to such a circular In the case where the weight body 40 is carrying out a circular movement, the orbit 41 becomes a circular orbit having a center O and a radius r. When consideration is now made in connection with velocity components of the weight body 40 at the moment, they are directed to a tangential direction Dt of the circular orbit 41. At this time, consideration is made in connection with two directions perpendicular to the tangential direction Dt. Since the weight body 40 is carrying out the circular movement in the example of FIG. 9, consideration is made in connection with the radial direction Dr of the circular movement and the direction Du perpendicular to the plane including the circular orbit 41. In this case, two axes Dt, Dr are axes defined only at a moment. If time passes, the weight body 40 moves along the circular orbit 41. For this reason, directions of respective axes will be changed. Accordingly, respective physical actions in the two detection principles described below are all physical actions at moment.

Figure 10:
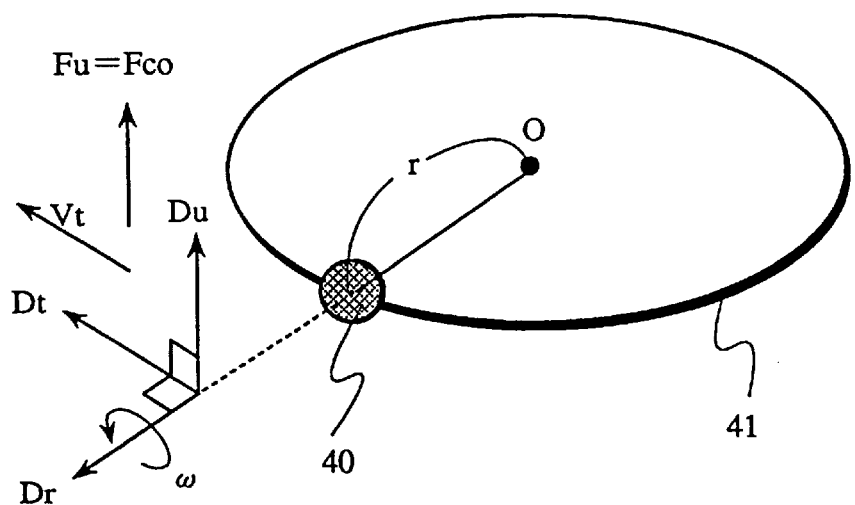
FIG. 10 is a principle diagram for explaining the first detection principle of this invention.

FIG. 10 is a principle view for explaining the first detection principle of this invention. When the weight body 40 having mass m is carrying out a circular movement along the circular orbit 41 as described above, velocity vector Vt of the weight body 40 is directed to the tangential direction Dt. At this time, if an angular velocity ω is assumed to be applied (exerted) about the axis along the radial direction Dr with respect to the entirety of the detection system, a Coriolis force Fco is produced along the direction Du which is perpendicular to the circular orbit 41 (the direction perpendicular to the plane including the circle). Between Coriolis force Fco, mass m of the weight body 40, velocity Vt in the tangential direction of the weight body and the applied angular velocity ω, the following relationship expressed below holds:

$$Fco = 2m \cdot Vt \cdot \omega.$$

In the above relational expression, m is a value which can be known as mass of the weight body 40. Moreover, velocity Vt is a value which can be measured. Particularly, if the weight body 40 is moved along the circular orbit 41 with a constant velocity by a predetermined driving mechanism, the velocity Vt takes a fixed known value at all times. Accordingly, if Coriolis force Fco can be detected, it is possible to obtain angular velocity ω by operation (calculation) on the basis of the above-described relational expression. In the case where the weight body 40 is carrying out a circular movement along the circular orbit 41 as in this example, a centrifugal force based on the circular movement is not applied with respect to the direction Du perpendicular to the circular orbit 41. Accordingly, if an external force such as acceleration or electromagnetic force, etc. is not applied to the weight body 40, force Fu applied in the direction Du with respect to the weight body 40 becomes equal to Coriolis force Fco. In view of the above, by detecting the force Fu in the direction Du, it is possible to obtain Coriolis force Fco.

Eventually, the first detection principle indicates that if force Fu applied in the Du direction to the weight body 40 is obtained in the state where the weight body 40 is caused to undergo a circular movement, it is regarded that the force Fu is a Coriolis force Fco which can be used in the above-described relational expression. Therefore an angular velocity ω about the axis along the radial direction Dr of the circular movement can be obtained. In this case, the radial direction Dr of the circular movement is a direction indicated by the arrow which points from the central point O toward the outside, and is a direction varying moment by moment within the plane including the circular orbit 41. Accordingly, if the angular velocity detection based on the first detection principle is carried out, it becomes possible to detect angular velocity components about the axes along all directions within the plane while the weight body 40 makes a circular movement along the circular orbit 41.

Figure 11:
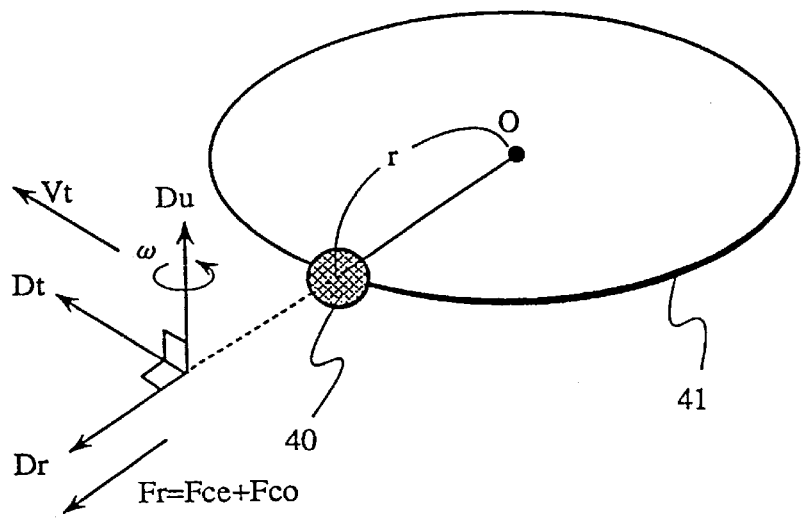
FIG. 11 is a principle diagram for explaining the second detection principle of this invention.

On the other hand, FIG. 11 is a principle diagram for explaining the second detection principle of this invention. When the weight body 40 having mass m is caused to undergo a circular movement along the circular orbit 41 similarly to the previously described first detection principle, the velocity vector Vt of the weight body 40 is directed to the tangential direction Dt, as shown in FIG. 11. At this time, if angular velocity ω is assumed to be applied about the axis along the direction Du perpendicular to the circular orbit 41 with respect to the entirety of the detection system, Coriolis force Fco is produced along the radial direction Dr of the circular movement. Between the Coriolis force Fco, mass m of the weight body 40, tangential direction velocity Vt of the weight body 40 and the applied angular velocity ω, the following relationship expressed below holds.

$$Fco = 2m \cdot Vt \cdot \omega.$$

Accordingly, if it is possible to detect Coriolis force Fco similarly to the above-described first detection principle, it is possible to obtain, by operation (calculation), angular velocity ω on the basis of the above-described relational expression. However, it is to be noted that the second detection principle differs from the first detection principle in that centrifugal force Fce based on the circular movement is added in the radial direction Dr. Namely, if it is assumed that an external force such as acceleration or electromagnetic force, etc. is not applied to the weight body 40, the force Fr applied in the radial direction Dr with respect to the weight body 40 becomes equal to a value obtained by synthesizing the Coriolis force Fco with the centrifugal force Fce. In this case, if the circular movement can be specified, the magnitude of the centrifugal force Fce can be obtained by calculation. Namely, when mass of the weight body is m, the radius of the circular movement is r, and the angular velocity of the circular movement is Ω, a value of the centrifugal force Fce can be obtained by the following relational expression:

$$Fce = m \cdot r \cdot \Omega^2.$$

In view of the above, if force Fr along the radial direction Dr is detected and the component of the centrifugal force Fce is eliminated therefrom, the Coriolis force Fco can be obtained.

Eventually, the second detection principle indicates that when force Fr applied in the radial direction Dr with respect to the weight body 40 is obtained in the state where the weight body 40 is caused to undergo a circular movement and a value of Coriolis force Fco is obtained by eliminating the component Fce of the centrifugal force from the force Fr, it is possible to obtain angular velocity ω about the axis along the direction Du perpendicular to the circular orbit 41 by using the above-described relational expression.

It is to be noted that in the case an external force such as acceleration or electromagnetic force (there will be some influence in the case where the weight body 40 is magnetic body), etc., it is sufficient to use a conventional acceleration sensor or a conventional magnetic sensor, etc. to detect acceleration or magnetic force to carry out correction based on the detection value. For example, in the case of carrying out detection based on the first detection principle, it is sufficient to eliminate component based on acceleration or magnetic force from the force Fu applied in the Du direction to obtain Coriolis force Fco. In the case of carrying out detection based on the second detection principle, it is sufficient to eliminate centrifugal force Fce from the force Fr applied in the Dr direction, and to eliminate component based on acceleration or magnetic force thus to obtain Coriolis force Fco.

Figure 12:
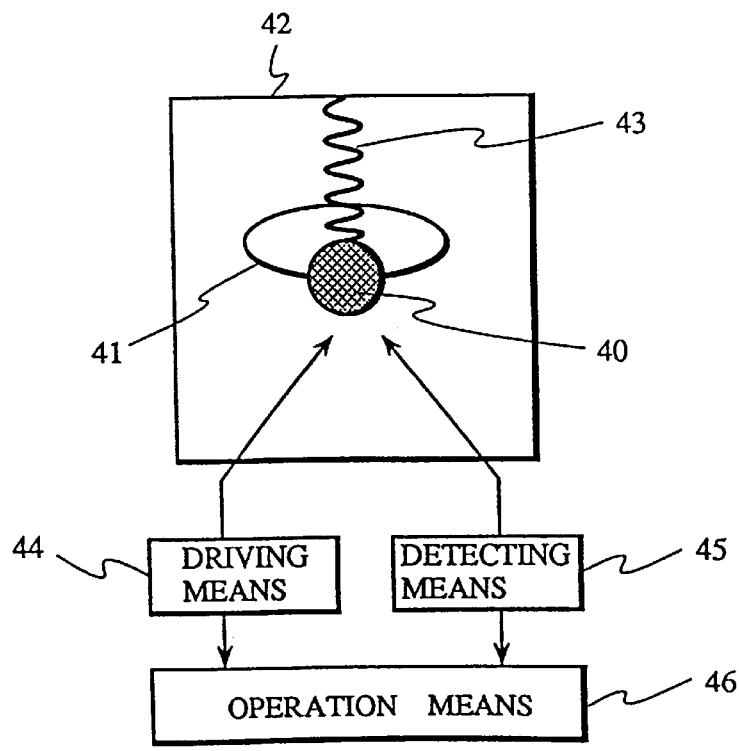
FIG. 12 is a block diagram showing the fundamental configuration of an angular velocity sensor according to this invention.

FIG. 12 is a block diagram showing the fundamental configuration of an angular velocity sensor which carries out detection of angular velocity by the above-described principle. Since the weight body 40 should carry out an orbital movement along the predetermined orbit 41, it is necessary for accommodating the weight body 40 within a sensor casing 42 in order that the orbital movement is not impeded. Therefore, it is necessary to support the weight body 40 by the casing 42. However, since the orbital movement cannot be carried out if the weight body 40 is fixed to the sensor casing 42, supporting means 43 for movably supporting it with a predetermined degree of freedom is required. Moreover, driving means 44 for allowing the weight body 40 to undergo an orbital movement, detecting means 45 for detecting Coriolis force inevitable for the above-described detection principle, and operation means 46 for executing an operation (calculation) based on the above-described detection principle become essential components. How these respective components are realized in a more practical manner will be described in detail in the more practical embodiments which will be described later.

§3 Detection of Angular Velocity Components About Three Axes in the XYZ Three-dimensional Coordinate System While detection of an angular velocity component about an arbitrary axis can be made in accordance with the above-described fundamental principle, it is sufficient from a viewpoint of practical use that three components of the angular velocity component ωx about the X-axis, the component ωy about the Y-axis, and the component ωz about the Z-axis in the XYZ three-dimensional coordinate system. In view of the above, the principle for carrying out such detection of angular velocity components about the three axes will be described below.

Figure 13:
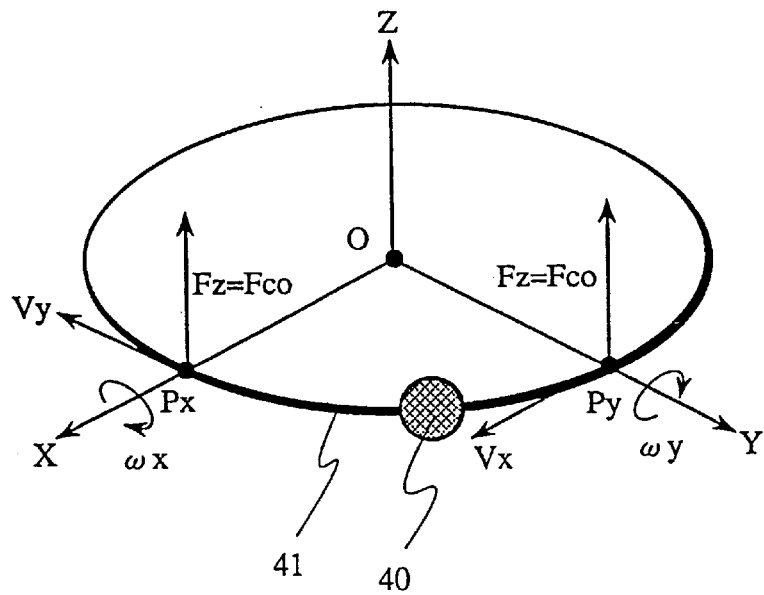
FIG. 13 is a principle diagram for explaining the first detection principle of this invention in the XYZ three-dimensional coordinate system.

Now, an XYZ three-dimensional coordinate system is defined as shown in FIG. 13. Supposing that an orbit 41 consisting of circle is included within the XY-plane with the origin O being as the center and the weight body 40 is carrying out a circular movement along the orbit 41. Eventually, the weight body 40 will carry out a circular movement so as to revolve around the origin O within the XY-plane. Therefore, angular velocity detection based on the fundamental principle described in the chapter §2 is carried out when the weight body 40 passes through the X-axis and the Y-axis.

Initially, let consider the detection based on the first detection principle described in the chapter §2. As shown in FIG. 13, the weight body 40 passes through the X-axis at point Px. Since instantaneous velocity vector Vy of the weight body 40 at this time is directed to the tangential direction of the circular orbit 41 at the point Px, the vector Vy becomes in parallel to the Y-axis. Further, if a force Fz in the Z-axis direction applied to the weight body 40 is obtained at this time point, the force Fz is equal to a Coriolis force Fco produced on the basis of the angular velocity ωx about the X-axis applied to the entirety of the detection system. Accordingly, if the force Fz applied to the weight body 40 is detected at the point Px, the angular velocity component ωx about the X-axis can be obtained by the following relational expression $$Fz=Fco=2m \cdot Vy \cdot \omega x,$$

where mass of the weight body 40 is m.

Moreover, the weight body 40 passes through the Y-axis at the point Py. Since the instantaneous velocity vector Vx of the weight body 40 at this time is directed to the tangential direction of the circular orbit 41 at the point Py, the vector Vx becomes in parallel to the X-axis. Further, if a force Fz in the Z-axis direction applied to the weight body 40 is obtained at this time point, the force Fz is equal to a Coriolis force Fco produced on the basis of the angular velocity component ωy about the Y-axis applied to the entirety of the detection system. Accordingly, if the force Fz applied to the weight body 40 is detected at the point Py, the angular velocity component ωy about the Y-axis can be obtained by using the following relational expression $$Fx=Fco=2m \cdot Vx \cdot \omega y,$$

where mass of the weight body 40 is m.

Eventually, according to the first detection principle described in the chapter §2, it is possible to detect an angular velocity component ωx about the X-axis at the moment when the weight body 40 passes through the X-axis and to detect an angular velocity component ωy about the Y-axis at the moment when the weight body 40 passes through the Y-axis.

Figure 14:
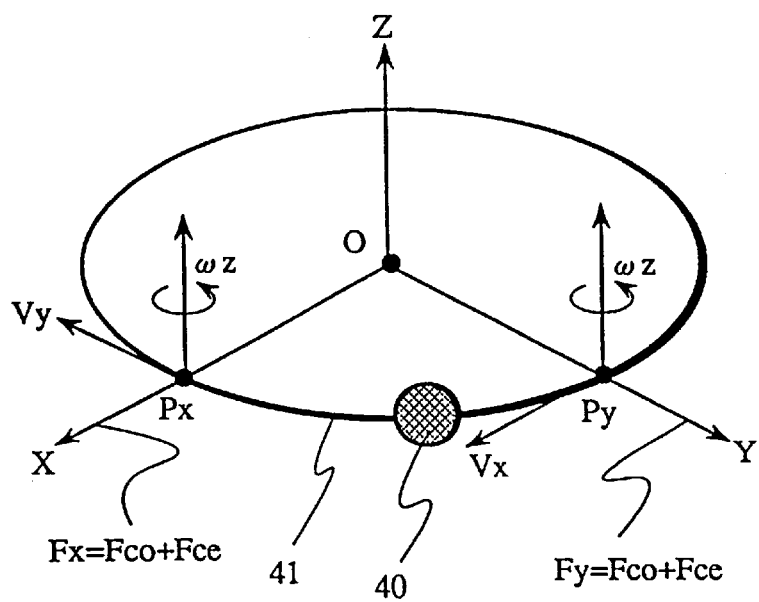
FIG. 14 is a principle diagram for explaining the second detection principle of this invention in the XYZ three-dimensional coordinate system.

Subsequently, let consider detection by the second detection principle described in the second chapter §2. As shown in FIG. 14, a force Fx in the X-axis direction applied to the weight body 40 is obtained when the weight body 40 passes through the X-axis at the point Px. The obtained force Fx is equal to a synthetic force of a Coriolis force Fco produced on the basis of an angular velocity component ωz about the Z-axis applied to the entirety of the detection system and a centrifugal force Fce applied to the weight body 40. Accordingly, if the force Fx applied to the weight body 40 is detected at the point Px, the angular velocity component ωz about the Z-axis can be obtained by using the following relational expression:

$$Fx-Fce=Fco=2m \cdot Vy \cdot \omega z,$$

where mass of the weight body 40 is m.

Moreover, a force Fy in the Y-axis direction applied to the weight body 40 is obtained when the weight body 40 passes through the Y-axis at the point Py. The force Fy is equal to a synthetic force of a Coriolis force Fco produced on the basis of an angular velocity ωz about the Z-axis exerted on the entirety of this detection system and a centrifugal force Fce applied to the weight body 40. Accordingly, if the force Fy applied to the weight body 40 is detected at the point Py, the angular velocity ωz about the Z-axis can be obtained by using the following relational expression:

$$Fy-Fce=Fco=2m \cdot Vx \cdot \omega z,$$

where mass of the weight body 40 is m.

Eventually, according to the second detection principle described in the chapter §2, it is possible to detect an angular velocity component ωz about the Z-axis when the weight body 40 passes through the X-axis or the Y-axis. Actually, in accordance with the second detection principle, it is possible to detect an angular velocity component ωz about the Z-axis at any moment as far as the weight body 40 is on the orbit 41.

As stated above, if the weight body 40 is caused to undergo a circular movement within the XY-plane of the XYZ three-dimensional coordinate system and detections of a Coriolis force is carried out when the weight body 40 passes through the X-axis and Y-axis, it becomes possible to detect three components of the angular velocity ωx about the X-axis, the angular velocity ωy about the Y-axis, and the angular velocity ωz about the Z-axis on the basis of the first detection principle or the second detection principle.

In more practical sense, if an approach is employed to respectively detect a force component Fz in the Z-axis direction every time when the weight body 40 passes through the point Px and the point Py, as shown in FIG. 13, for example, it is possible to respectively obtain angular velocity components ωx and ωy. Further, as shown in FIG. 14, if a force component Fx in the X-axis direction is detected every time when the weight body 40 passes through the point Px and a correction by the centrifugal force Fce is carried out, it is possible to obtain an angular velocity ωz. Therefore, when the weight body 40 passes through the point Px, it is necessary to detect both the force Fz (as shown in FIG. 13) and the force Fx (as shown in FIG. 14), simultaneously. This double detection of the forces Fx and Fz can be realized by preparing a pair of individual force sensors.

Eventually, for a time period during which the weight body 40 goes around on the circular orbit 41, it is possible to respectively obtain angular velocity components ωx, ωy, ωz with respect to the three axes. Since the circular movement velocity of the weight body 40 can be maintained at relatively higher value, response as the three axes velocity sensor becomes extremely high. It is of course that if similar detection is carried out also when the weight body 40 passes through the negative area of the X-axis or the Y-axis (not shown), response is further improved.

§4 Driving Means and Detecting Means

In the angular velocity sensor according to this invention, driving means for allowing the weight body to carry out an orbital movement and detecting means for detecting a Coriolis force applied to the weight body become essential components. In view of the above, the configuration and the arrangement of driving means and detecting means which is suitable in the case where the weight body is caused to undergo an circular movement within the XY-plane will be briefly described.

Figure 15:
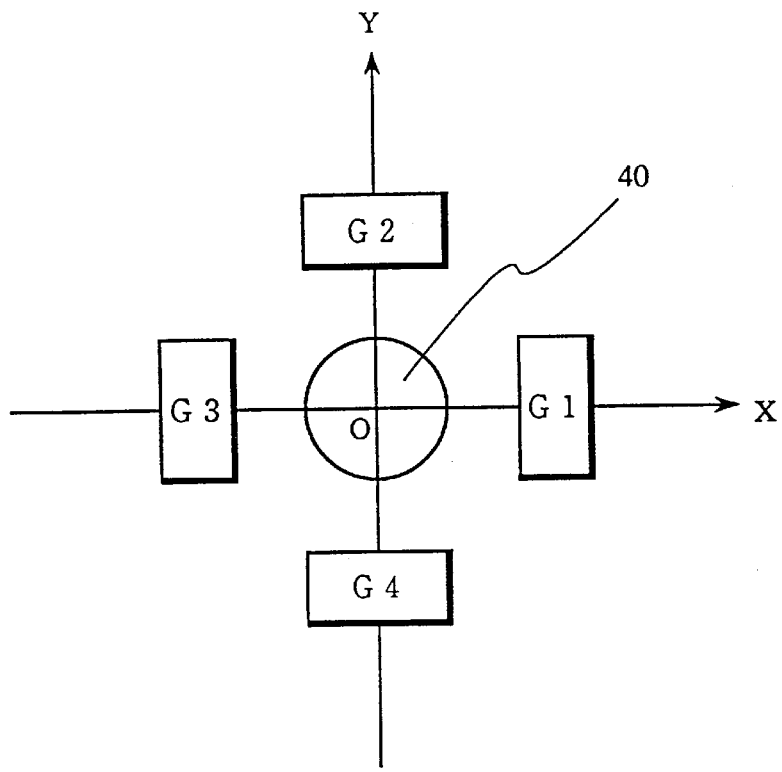
FIG. 15 is a view showing an example of the configuration and the arrangement of driving means shown in FIG. 12.

An example of the configuration and the arrangement of the driving means is first shown in FIG. 15. In this example, a weight body 40 is indicated at the origin position O of the XY-plane. Around the weight body 40, four force generators G1 to G4 are arranged. The first force generator G1 arranged in the positive area of the X-axis has a function to apply force to the weight body 40 in the positive direction of the X-axis, the second force generator G2 arranged in the positive area of the Y-axis has a function to apply force to the weight body 40 in the positive direction of the Y-axis, the third force generator G3 arranged in the negative area of the X-axis has a function to apply force to the weight body 40 in the negative direction of the X-axis and the fourth force generator G4 arranged in the negative area of the Y-axis has a function to apply force to the weight body 40 in the negative direction of the Y-axis. In a neutral state where these four force generators G1 to G4 are not operative, the weight body 40 is supported with respect to the sensor casing so that it is in a stationary state at the position of the origin O of the figure. It is to be noted that the weight body 40 is movably supported with a predetermined degree of freedom, and can be caused to undergo a displacement as indicated by positions A to E shown in FIG. 16 by operating the four force generators G1 to G4. In more practical sense, it is sufficient to attach the weight body 40 at the sensor casing by means of elastic (resilient) member, e.g., spring, etc.

Figure 16:
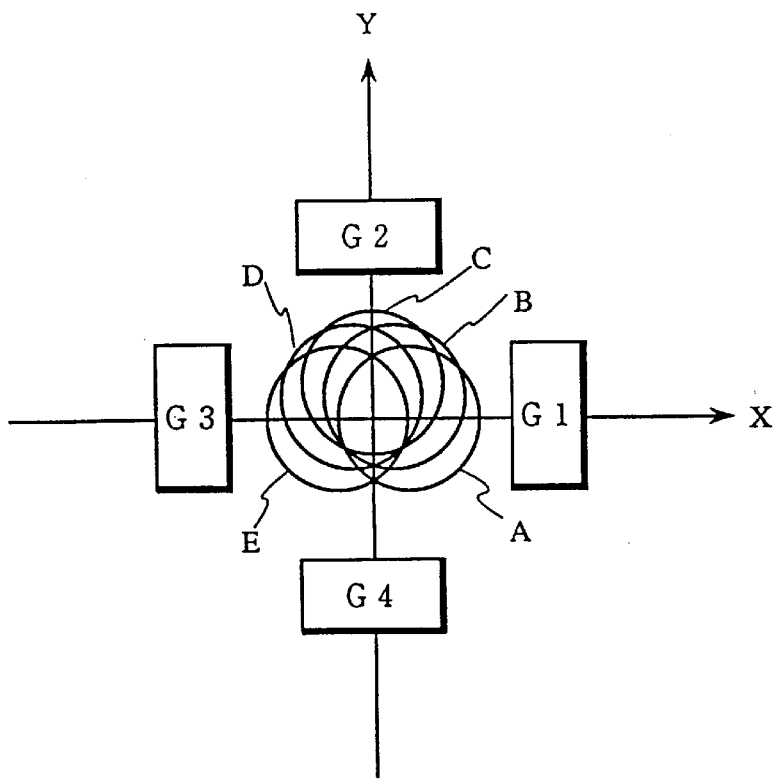
FIG. 16 is a view for explaining the operation for allowing the weight body to carry out a circular movement by the driving means shown in FIG. 15.
Figure 17:
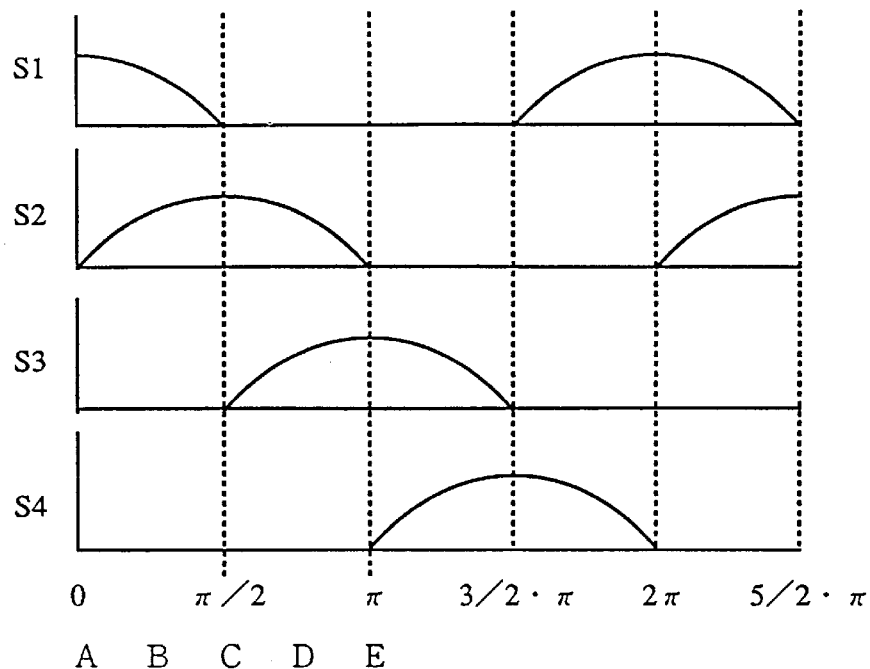
FIG. 17 is a waveform diagram showing current signals S1 to S4 delivered to force generators G1 to G4 constituting the driving means shown in FIG. 15.

The force generators G1 to G4 may be constituted by, e.g., electromagnet. In this case, it is necessary to constitute the weight body 40 with a magnetic body such as iron, etc. in order that it can receive magnetic attractive force. In order to allow the weight body 40 to carry out a circular movement by four electromagnets, it is sufficient to prepare four sine half-wave rectification signals S1 to S4 of which phases are shifted in succession by $\pi/2$ as shown in FIG. 17. When these signals are respectively delivered to the force generators G1 to G4, the force generators G1 to G4 operate periodically. Letters of A to E indicated below the graph of FIG. 17 correspond to positions A to E shown in FIG. 16, and indicate positions of the weight body 40 at respective time points. For the time period of 0 to $\pi$ indicated on the time base, the weight body 40 moves on a circular orbit up to the positions A to E. It should be noted that, from a viewpoint of practical design for a commercial product, it is prefer to allow a radius of the circular movement of the weight body 40 to be smaller than the radius of the weight body 40 itself. In FIG. 16, looking at a locus of the center of gravity of the weight body 40, it will be understood that the weight body 40 is carrying out a circular movement, though the radius of the circular movement is smaller than that of the weight body 40 itself.

While the example where attractive force is applied to the weight body to allow it to carry out a circular movement has been described, repulsive force may be applied in a manner opposite to the above to allow the weight body to carry out a circular movement. Moreover, if force generators having a function to apply both attractive force and repulsive force are used, the weight body is permitted to undergo a circular movement only by two sets of force generators (force generator G1 arranged on the X-axis and the force generator G2 arranged on the Y-axis in FIG. 16, for example). It is of course that if four sets of force generators having a function to apply both attractive force and repulsive force are prepared to arrange them as shown in FIG. 16, the weight body is permitted to more efficiently undergo a circular movement.

Figure 18:
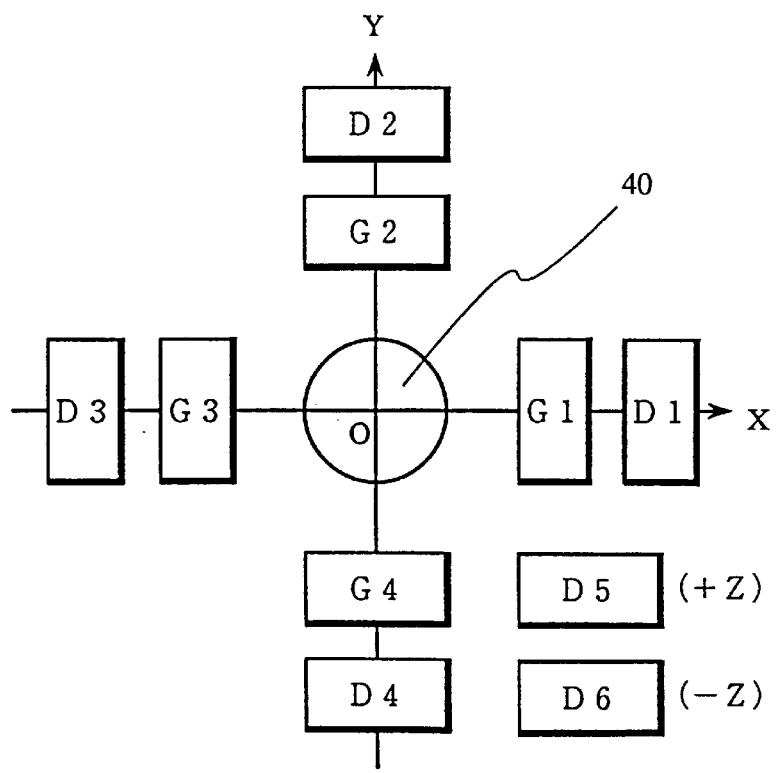
FIG. 18 is a view showing an example of the configuration and the arrangement with respect to the driving means and the detecting means shown in FIG. 12.

Subsequently, the example where six displacement detectors are further arranged as detecting means in addition to the above-described force detectors G1 to G4 (driving means) is shown in FIG. 18. While the detecting means in this invention is a component for detecting a Coriolis force of a predetermined direction applied to the weight body 40 as previously described, there is employed here such a configuration to detect a displacement of the weight body 40 to thereby indirectly detect a force applied to the weight body 40. In order to obtain a genuine Coriolis force, a correction might be done, as occasion demands, to eliminate a centrifugal force or a force based on acceleration or magnetism. In FIG. 18, the displacement detector D1 detects displacement in the positive direction of the X-axis of the weight body 40, the displacement detector D2 detects displacement in the positive direction of the Y-axis of the weight body 40, the displacement detector D3 detects displacement in the negative direction of the X-axis of the weight body 40, the displacement detector D4 detects displacement in the negative direction of the Y-axis of the weight body 40, the displacement detector D5 detects displacement in the positive direction of the Z-axis of the weight body 40 and the displacement detector D6 detects displacement in the negative direction of the Z-axis of the weight body 40.

In the case where the weight body 40 is supported by a spring with respect to a sensor casing, linear relationship through a spring constant is maintained between a force applied to the weight body 40 and a displacement produced. Therefore, a value of displacement in respective directions detected by the displacement detectors can be dealt as a value of a force component applied in respective directions. Moreover, even if such a linear relationship is not maintained between force and displacement, since the relationship therebetween can be actually measured with respect to an actually trial manufactured angular velocity sensor, both physical actions can be caused to correspond to each other on the basis of the actually measured relationship. Anyway, displacement detected by the displacement detector can be dealt as applied force. Accordingly, force +Fx in the positive direction of the X-axis is detected by the displacement detector D1, force +Fy in the positive direction of the Y-axis is detected by the displacement detector D2, force –Fx in the negative direction of the X-axis is detected by the displacement detector D3, force –Fy in the negative direction of the Y-axis is detected by the displacement detector D4, force +Fz in the positive direction of the Z-axis is detected by the displacement detector D5, and force –Fz in the negative direction of the Z-axis is detected by the displacement detector D6.

Moreover, if displacement detectors each having a function capable of detecting displacements in both positive and negative directions with respect to a predetermined axis are used, all force components of ±Fx, ±Fy, ±Fz can be detected by three sets of displacement detectors. It is a matter of course that if six sets of such displacement detectors are prepared to dispose them as shown in FIG. 18 to detect force ±Fx in the X-axis direction by both outputs of the detectors D1, D3, to detect force ±Fy in the Y-axis direction by both outputs of the detectors D2, D4 and to detect force ±Fz in the Z-axis by both outputs of the detectors D5, D6, detections of higher accuracy can be made.

In order to detect angular velocity components ωx, ωy, ωz about respective axes by the angular velocity sensor having components in FIG. 18, it is sufficient to carry out detecting operation as described below. Initially, by delivering signals S1 to S4 shown in FIG. 17 as previously described to the force generators G1 to G4, the weight body 40 is caused to undergo a circular movement. Under this circular movement of the weight body 40, if force +Fz or –Fz in the Z-axis direction is detected by the displacement detector D5 or D6 at the time point of phase 0 on the time base of the graph of FIG. 17 (since the weight body 40 reaches the position A of FIG. 16, this time point becomes the moment that the weight body passes through the X-axis), an angular velocity component ωx about the X-axis can be obtained on the basis of the detection principle at the point Px shown in FIG. 13. Moreover, if force +Fx or −Fx in the X-axis direction is detected by the displacement detector D1 or D3 at the same time point, an angular velocity component ωz about the Z-axis can be obtained on the basis of the detection principle at the point Px shown in FIG. 14. Further, if force +Fz or −Fz in the Z-axis direction is detected by the displacement detector D5 or D6 at the time point of phase π/2 on the time base of the graph of FIG. 17 (since the weight body 40 reaches the position C of FIG. 16, this time point becomes the moment that the weight body passes through the Y-axis), an angular velocity component ωy about the Y-axis can be obtained on the basis of the detection principle at the point Py shown in FIG. 13. It is to be noted that when force +Fy or −Fy in the Y-axis direction is detected by the displacement detector D2 or D4 at the same time point, an angular velocity component ωz about the Z-axis can be similarly obtained on the basis of the detection principle at the point Py shown in FIG. 14.

In the case where the detection principle at the point Px or the point Py shown in FIG. 14 (the second detection principle) is employed, correction for excluding a component of centrifugal force Fce from the detected force Fx or Fy is required. However, if a configuration of weight body 40, a supporting structure with respect to the sensor casing, a configuration of the force detectors G1 to G4 and a period and a magnitude of signals S1 to S4 delivered thereto are obtained in more practical sense, mass m of the weight body 40, radius r of the circular movement, and an angular velocity Ω of the circular movement are obtained. Accordingly, the centrifugal force Fce can be calculated by operation expressed below.

$$Fce = m \cdot r \cdot \Omega^2$$

It is to be noted that a sign (positive direction or negative direction of each axis) is taken into consideration at the time of detecting force exerted on the weight body 40 in the above-described detecting operation and such a sign becomes information necessary for determining a rotational direction of an angular velocity ω to be obtained. Moreover, in the example of the configuration of FIG. 18, the six displacement detectors D1 to D6 in total are provided to carry out force detection in the positive direction and the negative direction by individual displacement detectors with respect to force along the same axis. However, as previously described, force detections in both positive and negative directions exerted along a specific axis may be carried out by means of a single displacement detector.

Subsequently, several embodiments showing more practical configuration of the angular velocity sensor according to this invention will be disclosed in the chapter §5 and chapters succeeding thereto. These embodiments are of a structure in which supporting means is constituted mainly by a flexible substrate having flexibility where the peripheral portion of the flexible substrate is fixed on a sensor casing and a weight body is fixed at the central portion of the flexible substrate. When such a structure is employed, it is possible to relatively easily carry out a circular movement of a weight body within a plane in parallel to the substrate plane surface of the flexible substrate, or a circular movement of a weight body within a plane perpendicular to the substrate plane surface. In addition, it also becomes possible to relatively easily detect displacements in respective directions of the weight body. Namely, if force generators are arranged at plural predetermined portions on the flexible substrate to allow these force generators to be periodically operative, the flexible substrate is permitted to produce bending momentarily varying and the weight body is thus permitted to undergo a circular movement. Moreover, if displacement detectors are disposed at predetermined plural portions on the flexible substrate, displacements of respective portions of the flexible substrate can be detected by respective displacement detectors. As a result, it becomes possible to detect displacement of the weight body. Effective arrangements of respective force generators or respective displacement detectors will be described in various embodiments.

In the embodiments described below, capacitance elements or piezoelectric elements are used as a force generator or a displacement detector. For example, capacitance elements can be utilized as a force detector for producing a Coulomb force by applying a predetermined voltage across both electrodes. In addition, if a distance between electrodes is varied by displacement of one electrode, electrostatic capacitance of the capacitance element is varied. Accordingly, such a capacitance element can be utilized as a displacement detector. Similarly, piezoelectric elements can be utilized as a force detector for producing a stress in a predetermined direction by applying a predetermined voltage. In addition, when stress is applied to the piezoelectric element by displacement, charges are produced in the piezoelectric element. By electrically detecting such charges, the piezoelectric element can be utilized as a displacement detector.

§5 Embodiment of Angular Velocity Sensor Utilizing Capacitance Element

Figure 19:
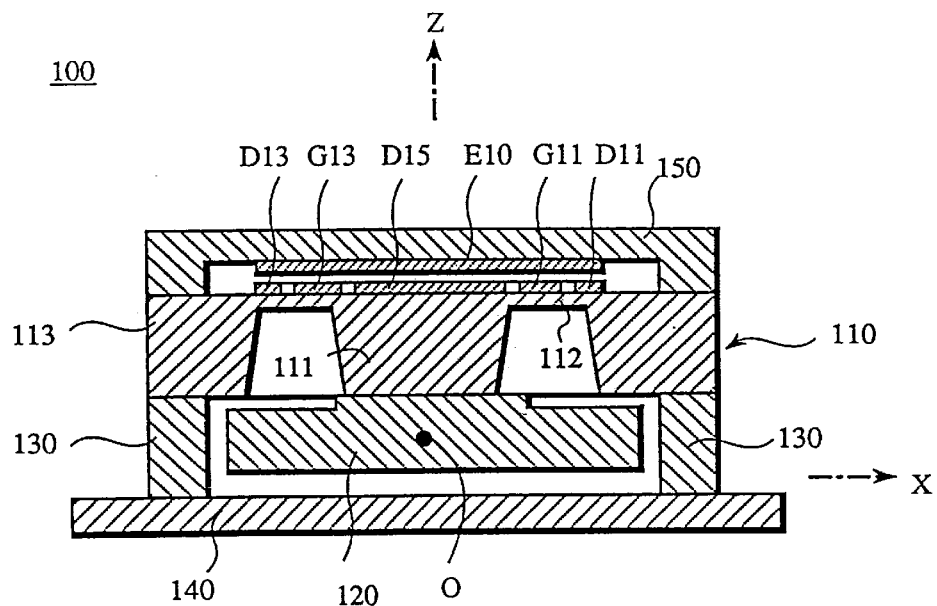
FIG. 19 is a side cross sectional view showing an embodiment of an angular velocity sensor wherein the force generator and the displacement detector are constituted by capacitance elements.
Figure 20:
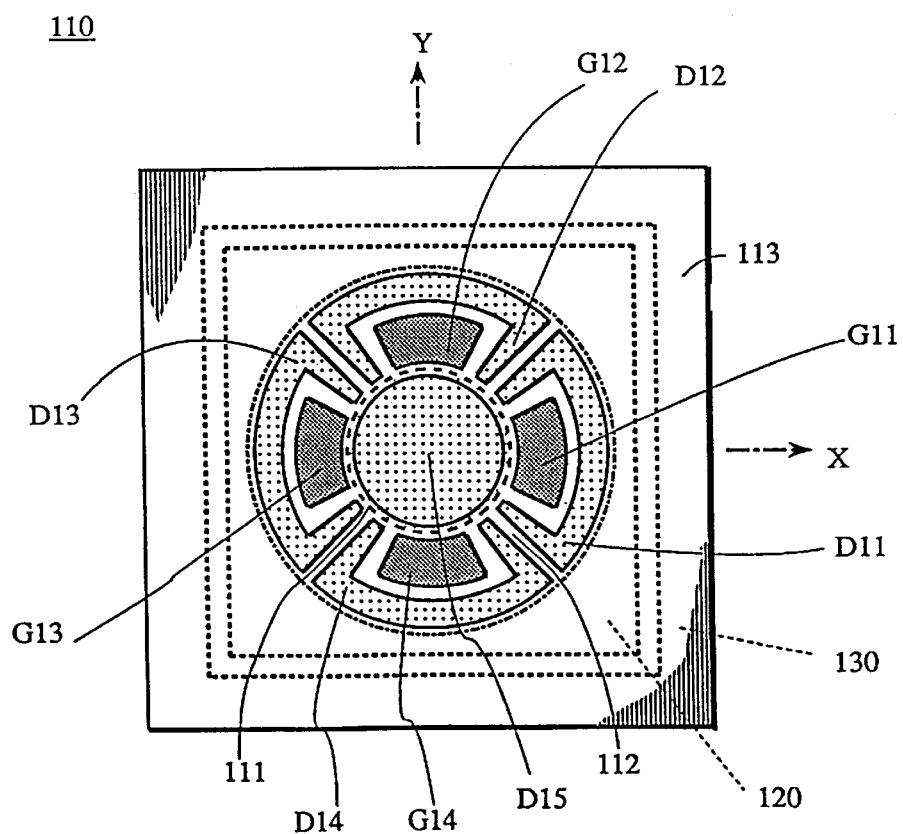
FIG. 20 is a top view of flexible substrate 110 in the angular velocity sensor shown in FIG. 19, wherein the cross section cut along the X-axis of the flexible substrate 110 shown in FIG. 20 is shown in FIG. 19.

An angular velocity sensor 100 of which cross section is shown in FIG. 19 is the embodiment in which force generators and displacement detectors are constituted by capacitance elements. A flexible substrate 110 is the most important element functioning as the center of the angular velocity sensor 100. The top view of the flexible substrate 110 is shown in FIG. 20. The cross section cut along the X-axis of the flexible substrate 110 shown in FIG. 20 is shown in FIG. 19. As indicated by broken lines in FIG. 20, an annular groove is formed on the lower surface of the flexible substrate 110. The portion where the groove is formed has flexibility because the thickness is thin (this portion is indicated as a flexible portion 112). In this example, the inside portion encompassed by the annular flexible portion 112 is called a working portion 111 and the outside portion of the flexible portion 112 is called a fixed portion 113. A weight body 120 in a block form is fixed on the lower surface of the working portion 111 and the fixed portion 113 is supported by a pedestal 130 (positions of the weight body 120 and the pedestal 130 are indicated by broken lines in FIG. 20).

Moreover, the pedestal 130 is fixed on a base substrate 140. Eventually, the weight body 120 is in a hanging state within a space encompassed by the pedestal 130. In this case, since the flexible portion 112 is thin in thickness and has flexibility, the weight body 120 can be caused to undergo displacement within this space with the degree of freedom to some extent. Namely, the weight body 120 is supported by the flexible portion 112 and the working portion 111, which function as the supporting means, within a sensor casing comprised of the fixed portion 113, the pedestal 130 and the base substrate 140. Therefore, the weight body 120 can be moved with a predetermined degree of freedom in the sensor casing. In addition, a cover substrate 150 is attached on the upper portion of the flexible substrate 110 in a manner to cover it while keeping a predetermined space.

As shown in FIG. 20, four electrode layers G11 to G14 functioning as a force generator and five electrode layers D11 to D15 functioning as a displacement detector are formed on the upper surface of the flexible substrate 110. While the hatchings are implemented to the portions of these electrode layers in FIG. 20, these hatchings indicate patterns for recognition of areas of respective electrode layers and do not indicate the cross section. In addition, different hatching patterns are implemented to the electrode layers functioning as the force generator and the electrode layers functioning as the displacement detector. This similarly applies to other figures indicating plane surface patterns of the electrodes.

On the other hand, a single large disk-shaped common electrode layer E10 is formed on the lower surface of the cover substrate 150 in a manner to oppose all the respective electrode layers G11 to G14 and D11 to D15. Thus, nine sets of capacitance elements in total are constituted by these electrode layers opposite in upper and lower directions.

An XYZ three-dimensional coordinate system having origin point O at a center of gravity position of the weight body 120 is defined as shown in FIG. 19 to carry out the following explanation. As shown in FIG. 20, the electrode layers G11 to G14 and the electrode layers D11 to D14 are all positioned on the X-axis or the Y-axis of the coordinate system and have shape linearly symmetrical with respect to the X-axis or the Y-axis.

It is to be noted that while, in this embodiment, nine individual electrode layers G11 to G14, D11 to D15 are formed on the flexible substrate 110 and the single common electrode layer E10 is formed on the cover substrate 150, there may be employed a configuration such that the single common electrode layer E10 is formed on the flexible substrate 110 and the nine individual electrode layers G11 to G14, D11 to D15 are formed on the cover substrate 150. Alternatively, nine individual electrode layers may be respectively formed both on the flexible substrate 110 and on the cover substrate 150 instead of employing the common electrode layer. In this case, nine capacitance elements are constituted by physically independent nine electrode layers on the flexible substrate 110 and physically independent nine electrode layers on the cover substrate 150.

Let first consider a phenomenon which takes place in the case where any voltage is applied across the electrode layer G11 and the common electrode layer E10. An attractive force based on Coulomb force is exerted between the electrode layers G11 and E10. At this time, since the electrode layer G11 is positioned on the flexible portion 112 which is thin in thickness, the flexible substrate 110 will be caused to undergo bending on the basis of the attractive force so that the spacing between the electrode layers G11 and E10 slightly becomes small. Such bending produces displacement in the positive direction of the X-axis with respect to the weight body 120. In short, when a predetermined voltage is applied to the electrode layer G11 with potential of the common electrode layer E10 being as a reference potential, the weight body 120 is caused to undergo displacement in the X-axis direction.

Accordingly, the capacitance element consisting of the electrode layer G11 and the common electrode layer E10 functions as the force generator G1 in the example of the configuration shown in FIG. 18. Similarly, the capacitance element consisting of the electrode layer G12 and the common electrode layer E10, the capacitance element consisting of the electrode layer G13 and the common electrode layer E10 and the capacitance element consisting of the electrode layer G14 and the common electrode layer E10, respectively, function as the force generators G2, G3, G4 in the example of the configuration shown in FIG. 18. In view of the above, if voltages corresponding to the signals S1 to S4 shown in FIG. 17 are applied to the electrode layers G11 to G14 with potential of the common electrode layer E10 being as a reference potential, the weight body 120 carries out a circular movement substantially on the XY-plane.

While, in the above-described operation, Coulomb attractive force is applied between the respective electrode layers G11 to G14 and the common electrode layer E10 so that the weight body 120 is caused to undergo a circular movement, Coulomb repulsive force may be applied in a manner opposite to the above so that the weight body 120 is caused to undergo a circular movement. Moreover, if both the Coulomb attractive force and the Coulomb repulsive force are utilized, more efficient circular movements can be made. For example, in order to make the weight body 120 move in the positive direction of the X-axis, it is sufficient to the electrode layers G11 and E10 to undergo Coulomb attractive force therebetween the electrode layers G13 and E10 to undergo Coulomb repulsive force therebetween.

Eventually, in this embodiment, there is employed the configuration in which force generators (respective capacitance elements) which apply force in the direction along the Z-axis are respectively disposed in the positive and negative areas of the X-axis and in the positive and negative areas of the Y-axis. When these force generators are periodically operated, the weight body 120 carries out an orbital movement within the XY-plane.

In accordance with the previously described detection principle, if force components $\pm Fx$, $\pm Fy$, $\pm Fz$ in respective axial directions exerted on the weight body 120 can be detected in the state where the weight body 120 carries out an circular movement in a manner as stated above, it is possible to obtain angular velocity components $\pm \omega x$, $\pm \omega y$, $\pm \omega z$ about respective axes (signs indicate rotational direction). As previously described above, force components $\pm Fx$, $\pm Fy$, $\pm Fz$ in respective axial directions exerted on the weight body 120 can be detected as displacements in respective axial directions by the displacement detectors D1 to D6 shown in FIG. 18.

The five sets of capacitance elements consisting of the electrode layers D11 to D15 and the common electrode layer E10 shown in FIG. 20 function as the displacement detectors D1 to D6. For example, in the case where the weight body 120 is moved in the positive direction of the X-axis, the flexible portion 112 is bent, whereby the distance between the electrode layers D11 and E10 is contracted. Thus, a change takes place in an electrostatic capacitance value of a capacitance element constituted by two electrode layers. Accordingly, by measuring an electrostatic capacitance value between the electrode layers D11 and E10, it is possible to obtain displacement in the positive direction of the X-axis of the weight body 120. In more practical sense, if how the electrostatic capacitance value varies is actually measured when the weight body 120 is caused to undergo various displacements in practice by using the trial manufactured sensor, it is possible to obtain the relationship between the electrostatic capacitance value and the displacement quantity on the basis of the actually measured value.

Similarly, by measuring an electrostatic capacitance value between the electrode layers D12 and E10, it is possible to obtain displacement in the positive direction of the Y-axis of the weight body 120. By measuring an electrostatic capacitance value between the electrode layers D13 and E10, it is possible to obtain displacement in the negative direction of the X-axis of the weight body 120. By measuring an electrostatic capacitance value between the electrode layers D14 and E10, it is possible to obtain displacement in the negative direction of the Y-axis of the weigh body 120. In addition, by measuring an electrostatic capacitance value between the electrode layers D15 and E10, it is possible to obtain displacement in the Z-axis direction of the weight body 120.

In this embodiment, displacements in both the positive and negative directions of the Z-axis are detected by an electrostatic capacitance value between the electrode layers D15 and E10. Namely, if a capacitance value becomes large with respect to a predetermined reference capacitance value, it is indicated that the distance between the electrodes is contracted. Accordingly, it is judged that displacement in the positive direction of the Z-axis has taken place. In contrast, if a capacitance value becomes small with respect to the predetermined reference capacitance value, it is indicated that the distance between the electrodes has been widened. Accordingly, it can be judged that displacement in the negative direction of the Z-axis has taken place.

It is preferable to detect displacements in the X-axis and Y-axis directions as a difference between capacitance values of a pair of capacitance elements because such a method is efficient. For example, it is desirable to detect displacement in the X-axis direction as a difference between a capacitance value of the electrode layers D11 and E10 and a capacitance value of the electrode layers D13 and E10. In the case where the weight body is caused to undergo displacement in the positive direction of the X-axis, the capacitance value of the former becomes larger, whereas the capacitance value of the latter becomes smaller. For this reason, if a difference therebetween is obtained, higher accuracy detection can be made. In contrast, in the case where the weight body is caused to undergo displacement in the negative direction of the X-axis, the capacitance value of the former becomes smaller, whereas the capacitance value of the latter becomes greater. Namely, sign of the difference therebetween is inverted. Similarly, if displacement in the Y-axis direction is detected as a difference between a capacitance value of the electrode layers D12 and E10 and a capacitance value of the electrode layers D14 and E10, high accuracy detection can be made in a manner as stated above.

As stated above, the respective displacement detectors consisting of capacitance elements detect displacement in the Z-axis direction of a predetermined portion of the flexible substrate 110 in a direct point of view (Namely, displacement of the lower electrode of a pair of electrodes constituting a capacitance element). However, in an indirect point of view, these displacement detectors have a function to detect displacement in the X, Y and Z axes directions of the weight body 120 since the respective displacement detectors are arranged at particular positions. It should be noted that since respective electrode layers D11 to D14 constituting the displacement detectors are all linearly symmetrical with respect to the X-axis or the Y-axis as shown in FIG. 20, there is no influence of other axes components in carrying out displacement detections in the respective axes directions. For example, since the electrode layer D11 used for detection of displacement in the X-axis direction is linearly symmetrical with respect to the X-axis, in the case where displacement in the Y-axis direction takes place, the area of one half becomes closer to the common electrode layer E10, but the area of the other half becomes away from the common electrode layer E10. For this reason, displacements are canceled as a whole.

Eventually, in this embodiment, there is employed the configuration in which displacement detectors (respective capacitance elements) for detecting displacement in the direction along the Z-axis are respectively disposed in the positive and negative areas of the X-axis and the positive and negative areas of the Y-axis. Therefore it is possible to detect a Coriolis force applied in the X-axis direction of the weight body by using the displacement detectors disposed in the positive and negative areas of the X-axis and to detect a Coriolis force applied in the Y-axis direction of the weight body by using the displacement detectors disposed in the positive and negative areas of the Y-axis.

In order to detect angular velocity components $\omega x$, $\omega y$ and $\omega z$ about respective axes by the angular velocity sensor 100 described above, it is sufficient to carry out detecting operation as described below. Initially, voltages corresponding to the signals S1 to S4 shown in FIG. 17 are applied to the electrode layers G11 to G14 with potential of the common electrode layer E10 being as reference potential thus to allow the weight body 120 to carry out a circular movement on the XY-plane. Then, if displacement in the Z-axis direction of the weight body 120 is detected on the basis of an electrostatic capacitance value between the electrode layers D15 and E10, e.g., at the time point of the phase 0 on the time base in the graph of FIG. 17 (this time point becomes the moment when the weight body 120 passes through the X-axis while moving along the circular orbit), this displacement corresponds to a force component Fz applied in the Z-axis direction with respect to the weight body 120. Thus, it is possible to obtain an angular velocity $\omega x$ about the X-axis on the basis of the detection principle at the point Px shown in FIG. 13.

Moreover, if displacement in the X-axis direction of the weight body 120 is detected on the basis of an electrostatic capacitance value between the electrode layers D11 and E10 or an electrostatic capacitance value between the electrode layers D13 and E10 (or a difference between both the electrostatic capacitance values) at the same time point as above, this displacement corresponds to a force Fx applied in the X-axis direction with respect to the weight body 120. Thus, it is possible to obtain an angular velocity $\omega z$ about the Z-axis on the basis of the detection principle at the point Px shown in FIG. 14.

Further, if displacement in the Z-axis direction of the weight body 120 is detected on the basis of an electrostatic capacitance value between the electrode layers D15 and E10 at the time point of the phase $\pi/2$ on the time base of the graph of FIG. 17 (this time point becomes the moment when the weight body 120 passes through the Y-axis while moving along the circular orbit), this displacement corresponds to a force Fz applied in the Z-axis direction with respect to the weight body 120. Thus, it is possible to obtain an angular velocity $\omega y$ about the Y-axis on the basis of the detection principle at the point Py shown in FIG. 13. Alternatively, if displacement in the Y-axis direction of the weight body 120 is detected on the basis of an electrostatic capacitance value between the electrode layers D12 and E10 or an electrostatic capacitance value between the electrode layers D14 and E10 (or a difference between both the electrostatic capacitance values), this displacement corresponds to a force Fy applied in the Y-axis direction with respect to the weight body 120. Thus, it is possible to similarly obtain an angular velocity $\omega z$ about the Z-axis on the basis of the detection principle at the point Py shown in FIG. 14.

§6 Another Embodiment of Angular Velocity Sensor Utilizing Capacitance Element

Figure 21:
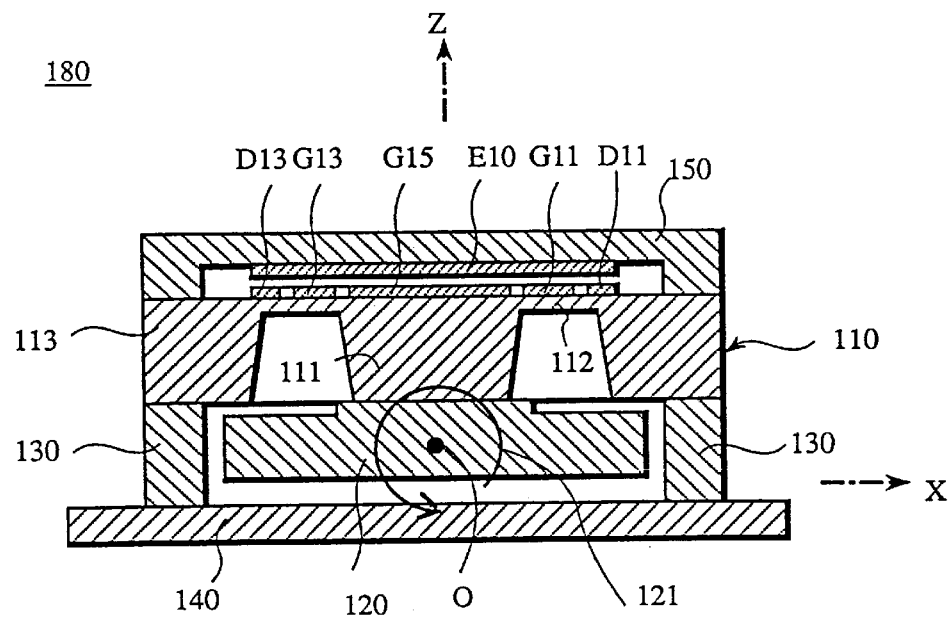
FIG. 21 is a side cross sectional view showing another embodiment of an angular velocity sensor wherein the force generator and the displacement detector are constituted by capacitance elements.
Figure 22:
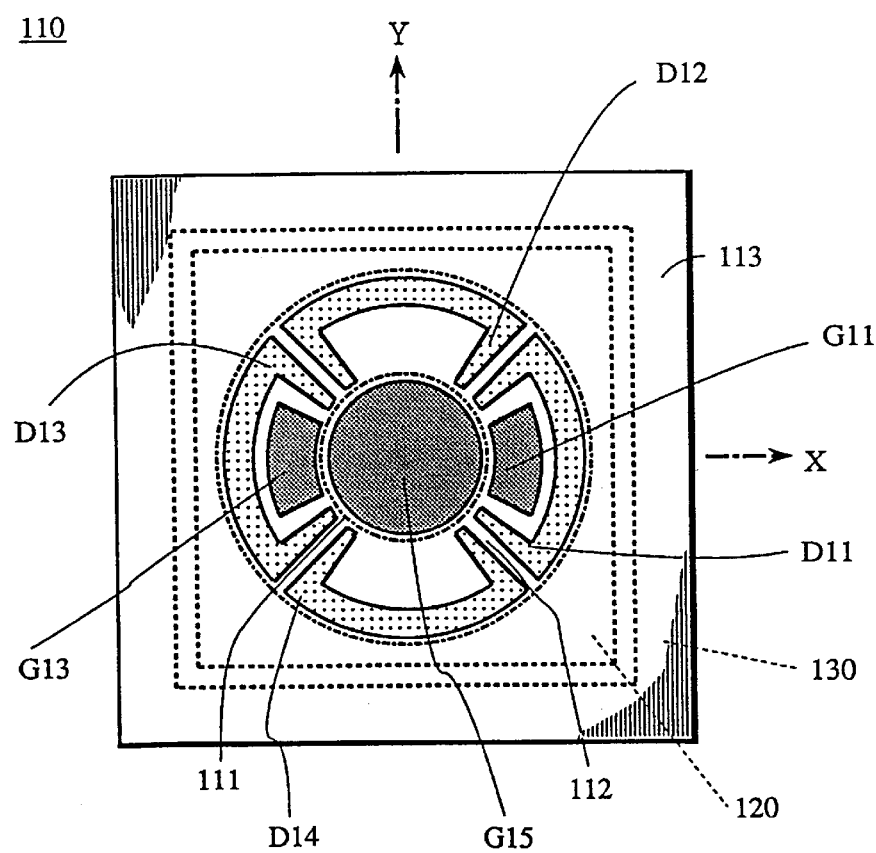
FIG. 22 is a top view of flexible substrate 110 in the angular velocity sensor shown in FIG. 21, wherein the cross section cut along the X-axis of the flexible substrate 110 shown in FIG. 22 is shown in FIG. 21.

Subsequently, a structure and a detection operation of an angular velocity sensor 180, which is a modified embodiment of the above-described angular velocity sensor 100, will now be described with reference to the side cross sectional view of FIG. 21 and the top view of FIG. 22. FIG. 22 is a view when viewed from the top of the flexible substrate 110 of the angular velocity sensor 180 shown in FIG. 21, where the cross section cut along the X-axis of the flexible substrate 110 illustrated in FIG. 22 is shown in FIG. 21. A difference in structure between the angular velocity sensor 100 shown in FIGS. 19 and 20 and the angular velocity sensor shown in FIGS. 21 and 22 is only arrangement of respective electrode layers on the flexible substrate 110. Namely, in the angular velocity sensor 180, the electrode layers G12 and G14 provided in the angular velocity sensor 100 are omitted as shown in FIG. 22. Moreover, the electrode layer D15 which has functioned as a displacement detector in the angular velocity sensor 100 is replaced by the electrode G15 functioning as a force generator in the angular velocity sensor 180.

The great difference in operation between the angular velocity sensor 100 and the angular velocity sensor 180 is that the former causes the weight body 120 to undergo a circular movement within the XY-plane, whereas the latter causes the weight body 120 to undergo a circular movement within the XZ-plane. As previously described, when a predetermined voltage is applied across the electrode layers G11 and E10, both the electrodes are caused to undergo Coulomb force therebetween. As a result, bending takes place in the flexible substrate 110. Thus, the weight body 120 is caused to undergo displacement in the positive direction of the X-axis. Similarly, when a predetermined voltage is applied across the electrode layers G15 and E10, both the electrodes are caused to undergo Coulomb attractive force therebetween. As a result, the weight body 120 is caused to undergo displacement in the positive direction of the Z-axis. Further, when a predetermined voltage is applied across the electrode layers G13 and E10, both the electrodes are caused to undergo Coulomb force therebetween. As a result, bending takes place in the flexible substrate 110. Thus, the weight body 120 is caused to undergo displacement in the negative direction of the X-axis.

Accordingly, if sine wave voltages slightly shifted in phase are applied to the respective electrode layers, the weight body 120 gradually moves, in FIG. 21, from the right position to the upper position in a manner to depict a circular arc, and moves to the left position in a manner to depict a circular arc. In this way, the weight body 120 moves on the semicircular orbit. Moreover, as described above, an operation for applying voltage across a pair of electrodes is equivalent with an operation for delivering charges having polarities different from each other to the pair of electrodes. In contrast, if charges of the same polarity are delivered to the pair of electrodes, the pair of electrodes are caused to undergo Coulomb repulsive force therebetween. In view of the above, if charges of the same polarity are delivered to the electrode layer G15 and the electrode layer E10 so that they are caused to undergo Coulomb repulsive force therebetween, the weight body 120 moves in turn to the lower position in FIG. 21. Therefore, when suitable voltage signals are respectively delivered to the electrode layers G11, G13, G15, the weight body 120 is permitted to undergo a circular movement along the circular orbit 121 indicated by an arrow in FIG. 21. In addition, as previously described, if both the Coulomb attractive force and the Coulomb repulsive force are used in combination, more efficient circular movement can be made.

Eventually, in the above-mentioned angular velocity sensor 180, there is employed the configuration in which force generators (respective capacitance elements) for applying force in the direction along the Z-axis are respectively disposed in the positive and negative areas of the X-axis and the area in the vicinity of the origin O to allow these force generators to be periodically operative to thereby allow the weight body 120 to undergo an orbital movement within the XZ-plane.

On the other hand, since the arrangement of the electrode layers D11 to D14 functioning as a displacement detector is entirely the same as the arrangement of the previously described angular velocity sensor 100. Therefore, it is possible to detect force components ±Fx in the X-axis direction and force components ±Fy in the Y-axis direction. By detecting force components ±Fx in the X-axis direction and force components ±Fy in the Y-axis direction applied to the weight body 120 at a moment when the weight body 120 passes through the X-axis or the Z-axis while allowing the weight body 120 to carry out a circular movement within the XZ-plane, it is possible to detect all of angular velocity components ωx, ωy, ωz about the three axes.

§7 General Property of the Piezoelectric Element

Subsequently, an embodiment using a piezoelectric element as driving means and detecting means will be described. Generally, a piezoelectric element has a property that when a force is applied in a predetermined direction, charges of a predetermined polarity are produced and it also has a property that when charges of a predetermined polarity are delivered, a force is produced in a predetermined direction in a manner opposite to the above. A direction of the force or the polarity of charges respectively changes in dependency upon a polarization characteristics that individual piezoelectric elements have. Explanation will now be given in connection with a property inherent in the piezoelectric element 51 shown in FIGS. 23A and 23B and the piezoelectric element 52 shown in FIGS. 24A, 24B. In all these figures, the side cross sectional views are illustrated, wherein an upper electrode layer A is formed on an upper surface of the respective piezoelectric elements and a lower electrode layer B is formed on a lower surface thereof.

Figure 23A:
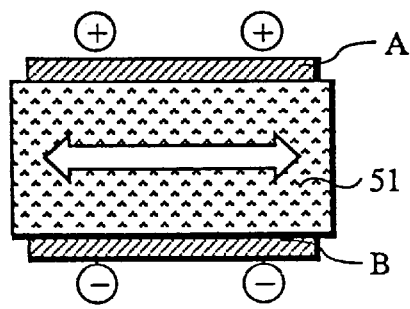
FIGS. 23A and 23B are views for explaining polarization characteristic of the piezoelectric element of the type I utilized for the angular velocity sensor according to this invention.
Figure 23B:
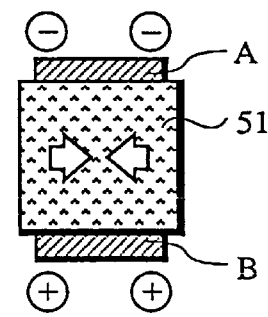

The piezoelectric element 51 has a property that in the case where a force in a direction to laterally expand is applied from the external as indicated by the arrows in FIG. 23A, positive charges and negative charges are respectively produced at the upper electrode layer A and the lower electrode layer B and that in the case where a force in a direction to laterally contract is applied from the external as indicated by the arrows in FIG. 23B in a manner opposite to the above, negative charges and positive charges are respectively produced at the upper electrode layer A and the lower electrode layer B. While the property that when a force is applied in a predetermined direction, charges of a predetermined polarity are produced has been explained in the above, a piezoelectric element also has a property that when charges of a predetermined polarity are delivered, a force is produced in a predetermined direction in a manner opposite to the above. Namely, when positive charges and negative charges are respectively delivered to the upper electrode layer A and the lower electrode layer B with respect to the piezoelectric element 51, a force in a direction to laterally expand is produced as indicated by the arrows in FIG. 23A. In contrast, when negative charges and positive charges are respectively delivered to the upper electrode layer A and the lower electrode layer B, a force in a direction to laterally contract is produced as indicated by the arrows in FIG. 23B. A piezoelectric element having such a polarization characteristic will be called a piezoelectric element of the type I in this specification.

Figure 24A:
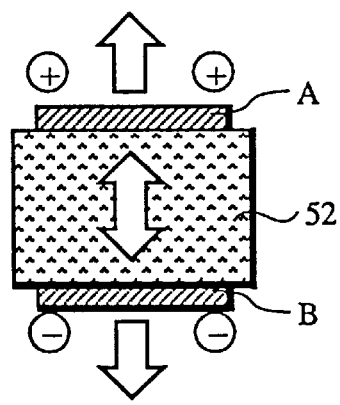
FIGS. 24A and 24B are views for explaining polarization characteristic of the piezoelectric element of the type II utilized for the angular velocity sensor according to this invention.
Figure 24B:
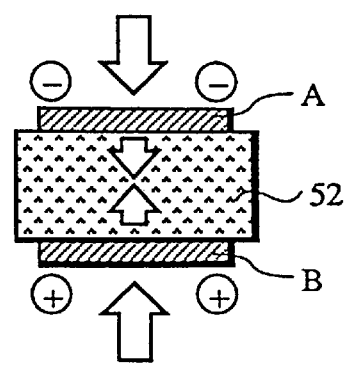

On the other hand, piezoelectric element 52 shown in FIGS. 24A and 24B has a property slightly different from that of the above-described piezoelectric element 51. Namely, the piezoelectric element 52 has a property that in the case where a force in a direction to longitudinally expand is applied from the external as indicated by the arrows in FIG. 24A, positive charges and negative charges are respectively produced at the upper electrode layer A and the lower electrode layer B and that in the case where a force in a direction to longitudinally contract is applied from the external as indicated by the arrows in FIG. 24B in a manner opposite to the above, negative charges and positive charges are respectively produced at the upper electrode layer A and the lower electrode layer B. While the property that when a force is applied in a predetermined direction, charges of predetermined polarity are produced has been explained in the above, a piezoelectric element also has a property that when charges of predetermined polarity are delivered, a force is produced in a predetermined direction in a manner opposite to the above. Namely, when positive charges and negative charges are respectively delivered to the upper electrode layer A and the lower electrode layer B with respect to the piezoelectric element 52, a force in a direction to longitudinally expand is produced as indicated by the arrows in FIG. 24A. In contrast, when negative charges and positive charges are respectively delivered to the upper electrode layer A and the lower electrode layer B, a force in a direction to longitudinally contract is produced as indicated by the arrows in FIG. 24B. A piezoelectric element having such polarization characteristic is called a piezoelectric of the type II in this specification.

As such a piezoelectric element, e.g., piezoelectric ceramic, etc. is widely used. In recent technologies, specific polarization processing is implemented, thereby making it possible to freely manufacture piezoelectric ceramic having desired polarization characteristic. In addition, polarization processing can be made for a physically single piezoelectric ceramic piece so that a polarization characteristic differs in portion to portion and it is possible to obtain a piezoelectric element having a plurality polarization characteristics which are different in respective portions.

As stated above, a piezoelectric element has a function to carry out conversion of "force to charge" and a function to carry out conversion of "charge to force". In the embodiments described below, the former function is utilized as means for detecting Coriolis force (displacement detector), and the latter function is utilized as driving means (force generator) for allowing a weight body to undergo an orbital movement.

Figure 25:
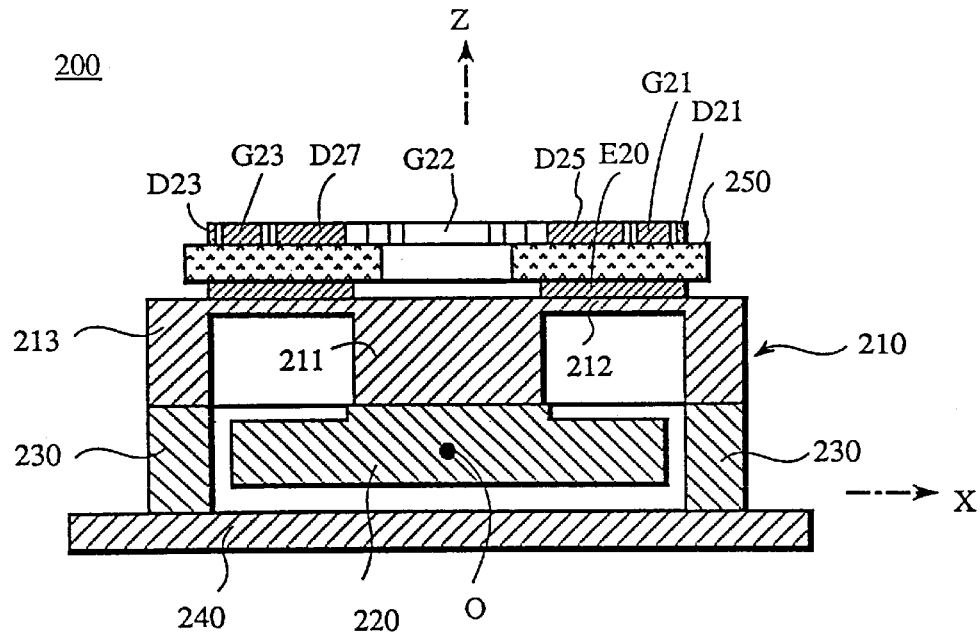
FIG. 25 is a side cross sectional view showing an embodiment of an angular velocity sensor wherein the force generator and the displacement detector are constituted by a piezoelectric element of the type I shown in FIGS. 23A and 23B.

§8 Embodiment of Angular Velocity Sensor Utilizing a Piezoelectric Element of the Type I An angular velocity sensor 200 of which side cross section is shown in FIG. 25 is a sensor of an embodiment in which force generators and displacement detectors are constituted by piezoelectric elements having the above-described polarization characteristic of the type I. A configuration of the fundamental portion of the angular velocity sensor 200 is substantially the same as that of the angular velocity sensor 100 shown in FIG. 19. Namely, a groove in an annular form is formed on a lower surface of a flexible substrate 210. Since the thickness of the portion where the groove is formed is thin, this thin portion forms a flexible portion 212 having flexibility. Moreover, an inside portion surrounded by the flexible portion 212 forms a working portion 211 and an outside portion of the flexible portion 212 forms a fixed portion 213.

A weight body 220 in a block form is fixed on the lower surface of the working portion 211 and the fixed portion 213 is supported by a pedestal 230. Further, the pedestal 230 is fixed on a base substrate 240. It should be noted that components formed on an upper surface of the flexible substrate 210 are different from those of the previously described angular velocity sensor 100. Namely, a common electrode layer E20 in a washer form is fixed on the upper surface of the flexible substrate 210. A piezoelectric element 250 similarly in a washer form is fixed thereon. Twelve electrode layers G21 to G24, D21 to D28 are arranged on an upper surface of the piezoelectric element 250. In this example, the piezoelectric element 250 is comprised of piezoelectric ceramic having the polarization characteristic of the type I shown in FIGS. 23A and 23B.

Figure 26:
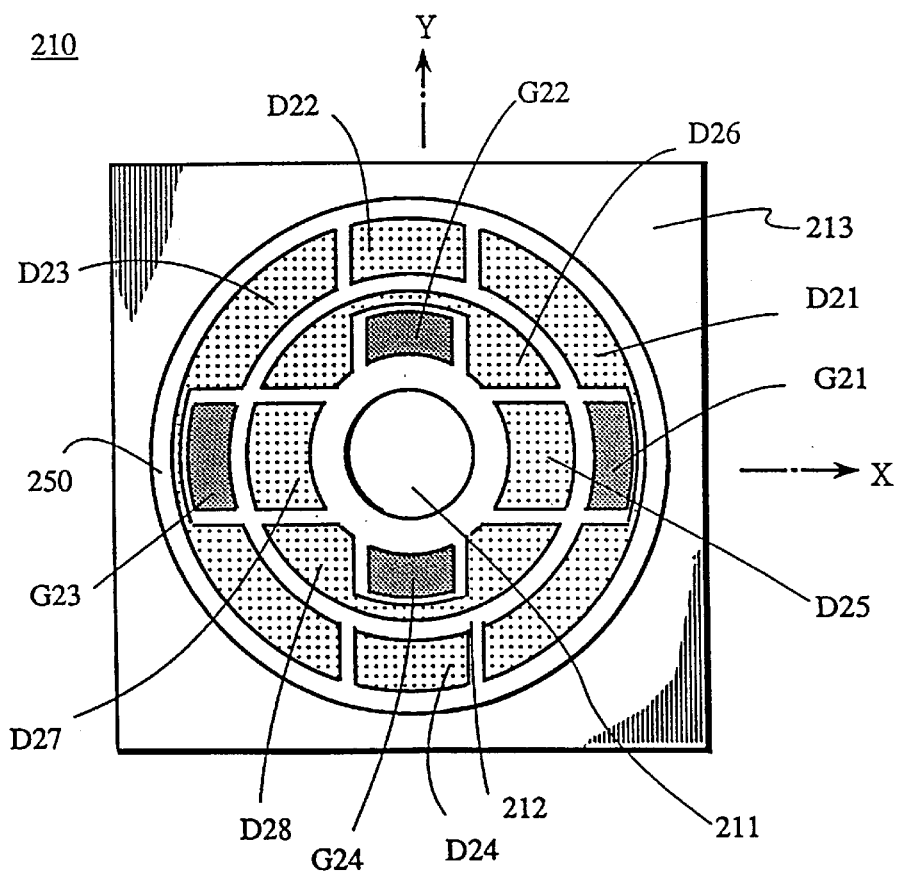
FIG. 26 is a top view of flexible substrate 210 in the angular velocity sensor shown in FIG. 25, wherein the cross section cut along the X-axis of the flexible substrate 210 shown in FIG. 26 is shown in FIG. 25.

The top view of the flexible substrate 210 is shown in FIG. 26. The cross section cut along the X-axis of the flexible substrate 210 shown in FIG. 26 is shown in FIG. 25. In FIG. 26, shapes of twelve electrode layers provided on the piezoelectric element 250 in washer form is clearly illustrated. A circular opening portion exists at a center of the piezoelectric element 250 and a central portion 211 of the flexible substrate 210 can be seen. The common electrode layer E20 in washer form is disposed on the lower surface of the piezoelectric element 250, but this electrode layer is not shown in FIG. 26. It is to be noted that while hatching is implemented to portions of respective electrode layers in FIG. 26, this is carried out so that pattern recognition of respective electrode layers can become easy. Therefore, the hatchings in FIG. 26 are not for indicating a cross section.

Among the twelve electrode layers shown in FIG. 26, the electrode layers G21 to G24 are electrodes utilized as a force generator and the electrode layers D21 to D28 are electrodes utilized as a displacement detector. Though the piezoelectric element 250 and the common electrode layer E20 are respective unitary elements, since the twelve electrode layers formed on the piezoelectric element 250 are respectively individually independent, it is regarded that there are twelve sets of independent piezoelectric elements when consideration is made in connection with an operation. In this example, an XYZ three-dimensional coordinate system having an origin O at the center of gravity position of the weight body 220 is defined as shown in FIG. 25 thus to carry out the following explanation. As shown in FIG. 26, the electrode layers G21 to G24 and the electrode layers D21 to D28 are all positioned on the X-axis or the Y-axis in this coordinate system and take a shape linearly symmetrical with respect to these axes.

Let first demonstrate that when charges are periodically delivered to the electrode layers G21 to G24 in the angular velocity sensor 200, the weight body 220 can be caused to undergo a circular movement within the XY-plane. As previously described, the piezoelectric element 250 is a piezoelectric element of the type I having a polarization characteristic as shown in FIGS. 23A and 23B. In view of the above, if voltages are supplied so that negative charges and positive charges are respectively supplied to the electrode layer G21 and the common electrode layer E20, a force in a direction to laterally contract is produced as shown in FIG. 23B at a portion under the electrode layer G21 of the piezoelectric element 250. On the other hand, if voltages are supplied so that positive charges and negative charges are respectively supplied to the electrode layer G23 and the common electrode layer E20, a force in a direction to laterally expand is produced as shown in FIG. 23A at a portion under the electrode layer G23 of the piezoelectric element 250. As stated above, when contracting force and expanding force are respectively produced at the lower portion of the electrode layer G21 and the lower portion of the electrode layer G23, such a bending to allow the weight body 220 to undergo displacement in the positive direction of the X-axis is produced in the flexible substrate 210. In addition, if the polarity of charges supplied to the respective electrode layers is inverted, such a bending to allow the weight body 220 to undergo displacement in the negative direction of the X-axis can be produced in a manner opposite to the above.

As stated above, to supply predetermined charges to the electrode layers G21, G23 arranged on the X-axis is equivalent to operate the force generator G1 or G3 in the model shown in FIG. 18. Similarly, to supply predetermined charges to the electrode layers G22, G24 arranged on the Y-axis is equivalent to operate the force generator G2 or G4 in the model shown in FIG. 18. Accordingly, if periodical operation signals shifted in phase are given (applied) to the electrode layers G21 to G24, the weight body 220 is permitted to undergo a circular movement within the XY-plane. It is to be noted that, from a practical point of view, when polarization characteristics of the piezoelectric element 250 are inverted (a polarity of charges produced in upper and lower directions is caused to be reversed) in particular portions, voltage supply for carrying out circular movement is facilitated.

Eventually, there is employed in this embodiment the configuration in which force generators (some respective portions of the piezoelectric element 250) for applying force in the direction along the X-axis are respectively arranged in the positive and negative areas of the X-axis and force generators (the other respective portions of the piezoelectric element 250) for applying force in the direction along the Y-axis are respectively arranged in the positive and negative areas of the Y-axis. When these force detectors are periodically operated, the weight body 220 is caused to undergo an orbital movement within the XY-plane.

In accordance with the previously described detection principle, if force components ±Fx, ±Fy, ±Fz in the respective axial directions exerted on the weight body 220 in the state where the weight body 220 is caused to undergo a circular movement in a manner as stated above, it is possible to obtain angular velocity components ±ωx, ωy, ±ωz (signs indicate rotational direction) about respective axes. That is, force components ±Fx, ±Fy, ±Fz in the respective axial directions exerted on the weight body 220 can be detected as displacements in the respective axial directions as previously described. Eight sets of piezoelectric elements put between the electrode layers D21 to D28 and the common electrode layer E20 shown in FIG. 26 function as displacement detectors in respective axial directions. In this embodiment, the electrode layers D21, D23 are used for detecting displacement relating to the X-axis direction (corresponding to force ±Fx), the electrode layers D26, D28 are used for detecting displacement relating to the Y-axis direction (corresponding to force ±Fy), and the electrode layers D22, D24, D25, D27 are used for detecting displacement relating to the Z-axis direction (corresponding to force ±Fz).

For example, in the case where the weight body 220 is caused to undergo displacement in the positive direction of the X-axis, bending of the flexible substrate 210 is transmitted to the piezoelectric element 250. As a result, a portion located at a lower part of the electrode layer D21 of the piezoelectric element 250 is deformed in a manner to contract, and a portion positioned at a lower part of the electrode layer D23 is deformed in a manner to expand in a lateral direction. Accordingly, negative charges and positive charges are respectively produced at the electrode layer D21 and the electrode layer D23 on the basis of the polarization characteristic shown in FIGS. 23A and 23B. By measuring these charges produced, it is possible to obtain displacement in the positive direction of the X-axis of the weight body 220.

Moreover, in the case where the weight body 220 is caused to undergo displacement in the negative direction of the X-axis, polarity of charges is inverted as compared to the above-described case. Therefore, when charges produced with respect to the electrode layers D21, D23 are measured, it is possible to detect quantity of displacement in the X-axis direction of the weight body 220. In more practical sense, if how many charges are produced when the weight body 220 is actually caused to undergo displacement is actually measured in a trial manufactured sensor, it is possible to obtain a relationship between quantity of charges produced and quantity of displacement on the basis of the actual measured value.

Similarly, by measuring charges produced with respect to the electrode layers D26, D28, it becomes possible to detect quantity of displacement in the Y-axis direction of the weight body 220. It should be noted that the reason why the electrode layers D26, D28 arranged inside are used instead of using the electrode layers D22, D24 arranged outside is that it is necessary to use the electrode layers D22, D24 for detecting displacement quantity in the Z-axis direction described below. From a theoretical point of view, even if the electrode layers D22, D24 arranged outside are used to carry out the detection in the Y-axis, any problem does not take place.

Meanwhile, in this embodiment, four electrode layers D22, D24, D25, D27 are used for detection of displacement quantity in the Z-axis direction. As shown in FIG. 26, the electrode layers D22, D24 are electrode layers arranged outside, whereas the electrode layers D25, D27 are electrode layers arranged inside. It is preferable that electrode layers arranged outside and electrode layers arranged inside are used in combination for detection of displacement quantity in the Z-axis direction. This is because when the weight body 220 is caused to undergo displacement in the positive Z-axis direction (in the upper direction in FIG. 25) in the angular velocity sensor 200, the inside portion of the piezoelectric element 250 expands in a lateral direction and the outside portion contracts in the lateral direction. Accordingly, positive charges and negative charges are respectively produced at the electrode layers D25, D27 arranged inside and the electrode layers D22, D24 arranged outside on the basis of the polarization characteristic shown in FIGS. 23A and 23B. In contrast, when the weight body 220 is caused to undergo displacement in the negative Z-axis direction (in the lower direction in FIG. 25) in a manner opposite to the above, the inside portion of the piezoelectric element 250 contracts in a lateral direction and the outside portion thereof expands in the lateral direction. Accordingly, negative charges and positive charges are respectively produced at the electrode layers D25, D27 arranged inside and the electrode layers D22, D24 arranged outside on the basis of the polarization characteristic shown in FIGS. 23A and 23B. Accordingly, when charges produced with respect to the electrode layers D22, D24, D25, D27 are measured, it is possible to detect displacement quantity in the Z-axis direction of the weight body 220.

It is to be noted since the respective electrode layers D21 to D28 constituting displacement detectors are all linearly symmetrical with respect to the X-axis or the Y-axis as shown in FIG. 26, there is no influence of other axis components in carrying out displacement detection in the respective axial directions. For example, since the electrode layers D21, D23 used for carrying out displacement detections in the X-axis direction are linearly symmetrical with respect to the X-axis, in the case where displacement in the Y-axis direction takes place, an area of one half under the electrode layers D21, D23 expands in lateral direction but an area of the other half contracts. Accordingly, charges produced under the electrode layers D21, D23 are canceled as a whole.

Eventually, there is employed in this embodiment the configuration that displacement detectors (some respective portions of the piezoelectric element 250) for detecting displacements in directions along the respective axes are respectively arranged in the positive and negative areas of the X-axis and in the positive and negative areas of the Y-axis. Then a Coriolis force exerted in the X-axis direction at the weight body 220 is detected by using the displacement detectors arranged in both the positive and negative areas of the X-axis and a Coriolis force exerted in the Y-axis direction at the weight body 220 is detected by using the displacement detectors arranged in both the positive and negative areas of the Y-axis.

In order to detect angular velocity components ωx, ωy, ωz about the respective axes by the angular velocity sensor 200 as described above, predetermined charges are periodically delivered to the electrode layers G21 to G24 in the state where respective delivering phases are shifted, thus allowing the weight body 220 to undergo a circular movement on the XY-plane. Further, when an approach is employed to measure charges produced on the electrode layers D22, D24, D25, D27 at the moment when the weight body 220 passes through the X-axis and detect displacement in the Z-axis direction of the weight body 220, this displacement corresponds to a force Fz exerted in the Z-axis direction to the weight body 220, thus making it possible to obtain an angular velocity component ωx about the X-axis on the basis of the detection principle at the point Px shown in FIG. 13.

Moreover, if charges produced on the electrode layers D21, D23 are measured to detect displacement in the X-axis direction of the weight body 220, this displacement corresponds to a force Fx exerted in the X-axis direction to the weight body 220, thus making it possible to obtain an angular velocity ωz about the Z-axis on the basis of the detection principle at the point Px shown in FIG. 14.

Further, if an approach is employed to measure charges produced on the electrode layers D22, D24, D25, D27 at the moment when the weight body 220 passes through the Y-axis and detect displacement in the Z-axis direction of the weight body 220, this displacement corresponds to a force Fz exerted in the Z-axis direction to the weight body 220, thus making it possible to obtain an angular velocity ωy about the Y-axis on the basis of the detection principle at the point Py shown in FIG. 13. Alternatively, if an approach is employed to measure charges produced on the electrode layers D26, D28 at the same time point as above and detect displacement in the Y-axis direction of the weight body 220, this displacement corresponds to a force Fy exerted in the Y-axis direction to the weight body 220, thus making it possible to similarly detect an angular velocity ωz about the Z-axis on the basis of the detection principle at the point Py shown in FIG. 14.

While, in the above-described embodiment, the twelve individual electrode layers G21 to G24, D21 to D28 are arranged on the upper surface of the piezoelectric element 250 and the single common electrode layer E20 is arranged on the lower surface thereof, there may be employed a configuration in which the single common electrode layer E20 is arranged on the upper surface and the twelve individual electrode layers G21 to G24, D21 to D28 are arranged on the lower surface in a manner opposite to the above. Alternatively, there may be employed a configuration such that twelve individual electrode layers are arranged on the upper surface and the other twelve individual electrode layers are arranged on the lower surface of the piezoelectric element 250 without using a common electrode layer. It should be noted that it is preferable to form the common electrode layer for the purpose of simplifying wiring.

Figure 27:
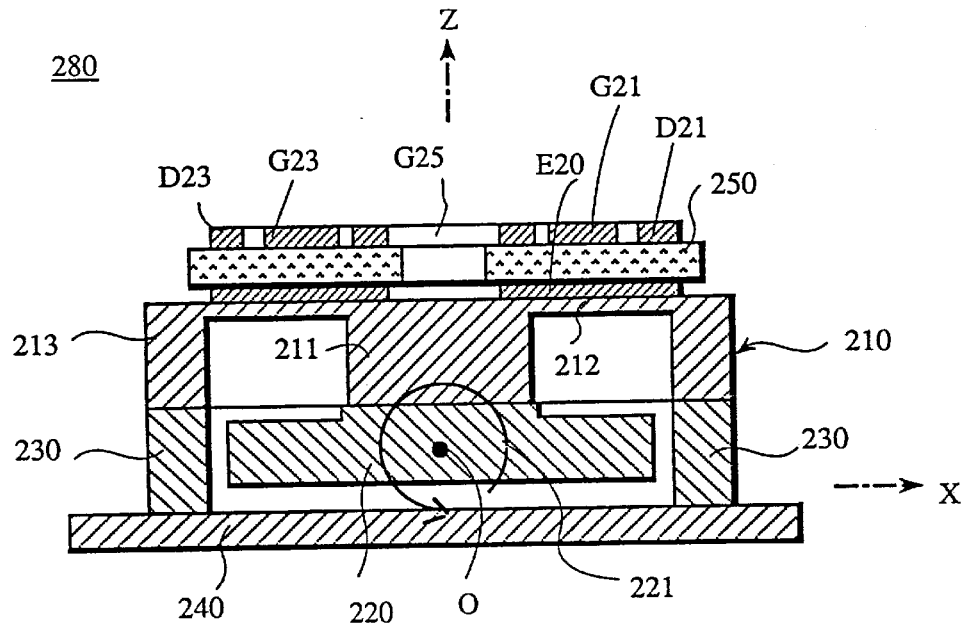
FIG. 27 is a cross sectional view showing a further embodiment of an angular velocity sensor wherein the force generator and the displacement detector are constituted by a piezoelectric element of the type I shown in FIGS. 23A and 23B.
Figure 28:
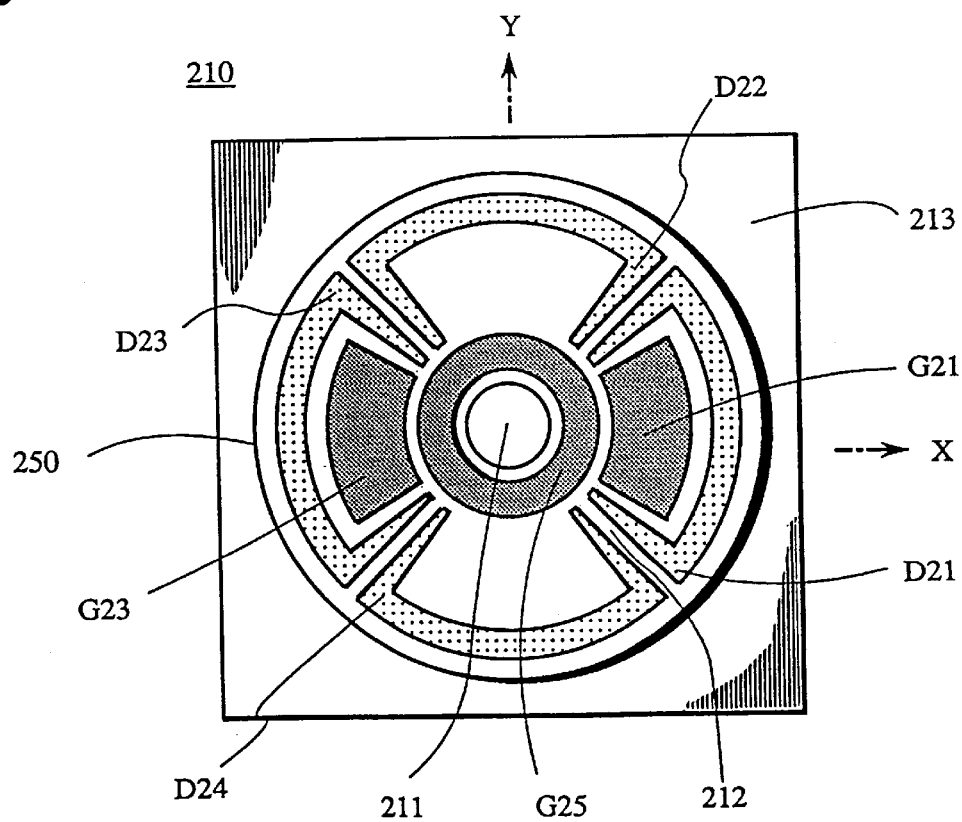
FIG. 28 is a top view of flexible substrate 210 in the angular velocity sensor shown in FIG. 27, wherein the cross section cut along the X-axis of the flexible substrate 210 shown in FIG. 28 is shown in FIG. 27.

§9 Another Embodiment of Angular Velocity Sensor Utilizing the Piezoelectric Element of the Type I Subsequently, a structure and a detecting operation of an angular velocity sensor 280 corresponding to a modification of the above-described angular velocity sensor 200 will be described with reference to the side cross sectional view of FIG. 27 and the top view of FIG. 28. FIG. 28 is a view when a flexible substrate 210 of the components of the angular velocity sensor 280 shown in FIG. 27 is viewed from the top and the cross section cut along the X-axis of the flexible substrate 210 shown in FIG. 28 is shown in FIG. 27. The difference in structure between the angular velocity sensor 200 shown in FIGS. 25 and 26 and the angular velocity sensor 280 shown in FIGS. 27 and 28 resides in only an arrangement of respective electrode layers on the piezoelectric element 250. Namely, the inside electrode layers G22, G24, D25 to D28 provided in the angular velocity sensor 200 are replaced by a single electrode layer G25 as shown in FIG. 28 in the angular velocity sensor 280. It is to be noted that the outside electrode layers G21, G23, D21 to D24 are somewhat different in shape from those of the angular velocity sensor 200, but are not changed in essence. In this angular velocity sensor 280, the electrode layers G21, G23, G25 function as a force generator and the electrode layers D21 to D24 function as a displacement detector.

Great difference in operation between the angular velocity sensor 200 and the angular velocity sensor 280 is such that, in the former, the weight body 220 is caused to undergo a circular movement within the XY-plane, whereas in the latter, the weight body 220 is caused to undergo a circular movement within the XZ-plane. As previously described, when predetermined charges are delivered to the electrode layers G21, G23 with the common electrode layer E20 being maintained at a reference potential, the weight body 220 is permitted to undergo displacement in the X-axis direction. In this angular velocity sensor 280, predetermined charges are further delivered to the electrode layer G25 so that the weight body 220 can be caused to undergo displacement also in the Z-axis direction. Namely, when positive charges are delivered to the electrode layer G25, a force in a direction to laterally expand is produced at a piezoelectric element portion under the electrode layer G25 on the basis of the polarization characteristic shown in FIG. 23A. As a result, a bending such that the weight body 220 is caused to undergo displacement in the positive Z-axis direction (in the upper direction of FIG. 27) is produced. In contrast, when negative charges are delivered to the electrode layer G25, a force in a direction to laterally contract is produced at the piezoelectric element portion under the electrode layer G25. As a result, a bending such that the weight body 220 is caused to undergo displacement in the negative Z-axis direction (in the lower direction in FIG. 27) is produced. Accordingly, if charges are respectively suitably delivered to the electrode layers G21, G23, G25, the weight body 220 is permitted to undergo a circular movement along a circular orbit 221 as indicated by an arrow in FIG. 27.

Eventually, in this angular velocity sensor 280, there is employed the configuration in which force generators (some respective portions of the piezoelectric element 250) for applying force in the direction along the X-axis are respectively arranged in the positive and negative areas of the X-axis and the area in the vicinity of the origin O to allow these force generators to be periodically operative to thereby allow the weight body 220 to undergo an orbital movement within the XZ-plane. On the other hand, since the arrangement of the electrode layers D21 to D24 functioning as a displacement detector is substantially similar to the arrangement of the previously described angular velocity sensor 200, it is possible to detect a force component ±Fx in the X-axis direction and a force component ±Fy in the Y-axis direction by using the electrode layers D21 to D24. When an approach is employed to detect a force component ±Fx in the X-axis direction and a force component ±Fy in the Y-axis direction exerted on the weight body 220 at the moment when the weight body 220 passes through the X-axis or the Z-axis while allowing the weight body 220 to undergo a circular movement within the XZ-plane in this way, it is possible to detect all of angular velocity components ωx, ωy, ωz about the three axes on the basis of the previously described detection principle.

It is a matter of course that, also in this embodiment, similarly to the embodiment which has been described in the chapter §8, a single common electrode layer may be provided on the upper surface of the piezoelectric element 250 and seven individual independent electrode layers may be respectively provided on the lower surfaces. Alternatively, there may be employed a configuration such that seven individual electrode layers are arranged on the upper surface and the other seven individual electrode layers are arranged on the lower surface of the piezoelectric element 250 without using a common electrode layer.

Figure 29:
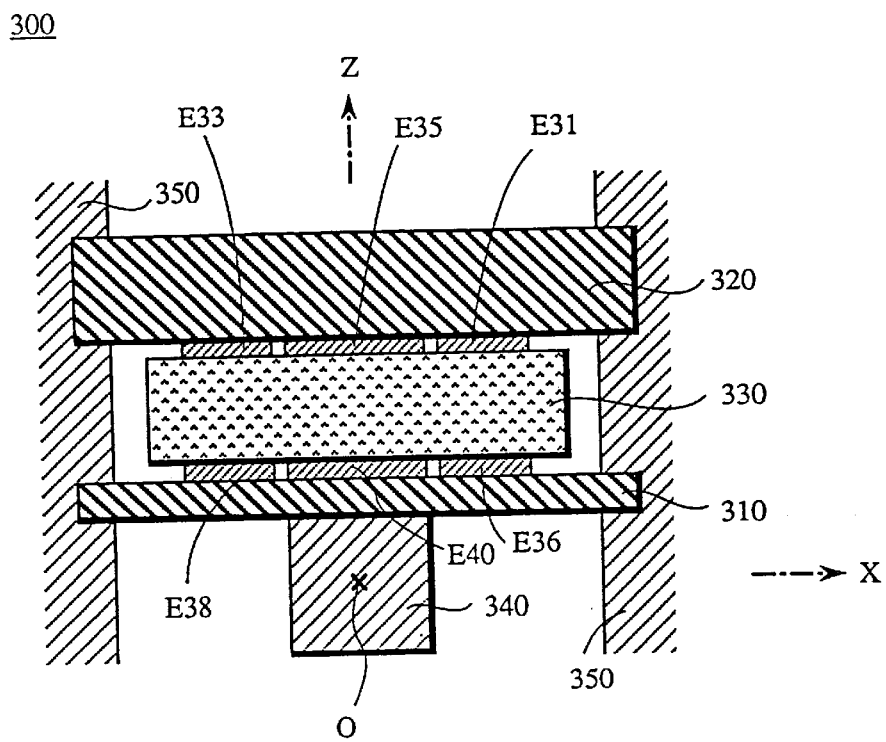
FIG. 29 is a side cross sectional diagram showing an embodiment of an angular velocity sensor wherein the force generator and the displacement detector are constituted by a piezoelectric element of the type II shown in FIGS. 24A and 24B.

§10 Embodiment of Angular Velocity Sensor Utilizing the Piezoelectric Element of the Type II An angular velocity sensor 300 of which side cross section is shown in FIG. 29 is an angular velocity sensor of an embodiment in which force generators and displacement detectors are constituted by a piezoelectric element having the polarization characteristic of the type II shown in FIGS. 24A, 24B. This angular velocity sensor 300 is of a structure in which a disk-shaped piezoelectric element 330 having the polarization characteristic of the type II is interposed between a disk-shaped flexible substrate 310 and a disk-shaped fixed substrate 320. A columnar shaped weight body 340 is fixed on a lower surface of the flexible substrate 310. Moreover, an outer circumferential portion of the flexible substrate 310 and an outer circumferential portion of the fixed substrate 320 are both supported by a sensor casing 350.

Five upper electrode layers E31 to E35 (only a portion thereof is illustrated in FIG. 29) are arranged on an upper surface of the piezoelectric element 330. Similarly, five lower electrode layers E36 to E40 (only a portion thereof is similarly illustrated) are arranged on a lower surface of the piezoelectric element 330. Upper surfaces of the upper electrode layers E31 to E35 are fixed on a lower surface of the fixed substrate 320. Lower surfaces of the lower electrode layers E36 to E40 are fixed on an upper surface of the flexible substrate 310. Since the fixed substrate 320 has sufficient rigidity, there is no possibility that any bending may take place. On the other hand, the flexible substrate 310 has flexibility and thus functions as so called a diaphragm. An XYZ three-dimensional coordinate system having an origin O at the center of gravity position of the weight body 340 as shown in FIG. 29 is defined to carry out the subsequent explanation. FIG. 29 corresponds to the side cross sectional view cut along the XZ-plane of the angular velocity sensor 300.

Figure 30:
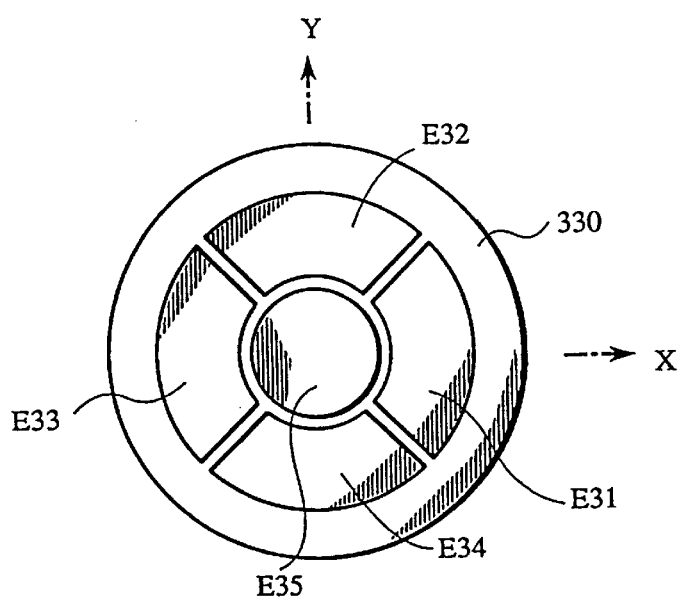
FIG. 30 is a top view of piezoelectric element 330 in the angular velocity sensor shown in FIG. 29.
Figure 31:
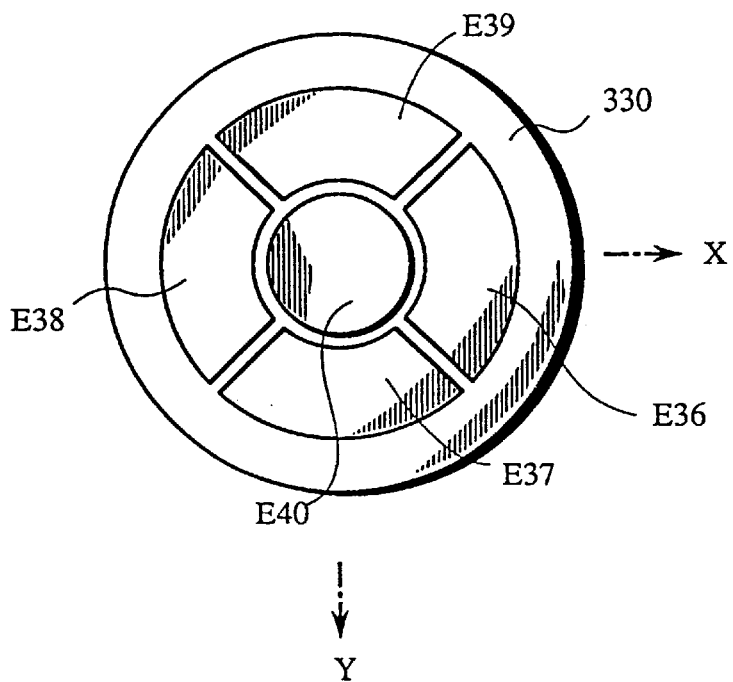
FIG. 31 is a bottom view of piezoelectric element 330 in the angular velocity sensor shown in FIG. 29.

FIG. 30 is a top view showing the upper surface of the piezoelectric element 330 and the upper electrode layers E31 to E35 and FIG. 31 is a bottom view showing the lower surface of the piezoelectric element 330 and the lower electrode layers E36 to E40. As shown in FIG. 30, the upper electrode layers E31 to E34 are all fan-shaped. These electrode layers are positioned on the X-axis or the Y-axis in this coordinate system and take a shape linearly symmetrical with respect to these axes. Moreover, the upper electrode layer E35 is circular and is disposed just at a position of the origin. On the other hand, the lower electrode layers E36 to E40 respectively take the same shapes as those of the upper electrode layers E31 to E35 as shown in FIG. 31 and are arranged at positions opposite to the upper electrode layers E31 to E35. It is to be noted that the lower electrode layers E36 to E40 may be replaced by a single common electrode layer. In addition, if the flexible substrate 310 is constituted by conductive material, the flexible substrate 310 itself can be used as a single common electrode layer so that it becomes unnecessary to constitute physically independent lower electrode layers.

As previously described, the piezoelectric element 330 is a piezoelectric element of the type II having a polarization characteristic as shown in FIGS. 24A and 24B. In view of the above, if, e.g., a negative voltage is applied to the electrode layer E31 and a positive voltage is applied to the electrode layer E36, a force in a direction to longitudinally contract is produced. Moreover, if a positive voltage is applied to the electrode layer E33 and a negative voltage is applied to the electrode layer E38, a force in a direction to longitudinally expand is produced. Accordingly, any one of these voltage supply operations or both the voltage supply operations is or are carried out, thereby permitting the weight body 340 to undergo displacement in a positive direction along the X-axis. Namely, by applying predetermined voltages to the respective electrode layers E31, E33, E36, E38 arranged on the X-axis, displacement along the X-axis direction can be produced with respect to the weight body 340. Similarly, by applying predetermined voltages to the respective electrode layers E32, E34, E37, E39 arranged on the Y-axis, displacement along the Y-axis direction can be produced with respect to the weight body 340. In view of the above, when periodic voltages shifted in phase are applied to these respective electrodes, it is possible to permit the weight body 340 to undergo a circular movement within the XY-plane.

Eventually, in this angular velocity sensor 300, there is employed the configuration in which force generators (some respective portions of the piezoelectric element 330) for applying a force in the direction along the Z-axis are respectively disposed in the positive and negative areas of the X-axis and the positive and negative areas of the Y-axis. When these force generators are periodically operated, it is possible to allow the weight body 340 to undergo an orbital movement within the XY-plane.

Moreover, in this angular velocity sensor 30b, the weight body 340 is permitted to undergo a circular movement within the XZ-plane, instead of the XY-plane. For example, if a negative voltage is applied to the electrode layer E35 and a positive voltage is applied to the electrode layer E40, a force in a direction to longitudinally contract is produced as shown in FIG. 24B. Accordingly, the weight body 340 is moved in the positive Z-axis direction (in the upper direction in FIG. 29). In contrast, if a positive voltage is applied to the electrode layer E35 and a negative voltage is applied to the electrode layer E40, a force in a direction to longitudinally expand is produced as shown in FIG. 24A. Accordingly, the weight body 340 is moved in the negative Z-axis direction (in the lower direction in FIG. 29). Eventually, when predetermined voltages are applied to the electrode layers E35, E40 arranged at the origin position, it is possible to produce displacement along the Z-axis direction with respect to the weight body 340. In view of the above, if periodical voltages shifted in phase are applied to the respective electrode layers E31, E33, E36, E38 arranged on the X-axis and the electrode layers E35, E40 arranged at the origin position, the weight body 340 is also permitted to undergo a circular movement within the XZ-plane.

In this case, there is employed the configuration in which force generators (some respective portions of the piezoelectric element 330) for applying force in a direction along the Z-axis are respectively arranged in the positive and negative areas of the X-axis and the area in a vicinity of the origin, in the angular velocity sensor 300. Therefore, when the force generators are periodically operated, it is possible to allow the weight body 340 to undergo an orbital movement within the XZ-plane.

On the other hand, by measuring charges produced in these electrode layers, it is also possible to detect displacement produced in the weight body 340 or force exerted on the weight body 340. For example, in the case where a force +Fx in the positive direction of the X-axis is exerted on the weight body 340 so that the weight body 340 is caused to undergo displacement in the positive direction of the X-axis, the right side portion of the piezoelectric element 330 shown in FIG. 29 is crushed (contracted) in upper and lower directions, whereas the left side portion is extended (expanded) in upper and lower directions. Accordingly, on the basis of the polarization characteristic shown in FIGS. 24A, 24B, positive charges are produced at the electrode layers E33, E36 and negative charges are produced at the electrode layers E31, E38. Eventually, by measuring charges produced at the respective electrode layers E31, E33, E36, E38 arranged on the X-axis, it is possible to detect displacement in the X-axis direction of the weight body 340 (force components ±Fx in the X-axis direction exerted on the weight body 340).

Similarly, by measuring charges produced at the respective electrode layers E32, E34, E37, E39 arranged on the Y-axis, it is possible to detect displacement in the Y-axis direction of the weight body 340 (force components ±Fy in the Y-axis direction exerted on the weight body 340). Moreover, with respect to the Z-axis, displacement in the Z-axis direction (force components ±Fz) can be detected by measuring charges produced at the electrode layers E35, E40 arranged at the origin position. Namely, if a force component +Fz in the positive Z-axis direction is applied to the weight body 340, the piezoelectric element between the electrode layers E35, E40 is crushed (contracted) in upper and lower directions and if a force component −Fz in the negative Z-axis direction is applied to the weight body 340, the piezoelectric element between the electrode layers E35, E40 is extended (expanded) in upper and lower directions Accordingly, it is possible to detect applied force components ±Fz on the basis of quantity and polarity of charges produced at both the electrode layers E35, E40.

As stated above, the respective electrode layers of the angular velocity sensor 300 provide a first role as a force generator allowing the weight body 340 to undergo a circular movement and a second role as a displacement detector for detecting Coriolis force exerted on the weight body 340.

If the electrode layers E31 to E34, E36 to E39 are caused to have a role as a force generator and the electrode layers E35, E40 are caused to have a role as a displacement detector, an angular velocity sensor about two axes which detects an angular velocity ωx about the X-axis and an angular velocity ωy about the Y-axis in the state where the weight body 340 is caused to undergo a circular movement within the XY-plane can be realized. Namely, if at the moment when the weight body 340 passes through the X-axis, charges produced at the electrode layers E35, E40 are measured, it is possible to detect displacement in the Z-axis direction of the weight body 340. This detected displacement corresponds to a force Fz exerted in the Z-axis direction at the weight body 340, thus making it possible to obtain an angular velocity ωx about the X-axis on the basis of the detection principle at the point Px shown in FIG. 13. Similarly, if at the moment when the weight body 340 passes through the Y-axis, charges produced at the electrode layers E35, E40 are measured, it is possible to detect displacement in the Z-axis direction of the weight body 340. This detected displacement corresponds to a force Fz exerted in the Z-axis direction at the weight body 340, thus making it possible to obtain an angular velocity ωy about the Y-axis on the basis of the detection principle at the point Py shown in FIG. 13.

Moreover, if the electrode layers E31, E36, E33, E38, E35, E40 are caused to have a role as a force generator and the electrode layers E32, E37, E34, E39 are caused to have a role as a displacement detector, an angular velocity sensor about two axes which detects an angular velocity ωx about the X-axis and an angular velocity ωz about the Z-axis in the state where the weight body 340 is caused to undergo a circular movement within the XZ-plane can be realized. Namely, if at the moment when the weight body 340 passes through the X-axis, charges produced at the electrode layers E32, E37, E34, E39 are measured, it is possible to detect displacement in the Y-axis direction of the weight body 340. This detected displacement corresponds to a force Fy exerted in the Y-axis direction at the weight body 340, thus making it possible to obtain an angular velocity ωx about the X-axis. Similarly, if at the moment when the weight body 340 passes through the Z-axis, charges produced at the electrode layers E32, E37, E34, E39 are measured, it is possible to detect displacement in the Y-axis direction of the weight body 340. This detected displacement corresponds to a force Fy exerted in the Y-axis direction at the weight body 340, thus making it possible to obtain an angular velocity ωz about the Z-axis.

It is to be noted that, in order to detect all of the angular velocity components ωx, ωy, ωz about the three axes, it is sufficient to employ a configuration in which electrode layers having a role as a force generator and electrode layers having a role as a displacement detector are separately disposed. For example, in the example shown in FIG. 32, the electrode layer E31 in FIG. 30 is divided into E31G and E31D, the electrode layer E33 is divided into E33G and E33D, and electrode layers E32, E34 are modified so that they take shape of E32D, E34D. In this example, the shapes of the electrode layers E32D, E34D are made to become the same shapes as the shapes of the electrode layers E31D, E33D so that detection sensitivities in the X-axis and the Y-axis directions are in correspondence with each other. In this case, the electrode layers E31G, E33G, E35G serve as a force generator and function to allow the weight body 340 to undergo a circular movement within the XZ-plane. In addition, the electrode layers E31D, E32D, E33D, E34D serve as a displacement detector and function to detect displacements in the X-axis and the Y-axis directions (i.e., force components Fx, Fy) of the weight body 340.

In the angular velocity sensor of such a configuration, the weight body 340 is caused to undergo a circular movement within the XZ-plane and displacement in the Y-axis direction of the weight body 340 is detected at the moment when the weight body 340 passes through the X-axis, thus making it possible to obtain an angular velocity ωx about the X-axis. Moreover, displacement in the X-axis direction of the weight body 340 is detected at the same time point, thus making it possible to obtain an angular velocity ωy about the Y-axis. Further, displacement in the Y-axis direction of the weight body 340 is detected at the moment when the weight body 340 passes through the Z-axis, thus making it possible to obtain an angular velocity ωz about the Z-axis.

It is to be noted while, in the angular velocity sensor 300 shown in FIG. 29, the five individual electrode layers E31 to E35 are arranged as shown in FIG. 30 on the upper surface of the piezoelectric element 330 and the five individual electrode layers E36 to E40 are arranged as shown in FIG. 31 on the lower surface thereof, either upper five electrode layers or lower five electrode layers may be replaced by a single common electrode layer.

Figure 33:
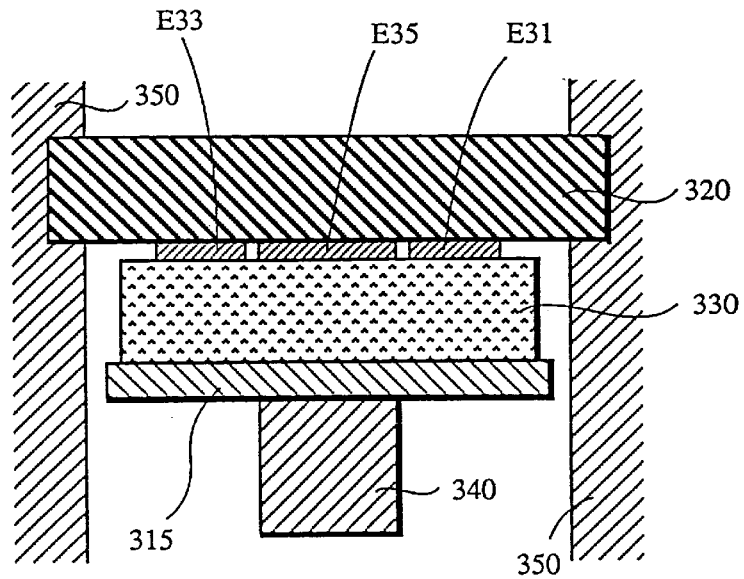
FIG. 33 is a side cross sectional view of another modified example of the angular velocity sensor shown in FIG. 29.

An angular velocity sensor 360 of which side cross sectional view is shown in FIG. 33 is a modification of the angular velocity sensor 300 shown in FIG. 29. The angular velocity sensor 360 differs from the angular velocity sensor 300 in that a conductive flexible substrate 315 is used in place of the flexible substrate 310 and that the lower electrode layers E36 to E40 are omitted. The flexible substrate 315 is a disk-shaped substrate having a diameter slightly smaller than that of the flexible substrate 310, wherein an outer circumferential portion is not supported by the sensor casing 350 and is caused to be free. The weight body 340 is supported by the flexible substrate 315, the piezoelectric element 330, the upper electrode layers E31 to E35 and the fixed substrate 320 and is placed in hanging state as shown. Accordingly, the weight body 340 can be moved with a certain degree of freedom within the sensor casing 350. In addition, since the flexible substrate 315 has conductive property, it functions as a common electrode layer and the lower electrode layers E36 to E40 are therefore unnecessary. As stated above, the angular velocity sensor 360 shown in FIG. 33 is slightly different in structure as compared to the angular velocity sensor 300 shown in FIG. 29, but the operation thereof is completely the same.

§11 Common Use of Driving Means and Detecting Means

As previously described, in the angular velocity sensor according to this invention, driving means for allowing the weight body to undergo a circular movement and detecting means for detecting a Coriolis force exerted on the weight body subject to the circular movement are required. For example, in the model shown in FIG. 18, force generators (driving means) G1 to G4 for allowing the weight body 40 to undergo a circular movement within the XY-plane and displacement detectors (detecting means) D1 to D6 for detecting Coriolis force components exerted in the respective coordinate axis directions with respect to the weight body 40 are independently provided. Also in various embodiments which have been described until now, angular velocity sensors of a structure in which force generators and displacement detectors are respectively separately independently provided have been mainly described.

However, as seen from the embodiments which have been described, a force generator and a displacement detector can be constituted with an identical element from a physical point of view. For example, an electrostatic capacitance element has a property that Coulomb attractive force or repulsive force are produced between a pair of electrodes by applying voltage therebetween. For this reason, an electrostatic capacitance element can be used as a force generator. In addition, in an electrostatic capacitance element, a change of a distance between both the electrodes is detected as a form of an electric signal, it can be also used as a displacement detector. Similarly, since a piezoelectric element has a property that stress is produced by applying voltage, it can be used as a force generator. In addition, in a piezoelectric element, stress applied by displacement is detected as a form of an electric signal, it can be also used as a displacement detector.

While, in the embodiments which have been described, components as a force generator and components as a displacement detector are handled as separate components, there is no difference in the physical structure therebetween in practice and they have been dealt as separate elements for convenience in allowing them to be operative as the angular velocity sensor. Accordingly, both the components are compatible to each other. As a matter of fact, the same components can be utilized either as a force generator or as a displacement detector.

For example, in the angular velocity sensor shown in FIGS. 29 to 31, as previously described in the chapter §10, if the electrode layers E31 to E34, E36 to E39 are caused to have a role as a force generator and the electrode layers E35, E40 are caused to have a role as a displacement detector, it is possible to detect a Coriolis force exerted in the Z-axis direction and to detect an angular velocity ωx about the X-axis and an angular velocity ωy about the Y-axis in the state where the weight body 340 is caused to undergo a circular movement within the XY-plane. On the other hand, if the electrode layers E31, E36, E33, E38, E35, E40 are caused to have a role as a force generator and the electrode layers E32, E37, E34, E39 are caused to have a role as a displacement detector, it is possible to detect a Coriolis force exerted in the Y-axis direction and to detect an angular velocity ωx about the X-axis and an angular velocity ωz about the Z-axis in the state where the weight body 340 is caused to undergo a circular movement within the XZ-plane.

It is to be noted that the operation method which has been described in the chapter §10 is a method where each component selects either a role as a force generator or a role of a displacement detector, respectively, but is not a method where a component takes both the roles at a same time. However, if a particular detecting circuit is applied, the same components are permitted to serve as both the roles at a same time. A utilization mode in which the same components are commonly used as a driving means and a detecting means at a same time as mentioned above will be described below.

Figure 34:
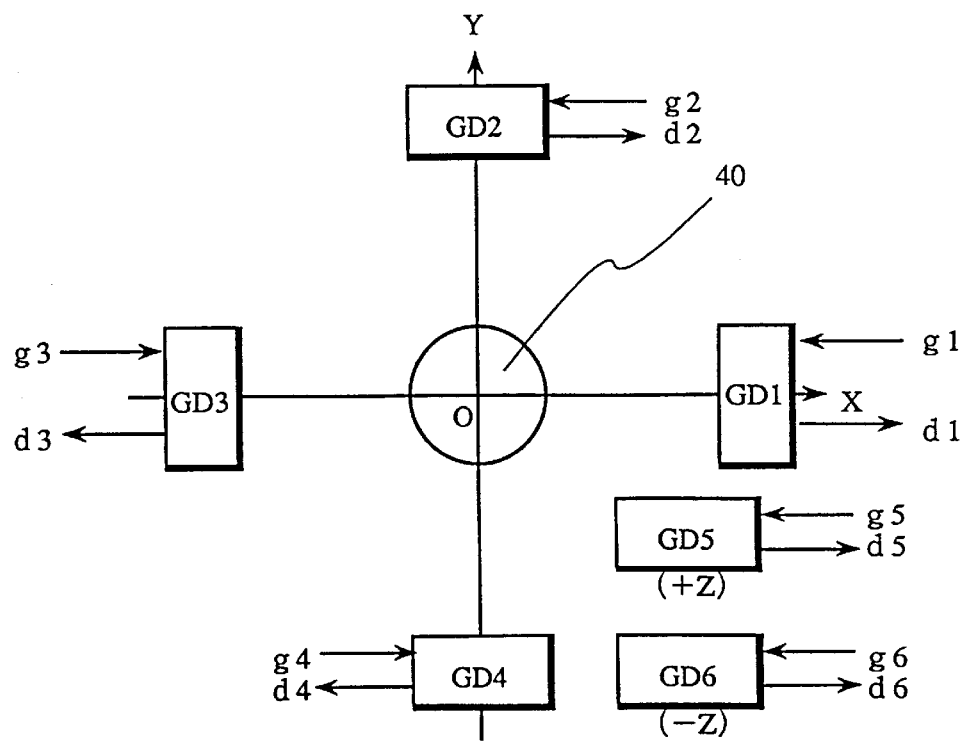
FIG. 34 is a conceptual view showing an example of the configuration of an angular velocity sensor using a double functional element for production of force and detection of displacement.

FIG. 34 is a conceptual view showing an example of the configuration of an angular velocity sensor using double functional elements GD1 to GD6 for generation of force and detection of displacement. In this example, the double functional elements GD1 to GD6 perform at the same time a function as a force generator and a function as a displacement detector. Initially, attention is drawn to the function as a force generator of these double functional elements GD1 to GD6. The elements GD1 receives a drive signal g1 to produce a force to move the weight body 40 in the positive direction of the X-axis; the element GD2 receives a drive signal g2 to produce a force to move the weight body 40 in the positive direction of the Y-axis; the element GD3 receives a drive signal g3 to produce a force to move the weight body 40 in the negative direction of the X-axis; the element GD4 receives a drive signal g4 to produce a force to move the weight body 40 in the negative direction of the Y-axis; the element GD5 receives a drive signal g5 to produce a force to move the weight body 40 in the positive direction of the Z-axis; and the element GD6 receives a drive signal g6 to produce a force to move the weight body 40 in the negative direction of the Z-axis.

On the other hand, attention is drawn to the function as a displacement detector of these elements GD1 to GD6. When the weight body 40 is caused to undergo displacement in the positive direction of the X-axis, the element GD1 outputs a detection signal d1; when the weight body 40 is caused to undergo displacement in the positive direction of the Y-axis, the element GD2 outputs a detection signal d2; when the weight body 40 is caused to undergo displacement in the negative direction of the X-axis, the element GD3 outputs a detection signal d3; when the weight body 40 is caused to undergo displacement in the negative direction of the Y-axis, the element GD4 outputs a detection signal d4; when the weight body 40 is caused to undergo displacement in the positive direction of the Z-axis, the element GD5 outputs a detection signal d5; and when the weight body 40 is caused to undergo displacement in the negative direction of the Z-axis, the element GD6 outputs a detection signal d6.

If, e.g., periodic signals shifted to each other in phase like the drive signals S1 to S4 shown in FIG. 17 are used as the drive signals g1 to g4, the weight body 40 is caused to undergo a circular movement within the XY-plane. Now, let obtain the detection signals d1 to d6, keeping the weight body 40 being caused to undergo a circular movement under the environment where any angular velocity is not applied. Assuming that the predetermined detection signals d1 to d6 are outputted from the respective elements GD1 to GD6. If the weight body 40 is precisely carrying out a circular movement within the XY-plane, the detection signals d1 to d4 become a periodic signal in correspondence with the period of the circular movement as a matter of course and the detection signals d5, d6 become steady-state signal.

Let now consider the case where an angular velocity is exerted from the external. By this angular velocity, a Coriolis force is applied to the weight body 40 which is carrying out a circular movement. For example, a Coriolis force in the positive direction of the X-axis is assumed to be produced on the basis of the applied angular velocity at a certain moment. In this case, a signal component $\Delta\alpha$ based on the produced Coriolis force is added to a detection signal of the element GD1. Thus, a detection signal of $(d1+\Delta\alpha)$ is obtained from the element GD1.

Namely, in the environment where any angular velocity is not applied, when the drive signal g1 is applied to the element GD1, the detection signal d1 is obtained. On the contrary, in the environment where an angular velocity is exerted, even if the same drive signal g1 is given, a detection signal $(d1+\Delta\alpha)$ would be obtained. Accordingly, if detection signal d1 is measured in advance in the environment where any angular velocity is not applied, it is possible to obtain a signal component $\Delta\alpha$ generated by a Coriolis force in the positive direction of the X-axis on the basis of the detection signal $(d1+\Delta\alpha)$ obtained in the environment where the angular velocity is actually applied. This method can be applied to the other elements GD2 to GD6 entirely in the same manner. In other words, the elements GD1 to GD6 function as a force generator in response to the drive signals g1 to g6 and function as a displacement detector outputting detection signals including a component of Coriolis force.

Since the angular velocity sensor using double functional elements can reduce the number of components as stated above, there is a merit that the structure of the sensor body can become simplified. However, there is a demerit that the signal processing circuit slightly becomes complicated as compared to the sensors in which force generators and displacement detectors are separately independently provided, which have been described in the above-mentioned embodiments. Accordingly, it is preferable to select the structure in which force generators and displacement detectors are separately independently provided, or the structure using double functional elements, in dependency upon use purpose by taking these merit or demerit into consideration from a viewpoint of practical use.

Several embodiments using double functional elements will now be described together with a signal processing circuit on the basis of the fundamental idea which has been described in this chapter. Namely, an embodiment in which double functional elements are applied to the angular velocity sensor utilizing capacitance elements which has been described in the chapters §5 and §6 will be described in the chapter §12, an embodiment in which double functional elements are applied to the angular velocity sensor utilizing a piezoelectric element of the type I which has been described in the chapters §8 and §9 will be described in the chapter §13, and an embodiment in which double functional elements are applied to the angular velocity sensor utilizing a piezoelectric element of the type II which has been described in the chapter §10 will be described in chapters §14 and §15.

Figure 35:
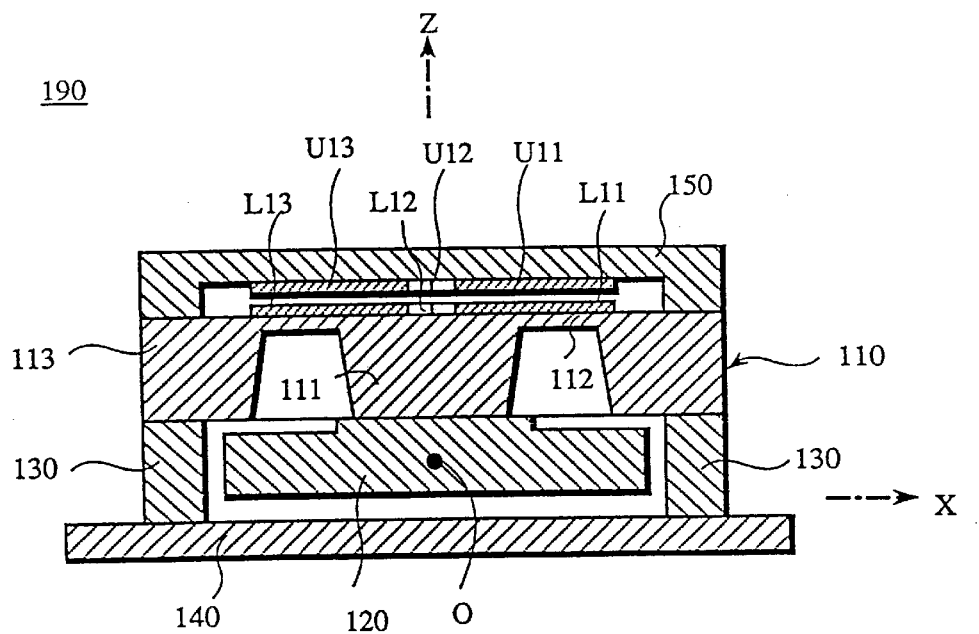
FIG. 35 is a side cross sectional view showing an embodiment in which a double functional element is applied to the angular velocity sensor using capacitance elements shown in FIG. 19 so that the structure is simplified.

§12 Embodiment of the Angular Velocity Sensor Utilizing Double Functional Capacitance Elements An angular velocity sensor 190 of which side cross section is shown in FIG. 35 is directed to an embodiment in which double functional elements are applied to the angular velocity sensor utilizing capacitance elements shown in FIG. 19, whereby the number of necessary electrode layers is reduced so that the entire structure is simplified. This sensor differs from the sensor shown in FIG. 19 only in the configuration of the electrode layers arranged on the upper surface of the flexible substrate 110 and the electrode layers arranged on the lower surface of the cover substrate 150. Accordingly, only the configuration of these electrode layers will be described below and explanation of the other components will be omitted.

Figure 36:
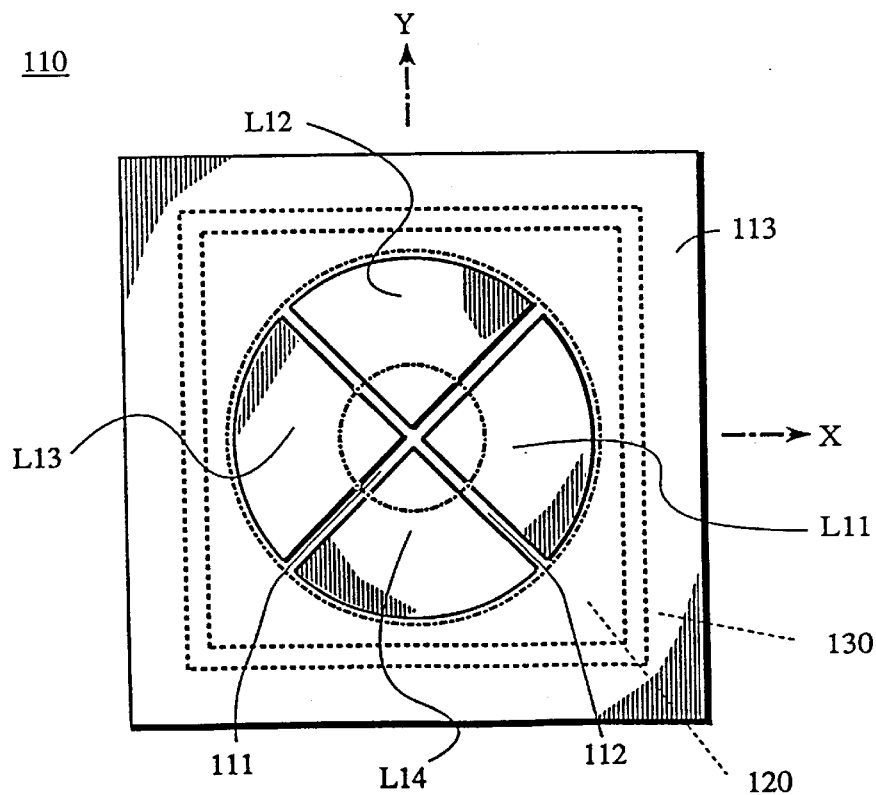
FIG. 36 is a top view of flexible substrate 110 in the angular velocity sensor shown in FIG. 35, wherein the cross section cut along the X-axis of the flexible substrate 110 shown in FIG. 36 is shown in FIG. 35.

On the upper surface of the flexible substrate 110, four fan-shaped lower electrode layers L11 to L14 are arranged as shown in FIG. 36. The lower electrode layer L11 is disposed on the positive area of the X-axis, the lower electrode layer L12 is disposed on the positive area of the Y-axis, the lower electrode layer L13 is disposed on the negative area of the X-axis and the lower electrode layer L14 is disposed on the negative area of the Y-axis. These lower electrode layers are all symmetrical with respect to the respective coordinate axes. On the other hand, upper electrode layers U11 to U14 are disposed at positions opposite to the respective lower electrode layers L11 to L14 on the lower surface of the cover substrate 150. In this example, the upper electrode layers U11 to U14 have exactly the same shape as that of the lower electrode layers L11 to L14. Respective pairs of capacitance elements are formed by the electrode layers L11 and U11, the electrode layers L12 and U12, the electrode layers L13 and U13 and the electrode layers L14 and U14.

Figure 37:
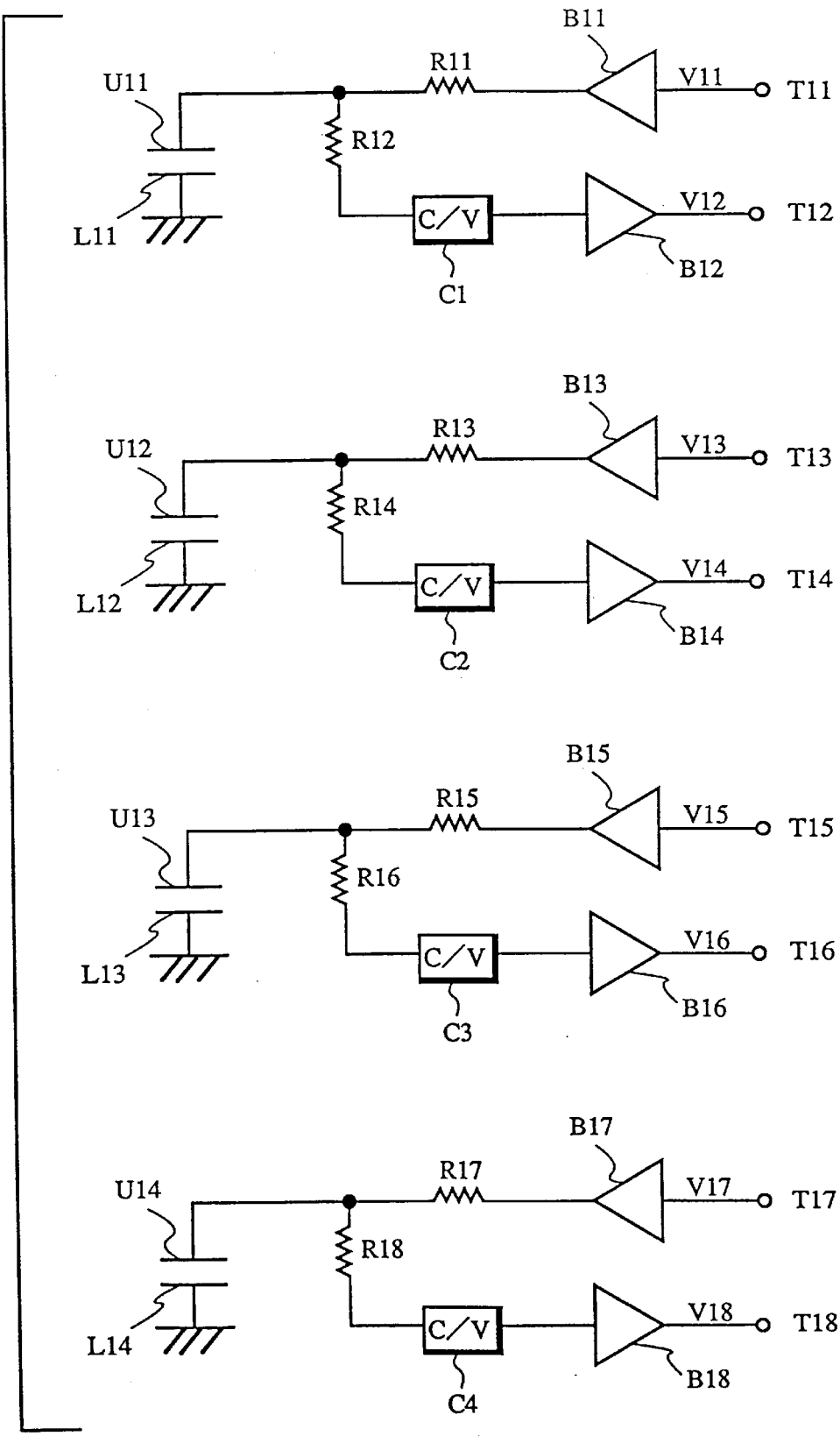
FIG. 37 is a circuit diagram showing an example of a signal processing circuit used for operating the angular velocity sensor shown in FIG. 35.

In order to operate the angular velocity sensor of such configuration, a signal processing circuit as shown in FIG. 37 is prepared. In this circuit diagram, respective capacitance elements indicated at the left end are capacitance elements constituted by the upper electrode layers disposed on the lower surface of the cover substrate 150 and the lower electrode layers disposed on the upper surface of the flexible substrate 110 and U11 to U14 and L11 to L14 represent the respective upper electrode layers and the respective lower electrode layers. The lower electrode layers L11 to L14 are connected to a common ground level and conduct with each other. In this example, B11 to B18 are buffer circuits and R11 to R18 are resistors. Moreover, C1 to C4 are capacitance/voltage conversion circuits and have a function to convert electrostatic capacitance values of respective capacitance elements into voltage values and output them. Drive signal input terminals T11, T13, T15, T17 are respectively terminals to which drive voltages V11, V13, V15, V17 to be applied to the upper electrode layers U11, U12, U13, U14 are inputted. Detection signal output terminals T12, T14, T16, T18 are respectively terminals for outputting detection voltages V12, V14, V16, V18 outputted from the capacitance/voltage converting circuits C1, C2, C3, C4.

In order to allow the weight body 120 to carry out a circular movement along the XY-plane by using the signal processing circuit of FIG. 37, it is sufficient to respectively apply, e.g., drive signals S1 to S4 shown in FIG. 17 to the drive signal input terminals T11, T13, T15, T17. By applying these signals with shifted phase, Coulomb attractive forces are respectively exerted on the four sets of capacitance elements. Thus, the weight body 120 carries out a circular movement along the XY-plane.

On the other hand, it is possible to detect displacements in the respective axial directions of the weight body 120. For example, when the weight body 120 is caused to undergo displacement in the positive direction of the X-axis, a distance between the electrode layers U11 and L11 becomes short and a distance between the electrode layers U13 and L13 becomes longer. For this reason, an electrostatic capacitance value in the former is increased and an electrostatic capacitance value in the latter is decreased. Accordingly, in the circuit of FIG. 37, detection voltage V12 rises and detection voltage V16 falls. Accordingly, detection of displacement in the positive direction of the X-axis of the weight body 120 can be made based on a difference between both the detection voltages V12 and V16.

In contrast, when the weight body 120 is caused to undergo displacement in the negative direction of the X-axis, the relationship between increase and decrease becomes opposite to that of the above-described case. For this reason, sign of the difference between both the detection voltages V12 and V16 is inverted.

Eventually, detections of displacements in both the positive and negative directions of the X-axis can be made by detecting a difference between detection voltages V12 and V16 which are obtained at the output terminals T12 and T16. Exactly in the same manner as above, detections of displacements in both the positive and negative directions of the Y-axis can be made by detecting a difference between the detection voltages V14 and V18 which are obtained at the output terminals T14 and T18.

Further, this signal processing circuit can also detect displacements in both the positive and negative directions of the Z-axis. For example, when the weight body 120 is caused to undergo displacement in the positive direction of the Z-axis, distances between the electrodes of four sets of capacitance elements all become short. As a result, electrostatic capacitance values of these capacitance elements are increased. In contrast, when the weight body 120 is caused to undergo displacement in the negative direction of the Z-axis, distances between the electrodes of four sets of capacitance elements all become long. As a result, electrostatic capacitance values of these capacitance elements are decreased. Accordingly, detections of displacements in both the positive and negative directions of the Z-axis can be made based on increase or decrease of sum total of voltages (V12+V14+V16+V18) obtained at the four output terminals T12, T14, T16, T18. Although displacement detection in the Z-axis direction can be made also by sum of two voltages (V12+V16) or (V14+V18), it is preferable to use sum total of the four voltages as described above in order to carry out efficient and stable detection.

It should be noted that since the respective electrode layers L11 to L14, U11 to U14 all have shape linearly symmetrical with respect to the X-axis or the Y-axis, there is no possibility that any other axis component may interfere with the above-described detection result. For example, in the case where the weight body 120 is caused to undergo displacement along the X-axis, either a distance between the electrode layers U11 and L11 or a distance between the electrode layers U13 and L13 becomes short and the other distance becomes long. For this reason, it is possible to obtain displacement in the X-axis direction as a difference between the detection voltages V12 and V16. However, in the case where the weight body 120 is caused to undergo displacement in the Y-axis direction, both the distances between the electrode layers U11 and L11 and between the electrode layers U13 and L13 partially become shorter or longer. Therefore, those distances are canceled as a whole. As a result, no voltage difference is produced. In addition, in the case where the weight body 120 is caused to undergo displacement in the positive or negative Z-axis direction, both the distances between the electrode layers U11 and L11 and between the electrode layers U13 and L13 become shorter or longer. Accordingly, when a difference between the detection voltages V12 and V16 is taken, they are canceled.

It is seen from the foregoing description that this angular velocity sensor 190 has a function to allow the weight body 120 to carry out a circular movement along the XY-plane and a function to separately detect displacements of the weight body 120 relating to both the positive and negative directions of the X-axis, the Y-axis and the Z-axis by making use of only four sets of electrode pairs U11 and L11, U12 and L12, U13 and L13, U14 and L14. In view of the above, if these electrode pairs are utilized as double functional elements which have been described in the chapter §11, detections of angular velocity components ωx, ωy, ωz about the respective axes can be made.

Namely, initially, the drive signals S1 to S4 shown in FIG. 17 are respectively delivered to the input terminals T11, T13, T15, T17 in the environment where any angular velocity is not exerted to the weight body 120 which is carrying out a circular movement along the XY-plane. Under this environment, voltages V12, V14, V16, V18 outputted from the output terminals T12, T14, T16, T18 are measured. It is a matter of course that these measured voltages generate periodic signals varying at the same period as that of the drive signals S1 to S4. Subsequently, this angular velocity sensor 190 is placed in the environment where an angular velocity is actually exerted, keeping to similarly deliver the drive signals S1 to S4 to the input terminals T11, T13, T15, T17 to make the weight body 120 be carrying out the circular movement along the XY-plane. Under this environment, voltages V12, V14, V16, V18 outputted from the output terminals T12, T14, T16, T18 are measured again. If these voltage values are different from values measured in advance, their differences become components of Coriolis force based on the angular velocity exerted on the weight body 120. For example, if the detection voltage difference (V12−V16) which indicates a displacement in the X-axis direction is increased by Δα as compared to a value measured in advance, a Coriolis force in the positive direction of the X-axis with a magnitude corresponding to Δα is detected.

Eventually, this angular velocity sensor 190 can independently detect a Coriolis force in the X-axis direction, a Coriolis force in the Y-axis direction and a Coriolis force in the Z-axis direction, respectively, in the state where the weight body 120 is caused to undergo a circular movement along the XY-plane. Accordingly, it becomes possible to detect an angular velocity ωx about the X-axis, an angular velocity ωy about the Y-axis and an angular velocity ωz about the Z-axis on the basis of the previously described principle.

In the above, it has been described that voltage is applied across the upper and lower electrode layers opposite to each other to deliver charges having polarities different from each other to both the electrodes so as to produce a Coulomb attractive force therebetween to drive the weight body 120. However, if there is employed a structure capable of respectively delivering charges of the same polarity to both the upper and lower electrode layers, it is also possible to drive the weight body 120 by Coulomb repulsive force. In addition, for example, if Coulomb attractive force is exerted on the electrode pair U11 and L11 and Coulomb repulsive force is exerted on the electrode pair U13 and L13 at the same time, the weight body 120 can be more efficiently undergo displacement in the positive direction of the X-axis. When the weight body 120 is caused to undergo a circular movement in the state where attractive force is exerted on one hand and repulsive force is exerted on the other hand, more efficient driving operation can be made.

Moreover, if Coulomb attractive force is applied to all the four sets of electrode pairs, or two sets of electrode pairs arranged on the same coordinate axis, the weight body 120 can be caused to undergo displacement in the positive direction of the Z-axis. Further, if Coulomb repulsive force is applied to all the four sets of electrode pairs or two sets of electrode pairs arranged on the same coordinate axis, the weight body 120 can be caused to undergo in the negative direction of the Z-axis. Accordingly, if the drive operation in both the positive and negative directions of the Z-axis and, e.g., the drive operation in both the positive and negative directions of the X-axis previously described are combined with each other, the weight body 120 can be also caused to undergo a circular movement along the XZ-plane.

In the above, it has been described that displacement in the X-axis direction of the weight body 120 is detected by a difference between the detection voltages (V12–V16), and displacement in the Y-axis direction of the weight body 120 is detected by a difference between the detection voltages V14 and V18. The reason why such a difference is taken is that the detection accuracy is caused to be improved and that the displacement component in the Z-axis direction is not caused to interfere with the detection result. Accordingly, if it is the premise that the angular velocity sensor is used in an environment such that Coriolis force in the Z-axis direction is not exerted, it is also possible to use, e.g., voltage value V12 or V16 as a value indicating displacement in the X-axis direction by itself, and it is similarly possible to use voltage value V14 or V18 as a value indicating displacement in the Y-axis direction by itself.

Moreover, while, in the above-described embodiment, both the upper electrode layers U11 to U14 and the lower electrode layers L11 to L14 are all individual electrode layers independent from a physical point of view, either the upper electrode layers or the lower electrode layers may be replaced by a single common electrode layer from a physical point of view (a disk-shaped common electrode layer as opposed to all the four fan-shaped electrode layers in the case of this example). In order to simplify wiring between electrode layers, it is preferable to use such a common electrode layer. In the circuit shown in FIG. 37, the lower electrode layers L11 to L14 are commonly grounded and serves as a common electrode from an electrical point of view.

In the case of the angular velocity sensors of the structure as shown in FIG. 35 or FIGS. 19 to 22, inexpensive and high performance angular velocity sensors can be mass-produced by constituting them by material to which the technology of the manufacturing process of typical semiconductor device or the micromachining technology can be applied. For example, in FIG. 35, if members such as the flexible substrate 110, the weight body 120, the pedestal 130 and/or the cover substrate 150 are constituted by a silicon substrate or a glass substrate, anode bonding technology, etc. can be utilized for joining between a glass substrate and a silicon substrate, and silicon direct bonding technology, etc. can be utilized for joining between silicon substrates. It is to be noted that if individual electrode layers different from a physical point of view are disposed on a silicon substrate in a manner adjacent to each other, there is the possibility that those electrode layers may interfere with each other by coupling with capacitance in the silicon substrate. Accordingly, it is preferable to form individual electrode layers on a glass substrate whenever practicable. If a single common electrode layer from a physical point of view is employed, forming such a common electrode layer on a silicon substrate does not constitute any problem.

Figure 38:
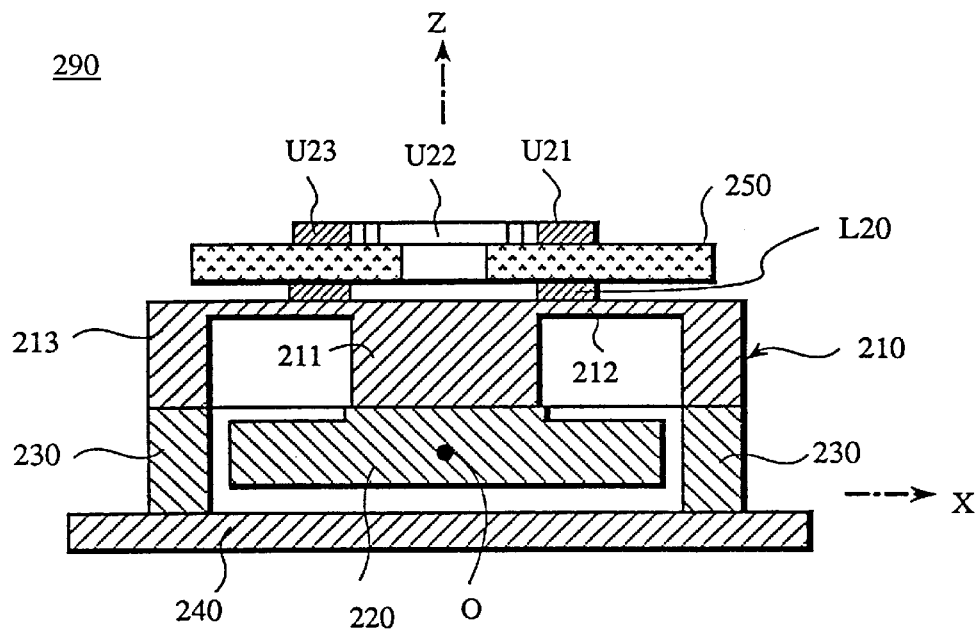
FIG. 38 is a side cross sectional view showing an embodiment in which a double functional element is applied to the angular velocity sensor using a piezoelectric element of the type I shown in FIG. 25 so that the structure is simplified.

§13 Embodiment of Angular Velocity Sensor Utilizing Double Functional Piezoelectric Element of the Type I An angular velocity sensor 290 of which side cross section is shown in FIG. 38 is directed to an angular velocity sensor of an embodiment in which double functional elements are applied to the angular velocity sensor utilizing the piezoelectric element of the type I shown in FIG. 25 to thereby reduce the number of electrode layers so that the entire structure is simplified. This angular velocity sensor differs from the sensor shown in FIG. 25 only in the configuration of electrode layers disposed on both the upper and the lower surfaces of the piezoelectric element 250. In view of the above, only the configuration of the electrode layers will be described below and explanation of other components is omitted.

Figure 39:
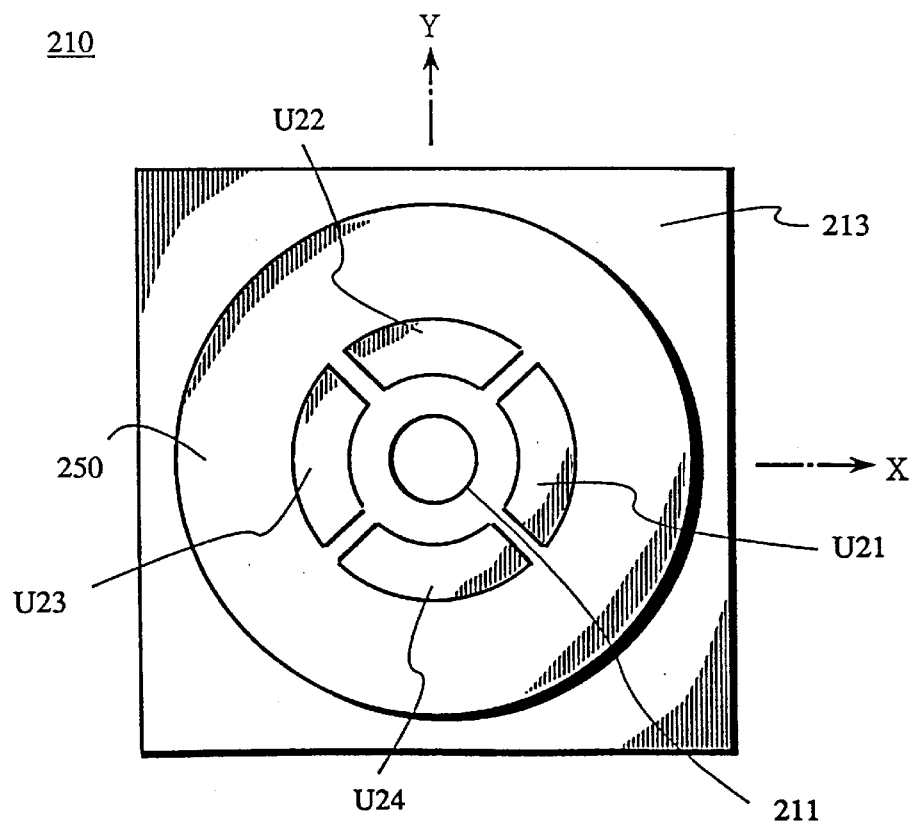
FIG. 39 is a top view of the flexible substrate 210 in the angular velocity sensor shown in FIG. 38, wherein the cross section cut along the X-axis of the flexible substrate 210 shown in FIG. 39 is shown in FIG. 38.

As shown in FIG. 39, four fan-shaped upper electrode layers U21 to U24 are disposed on the upper surface of the piezoelectric element 250. The upper electrode layer U21 is disposed on the positive area of the X-axis, the upper electrode layer U22 is disposed on the positive area of the Y-axis, the upper electrode layer U23 is disposed on the negative area of the X-axis and the upper electrode layer U24 is disposed on the negative area of the Y-axis. These upper electrode layers are all symmetrical with respect to the respective coordinate axes. Moreover, a washer-shaped common lower electrode layer L20 as opposed to all of upper electrode layers U21 to U24 is disposed on the lower surface of the piezoelectric element 250. Thus, four sets of partial piezoelectric elements respectively put between the electrode layers U21 and L20, the electrode layers U22 and L20, the electrode layers U23 and L20 and the electrode layers U24 and L20 are provided.

Figure 40:
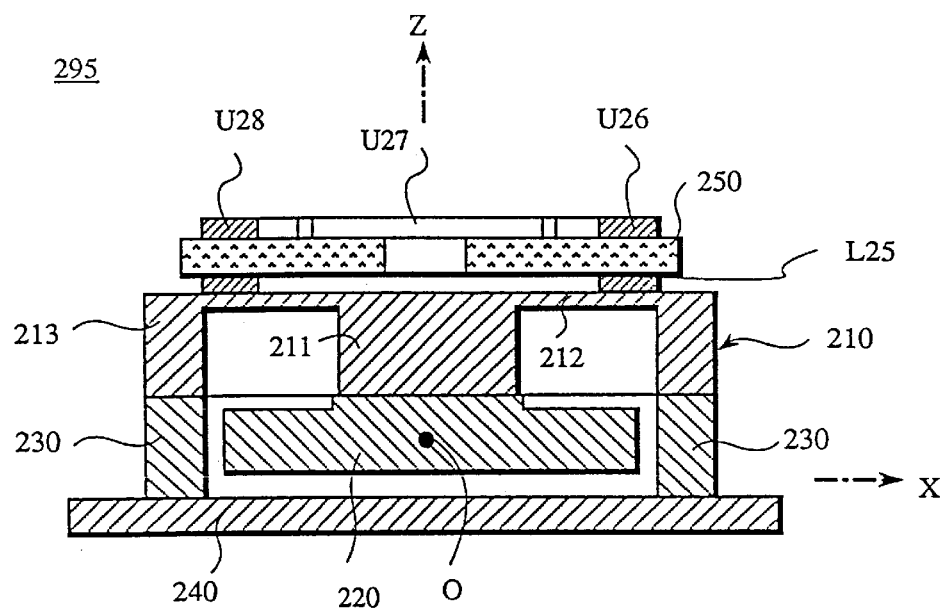
FIG. 40 is a side cross sectional view showing a further embodiment in which a double functional element is applied to the angular velocity sensor using a piezoelectric element of the type I shown in FIG. 25.
Figure 41:
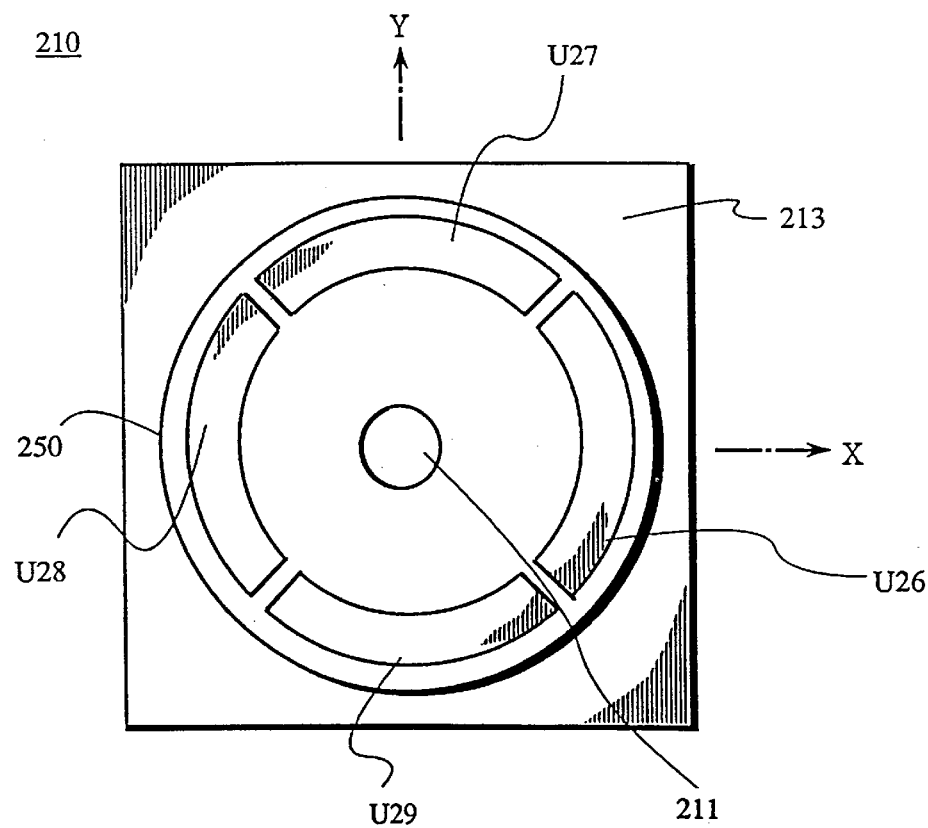
FIG. 41 is a top view of flexible substrate 210 in the angular velocity sensor shown in FIG. 40, wherein the cross section cut along the X-axis of the flexible substrate 210 shown in FIG. 41 is shown in FIG. 40.

On the other hand, an angular velocity sensor 295 of which side cross section is shown in FIG. 40 is directed to an angular velocity sensor of an embodiment in which the arrangement of electrode layers of the angular velocity sensor shown in FIG. 38 is slightly changed. Namely, four fan-shaped upper electrode layers U26 to U29 are disposed as shown in FIG. 41 on the upper surface of the piezoelectric element 250 in the angular velocity sensor 295. The upper electrode layer U26 is disposed on the positive area of the X-axis, the upper electrode layer U27 is disposed on the positive area of the Y-axis, the upper electrode layer U28 is disposed on the negative area of the X-axis and the upper electrode layer U29 is disposed on the negative area of the Y-axis. These upper electrode layers are all symmetrical with respect to the respective coordinate axes. Moreover, a washer-shaped common lower electrode layer L25 as opposed to all of the upper electrode layers U26 to U29 is disposed on the lower surface of the piezoelectric element 250. Thus, four sets of partial piezoelectric elements respectively put between the electrode layers U26 and L25, the electrode layers U27 and L25, the electrode layers U28 and L25 and the electrode layers U29 and L25 are provided.

The difference between the angular velocity sensor 290 shown in FIGS. 38 and 39 and the angular velocity sensor 295 shown in FIGS. 40 and 41 resides only in that respective electrode layers are disposed within the inside area, or within the outside area. The meaning of the arrangement area will be described with reference to the side cross sectional view of FIG. 42. Assuming now that force Fz in an upper direction is applied to the working portion 211 in the state where the fixed portion 213 of the flexible substrate 210 is fixed, a bending as shown in the figure is produced in the flexible portion 212, where stresses produced within the flexible portion 212 are different in dependency upon individual portions.

Figure 42:
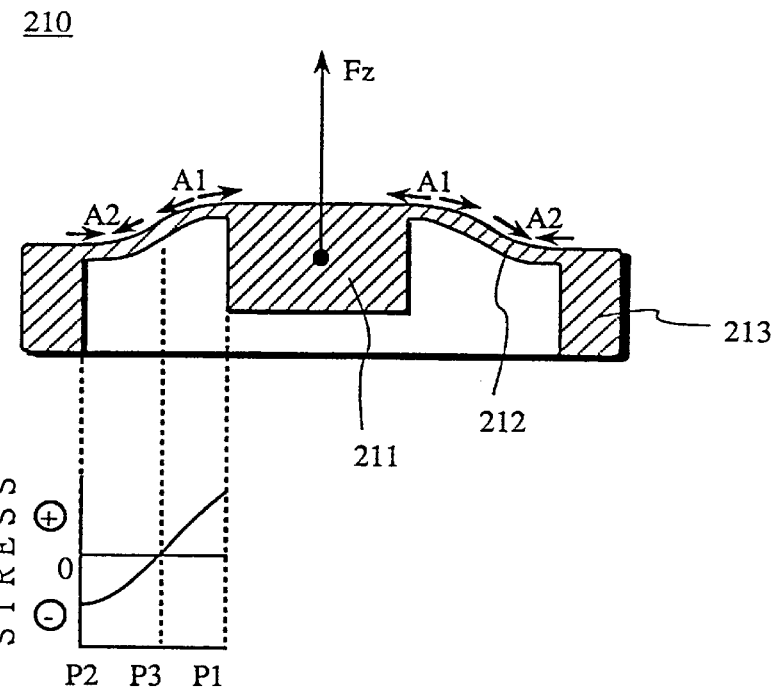
FIG. 42 is a side cross sectional view showing stress distribution produced when flexible substrate 210 constituting the angular velocity sensor according to this invention is caused to undergo bending.
Figure 43:
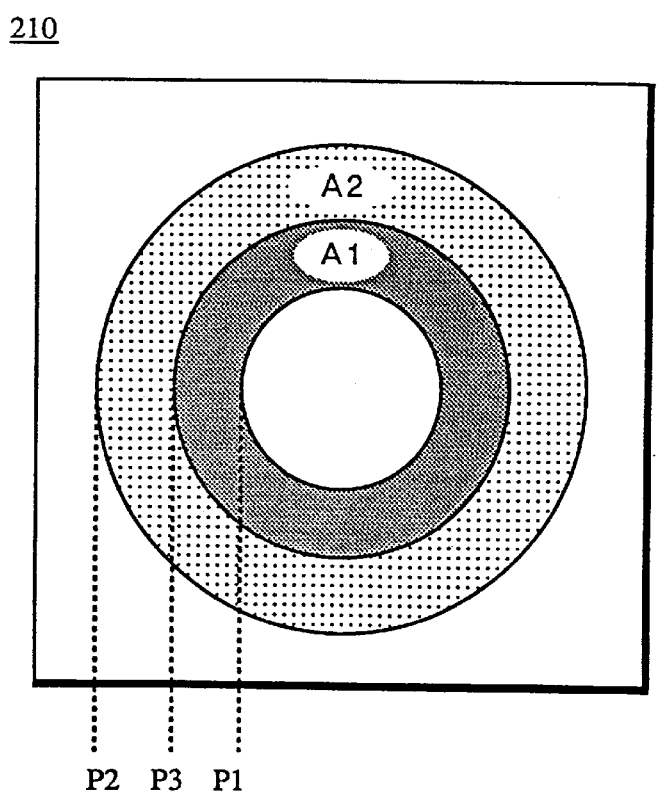
FIG. 43 is a plan view showing inside area A1 and outside area B2 determined on the basis of the stress distribution shown in FIG. 42.

When it is assumed that stress in a direction to laterally expand in the figure is indicated by plus and stress in a direction to laterally contract is indicated by minus, stress takes positive maximum value at an edge position P1 of the inside and stress takes negative maximum value at an edge position P2 of the outside as indicated by the stress distribution diagram shown in the lower part of FIG. 42. Stress gradually changes between the positions P1 to P2, and stress becomes zero at a point P3. Here, when an area from the edge position of the inside up to the point P3 is defined as an inside area A1 and an area from the point P3 to the edge position P2 of the outside is defined as an outside area A2, positive stress is produced in the inside area A1 and negative stress is produced in the outside area A2. FIG. 43 is a top view of the flexible substrate 210 for indicating stress distribution in the inside area A1 and the outside area A2.

When such stress distribution is taken into consideration, it can be understood that although working portion 211 is caused to undergo displacement exactly in the same direction, completely opposite phenomena to each other are taken place in the inside area A1 and the outside area A2. For example, if positive charges are produced in the electrode layers arranged in the inside area A1, negative charges are produced in the electrode layers arranged in the outside area A2. Accordingly, an electrode layer bridging over the inside area A1 and the outside area A2 is not preferable in detecting displacement of the working portion 211. Because, in such a bridging electrode layer, one phenomenon takes place in a portion of the inside area A1 and the other phenomenon takes place in a portion of the outside area A2 so that they are canceled. For this reason, if such a bridging electrode is used as a force generator, drive efficiency is lowered and if such a bridging electrode is used as a displacement detector, detection sensitivity is lowered. It can be said that the angular velocity sensor 200 shown in FIGS. 25 and 26 (angular velocity sensor which has been described in the chapter §8) is a sensor in which the fact that phenomena opposite to each other take place at the electrode layers G22, G24, D25 to D28 arranged in the outside area A1 and the electrode layers G21, G23, D21 to D24 arranged in the outside area A2 is taken into consideration to elaborately combine both the electrode arrangements to thereby permit efficient detection.

The angular velocity sensor 290 shown in FIGS. 38 and 39 is directed to a sensor of an embodiment in which all the electrodes are arranged within the inside area A1, wherein stress is caused to take place within the inside area A1 to drive the weight body 220 and displacement of the weight body 220 is detected on the basis of stress produced within the inside area A1. In the sensor 290, stress of the outside area A2 is not utilized. On the other hand, the angular velocity sensor 295 shown in FIGS. 40 and 41 is directed to a sensor of an embodiment in which all the electrodes are arranged within the outside area A2, wherein stress is caused to take place within the outside area A2 to drive the weight body 220 and displacement of the weight body 220 is detected on the basis of stress produced within the outside area A2. In the sensor 295, stress of the inside area A1 is not utilized.

As described above, a different phenomenon takes place in dependency upon whether the respective electrode layers exist within the inside area A1 or within the outside area A2. However, the detection principle is basically the same regardless of which phenomenon takes place. In view of the above, the operation of only the angular velocity sensor 290 shown in FIGS. 38 and 39 will be described below and explanation of the operation of the angular velocity sensor 295 is omitted here.

Figure 44:
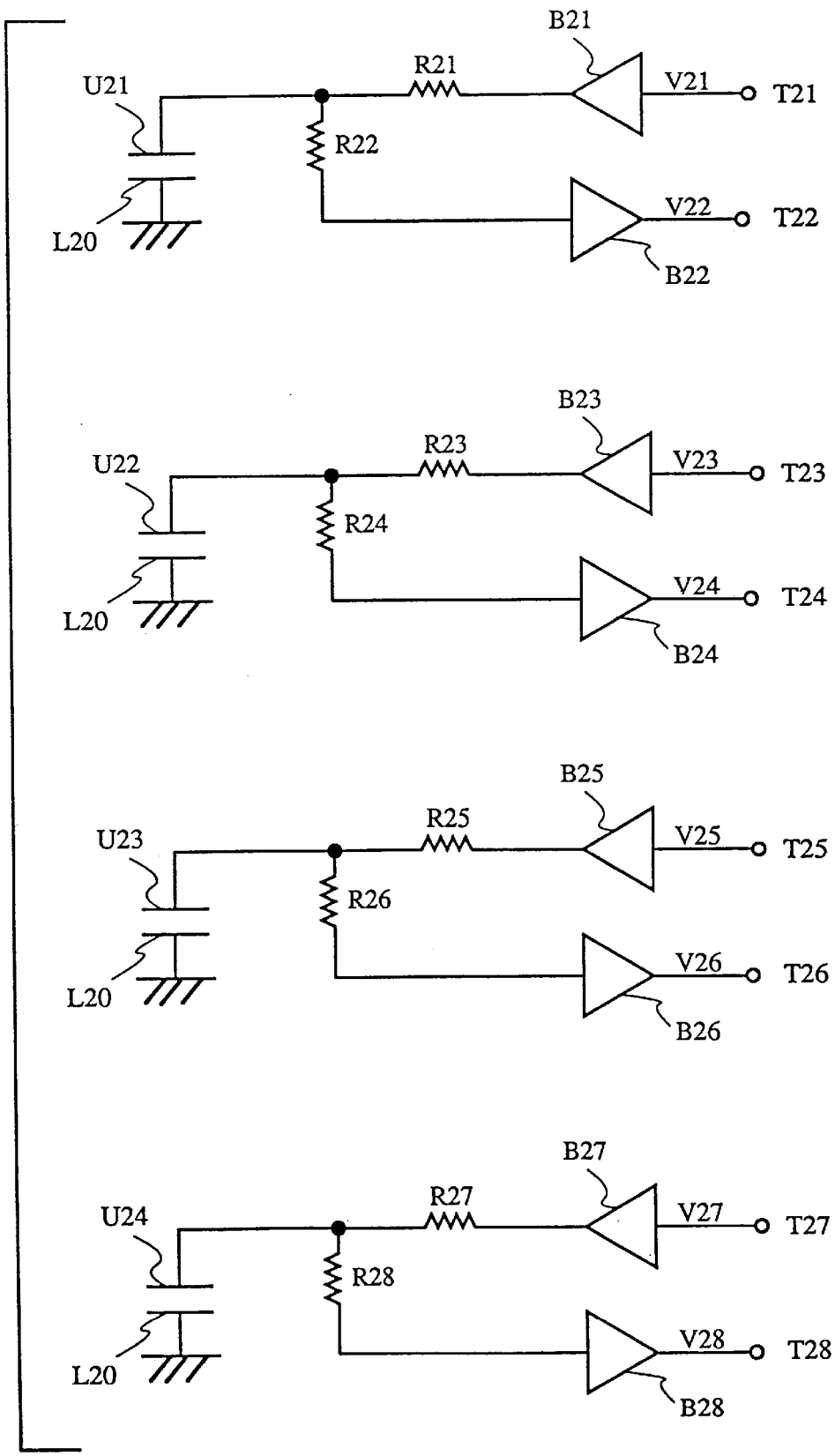
FIG. 44 is a circuit diagram showing an example of a signal processing circuit used for operating the angular velocity sensor shown in FIG. 38.

In order to operate the angular velocity sensor 290 shown in FIGS. 38 and 39, a signal processing circuit as shown in FIG. 44 is prepared. In this circuit diagram, U21 to U24 and L20 indicated at the left end respectively denote the upper electrode layers disposed on the upper surface and the lower electrode layer disposed on the lower surface of the piezoelectric element 250 and the piezoelectric element of the type I is put between the respective pairs of electrode layers. Moreover, B21 to B28 denote buffer circuits and R21 to R28 denote resistors. Drive signal input terminals T21, T23, T25, T27 are respectively terminals for inputting drive voltages V21, V23, V25, V27 to be applied to the upper electrode layers U21, U22, U23, U24 and detection signal output terminals T22, T24, T26, T28 are respectively terminals for outputting detection voltages V22, V24, V26, V28 indicating actual potentials of the upper electrode layers U21, U22, U23, U24.

In order to allow the weight body 220 to undergo a circular movement along the XY-plane by using such a signal processing circuit, it is sufficient to respectively deliver, e.g., the drive signals S1 to S4 shown in FIG. 17 to the input terminals T21, T23, T25, T27. Voltages respectively shifted in phase are supplied to portions of the four sets of respective piezoelectric elements. As a result, displacements in predetermined directions are produced. Thus, the weight body 220 carries out a circular movement along the XY-plane.

On the other hand, if such a signal processing circuit is used, it is possible to detect displacements in the respective axial directions of the weight body 220. For example, when the weight body 220 is caused to undergo displacement in the positive direction of the X-axis, stress in a direction to expand along the X-axis is exerted in an area where the upper electrode layer U21 is formed and stress in a direction to contract along the X-axis is exerted in an area where the electrode layer U23 is formed. For this reason, it is seen that when the polarization characteristic of the piezoelectric element of the type I shown in FIGS. 23A and 23B is taken into consideration, positive voltage and negative voltage are respectively obtained as detection voltage V22 and detection voltage V26. In view of the above, detection of displacement in the positive direction of the X-axis of the weight body 220 can be made based on a difference between both the detection voltages V22 and V26.

In contrast, when the weight body 220 is caused to undergo displacement in the negative direction of the X-axis, detection voltages have polarities opposite to those of the above-described case. For this reason, sign of the difference between both the detection voltages V22 and V26 is inverted.

Eventually, detections of displacements in both the positive and negative directions can be made based on a difference between detection voltages V22 and V26 obtained at the output terminals T22, T26. Exactly in the same manner, detections of displacements in both the positive and negative directions of the Y-axis can be made based on a difference between detection voltages V24 and V28 obtained at the output terminals T24, T28.

Further, with this signal processing circuit, detections of displacements in both the positive and negative directions of the Z-axis can be also made. For example, when the weight body 220 is caused to undergo displacement in the positive direction of the Z-axis, stress in a direction to laterally expand is produced in the inside area A1. For this reason, positive charges are produced on all of the upper electrode layers U21 to U24 disposed on the inside area A1. Therefore, four sets of detection voltages V22, V24, V26, V28 all take positive values. In contrast, when the weight body 220 is caused to undergo displacement in the negative direction of the Z-axis, four sets of detection voltages V22, V24, V26, V28 all take negative values. Accordingly, detections of displacements in both the negative and positive directions of the Z-axis can be made by increase or decrease of a sum total of voltages (V22+V24+V26+V28) obtained at the four output terminals T22, T24, T26, T28 (although displacement detection in the Z-axis direction can be made by a sum of two voltages (V22+V26) or (V24+V28), it is preferable to use the sum total of the four voltages as described above.

It is to be noted that since the respective upper electrode layers U21 to U24 all have shape linearly symmetrical with respect to the X-axis or the Y-axis, there is no possibility that any other axis component may interfere with the above-described detection result. For example, in the case where the weight body 220 is caused to undergo displacement in the X-axis direction, stress in a direction to expand or in a direction to contract along the X-axis is exerted in the areas where the upper electrode layers U21, U23 are arranged. This stress can be obtained based on a difference between detection voltages V22 and V26. However, in the case where the weight body 220 is caused to undergo displacement in the Y-axis direction, the areas where the upper electrode layers U21, U23 are arranged partially expand and contract, and charges produced are canceled as a whole, thus giving no effect on the detection voltages V22, V26. In addition, in the case where the weight body 220 is caused to undergo displacement in the Z-axis direction, positive charges are produced in all of the upper electrode layers on the inside area A1. As a result, detection voltages V22, V26 both take the same positive value. Accordingly, when a difference between detection voltages V22 and V26 is taken, they are canceled.

From the above-described description, it is seen that this angular velocity sensor 290 utilizes only four sets of electrode pairs U21 and L20, U22 and L20, U23 and L20, U24 and L20 (L20 is a single common electrode layer) to thereby have the function to allow the weight body 220 to undergo a circular movement along the XY-plane and the function to separately (independently) detect displacements of the weight body 220 in both the positive and negative directions of the X-axis, the Y-axis and the Z-axis.

In view of the above, if these electrode pairs are utilized as double functional elements which have been described in the chapter §11, detection of angular velocity components ωx, ωy, ωz about the respective axes can be made. Namely, the drive signals S1 to S4 shown in FIG. 17 are respectively delivered to the input terminals T21, T23, T25, T27 in the environment where any angular velocity is not exerted, thus allowing the weight body 220 to undergo a circular movement along the XY-plane and voltages V22, V24, V26, V28 outputted from the output terminals T22, T24, T26, T28 are measured. As a matter of course, these voltages generate periodic signals varying at the same period as that of the drive signals S1 to S4. Subsequently, this angular velocity sensor 290 is placed in the environment where an angular velocity is actually applied to. Then the respective drive signals S1 to S4 are delivered to the input terminals T21, T23, T25, T27 to allow the weight body 220 to undergo a circular movement along the XY-plane and voltages outputted from the output terminals T22, T24, T26, T28 at that time are measured. If these voltage values are different from values measured in advance, these differences indicate respective components of Coriolis force based on the applied angular velocity. For example, if a detection voltage difference (V22−V26) indicating displacement in the X-axis direction is increased by Δα as compared to a value measured in advance, it can be recognized that a Coriolis force corresponding to Δα is applied in the positive direction of the X-axis.

Eventually, this angular velocity sensor 290 can independently detect a Coriolis force in the X-axis direction, a Coriolis force in the Y-axis direction and a Coriolis force in the Z-axis direction, respectively, in the state where the weight body 220 is caused to undergo a circular movement along the XY-plane. Accordingly, it becomes possible to detect an angular velocity component ωx about the X-axis, an angular velocity component ωy about the Y-axis and an angular velocity component ωz about the Z-axis on the basis of the previously described principle.

Moreover, if positive voltages of the same value are supplied at the same time as voltages V21, V23, V25, V27, positive charges are delivered to the four upper electrode layers U21 to U24. Since the areas where the respective electrode layers are disposed expand in a lateral direction at the same time, the weight body 220 is permitted to undergo displacement in the positive direction of the Z-axis as shown in FIG. 42. In contrast, if negative voltages of the same value are supplied at the same time, negative charges are delivered to the four upper electrode layers U21 to U24. Since the areas where the respective electrode layers are disposed contract in the lateral direction at the same time, the weight body 220 is permitted to undergo displacement in the negative direction of the Z-axis. Although it is possible to move the weight body 220 in the positive or negative direction of the Z-axis by supplying voltages only to the upper electrode layers U21, U23 or the upper electrode layers U22, U24, it is preferable to carry out charge supply to all of the four electrode layers U21 to U24 as described above in order to carry out efficient stable displacement.

If the above described drive operation in both the positive and negative directions of the Z-axis and the previously described drive operation in both the positive and negative directions of the X-axis are combined together, the weight body 220 is permitted to undergo a circular movement along the XZ-plane.

Further, while it has been described that displacement in the X-axis direction of the weight body 220 is detected based on a difference between detection voltages V22 and V26 and displacement in the Y-axis direction of the weight body 220 is detected based on a difference between detection voltages V24 and V28, the reason why such a difference is taken is that the detection accuracy is caused to be improved and displacement component in the Z-axis direction is not caused to interfere with the detection result. Accordingly, if it is the premise that the angular velocity sensor is used in a detection environment such that Coriolis force in the Z-axis direction is not applied, a voltage value V22 or V26 can be used by itself as a value indicating displacement in the X-axis direction and a voltage value V24 or V28 can be similarly used by itself as a value indicating displacement in the Y-axis direction.

In addition, while, in the above-described embodiment, the upper electrode layers U21 to U24 are individual electrode layers respectively independent and the lower electrode layer L20 is a single common electrode layer from a physical point of view, there may be employed a configuration having a single common upper electrode layer and four respectively independent lower electrode layers. Alternatively, there also may be employed a configuration that both the upper and lower electrode layers are constituted by separate individual electrode layers without using a common electrode layer. However, it is preferable that either the upper electrode layers or the lower electrode layers is replaced by a single common electrode for the purpose of simplifying wiring between electrode layers.

Figure 32:
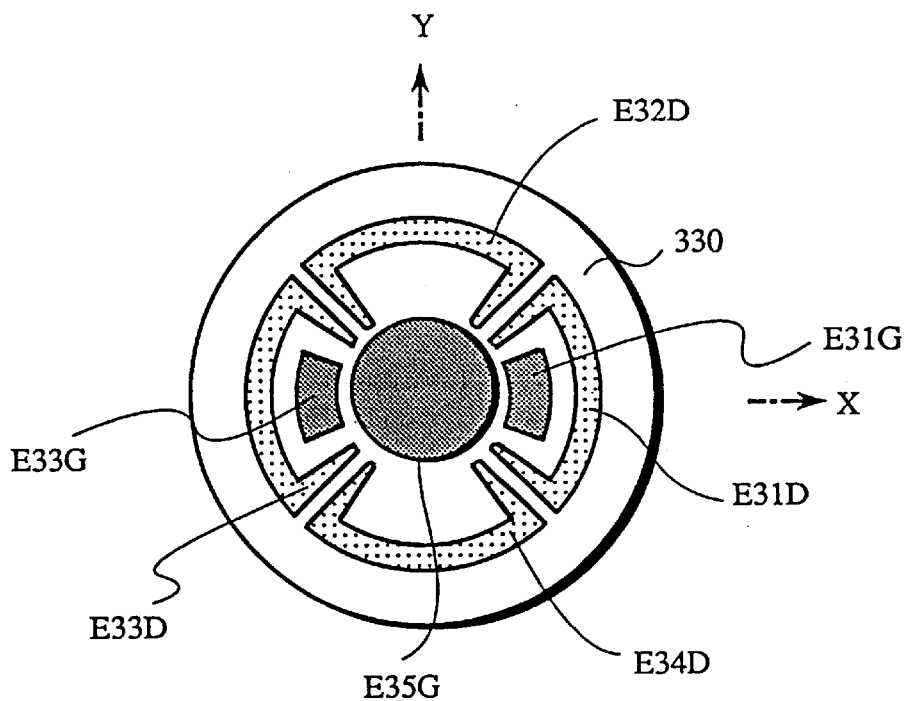
FIG. 32 is a top view of piezoelectric element 330 in a modified example of the angular velocity sensor shown in FIG. 29.

§14 Embodiment of Angular Velocity Sensor Utilizing Double Functional Piezoelectric Element of the Type II In the chapter §10, the configuration and the operation of the angular velocity sensor 300 utilizing a piezoelectric element of the type II as shown in FIG. 29 has been described. It also has been described in the chapter §10 that it is sufficient for detecting all of the angular velocity components ωx, ωy, ωz to provide the electrode layers E31G, E33G, E35G serving a role of force generators and the electrode layers E31D to E34D serving a role of displacement detectors as shown in FIG. 32. When such role sharing is carried out, the signal processing circuit is simplified as a matter of course. However, the number of required electrode layers is disadvantageously increased. For this reason, a structure of the sensor body becomes complicated.

In this chapter, initially, explanation will be given below in connection with an operation method in which the concept of the double functional element described in the chapter §11 is applied to the angular velocity sensor 300 shown in FIGS. 29 to 31 to thereby detect all of the angular velocity components ωx, ωy, ωz about the three axes.

Figure 45:
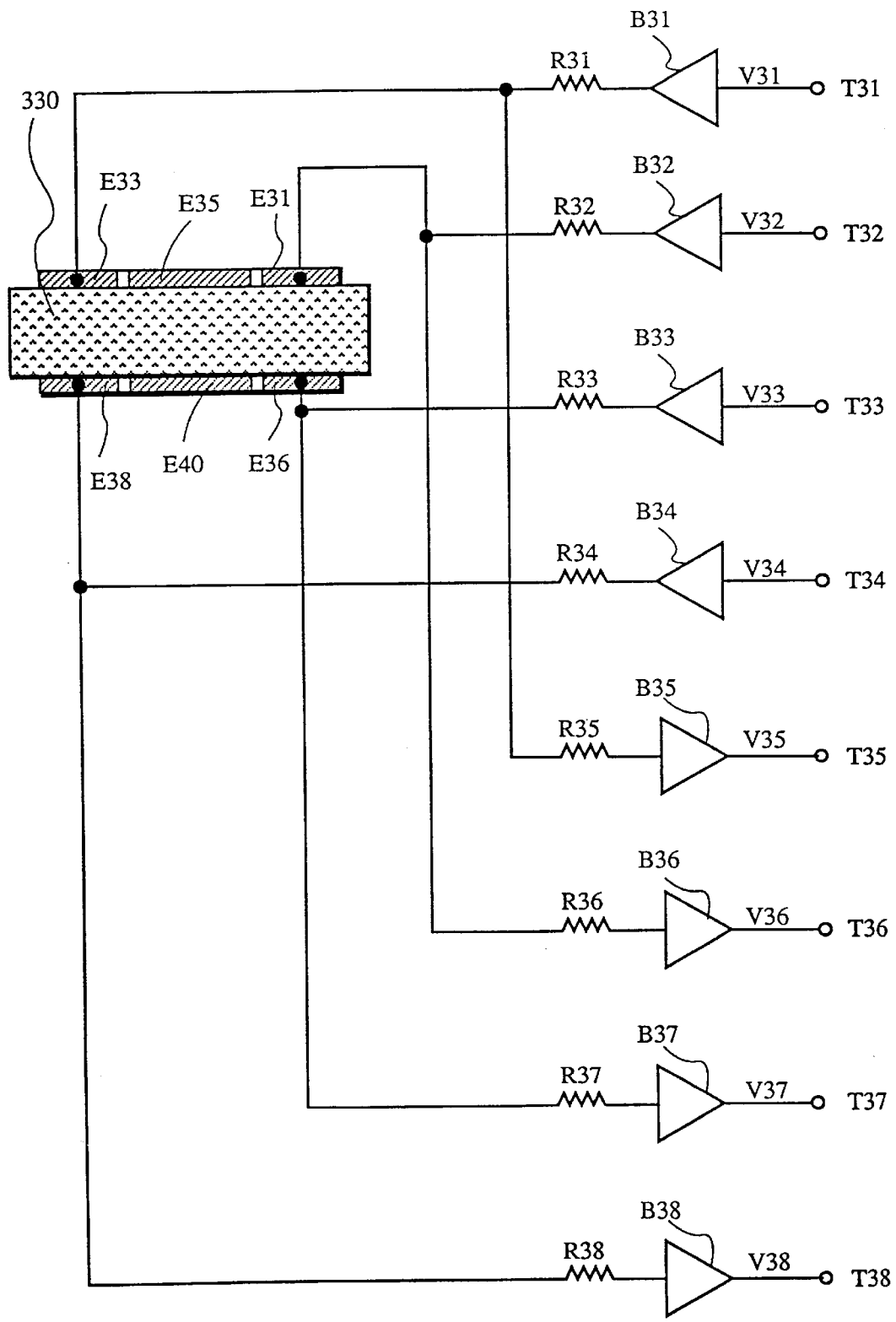
FIG. 45 is a circuit diagram showing an example of a signal processing circuit used for operating the angular velocity sensor shown in FIG. 29.

Let now prepare a signal processing circuit as shown in FIG. 45. In this circuit diagram, a sandwich component indicated at the left upper corner is a component extracted from FIG. 29, which comprises the piezoelectric element 330 and the electrode layers E31 to E40. In the circuit, B31 to B38 denote buffer circuits and R31 to R38 denote resistors. Drive signal input terminals T31, T32, T33, T34 are respectively terminals which input drive voltages V31, V32, V33, V34 to be applied to the electrode layers E33, E31, E36, E38 and detection signal output terminals T35, T36, T37, T38 are terminals for respectively outputting detection voltages V35, V36, V37, V38 which are actually produced at the electrode layers E33, E31, E36, E38.

Assuming now that positive voltages are applied as drive voltages V31, V33 and negative voltages are applied as drive voltages V32, V34, positive charges are delivered to the electrode layers E33, E36, and negative charges are delivered to the electrode layers E31, E38. It can be understood that when the piezoelectric element 330 has the polarization characteristic of the type II shown in FIGS. 24A and 24B, the right side portion of the piezoelectric element 330 shown in FIG. 45 contracts in the longitudinal direction and the left side portion thereof expands in the longitudinal direction. Thus, the weight body 340 (see FIG. 29) which is not illustrated in FIG. 45 is caused to undergo displacement in the positive direction of the X-axis.

When the weight body 340 is caused to undergo displacement in the positive direction of the X-axis as described above in the environment where any angular velocity is not applied, detection voltages V35 to V38 outputted from the output terminals T35 to T38 are measured in advance. Subsequently, this angular velocity sensor 300 is placed in the environment where an angular velocity is actually applied and respective drive voltages of a predetermined polarity are delivered to the input terminals T31 to T34 in order to place the weight body 340 in the state caused to undergo displacement in the positive direction of the X-axis. Then voltages outputted from the output terminals T35 to T38 are measured at this time. If these measured voltage values are different from values measured in advance, these differences correspond respective components of Coriolis force generated by an applied angular velocity.

While the driving operation and the displacement detection relating only to the X-axis direction have been described above, it is possible to similarly prepare a circuit relating to the Y-axis direction or the Z-axis direction in the same manner.

Figure 46:
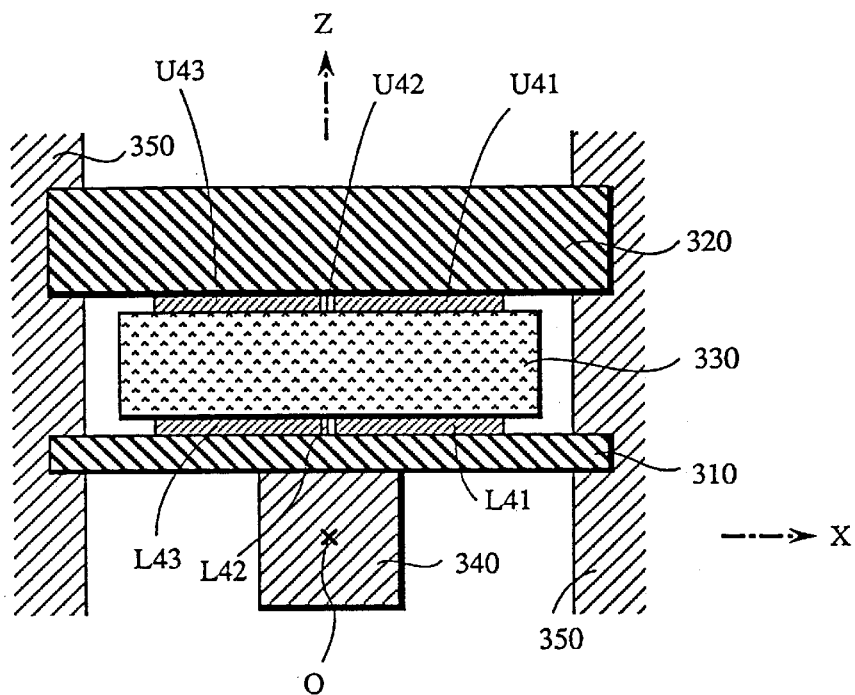
FIG. 46 is a side cross sectional view showing an embodiment in which a double functional element is applied to the angular velocity sensor using a piezoelectric element of the type II shown in FIG. 29 so that the structure is simplified.

§15 Another Embodiment of Angular Velocity Sensor Utilizing Double Functional Piezoelectric Element of the Type II An angular velocity sensor 390 of which side cross section is shown in FIG. 46 is directed to an embodiment in which double functional elements are applied to the angular velocity sensor 300 utilizing piezoelectric elements shown in FIG. 29 to thereby reduce the number of required electrode layers so that the entire structure is simplified. The difference between the sensor 390 shown in FIG. 46 and the sensor 300 shown in FIG. 29 resides in only the configuration of electrode layers arranged on the upper surface and the lower surface of the piezoelectric element 330. Therefore, only the configuration of the electrode layers will be described and explanation of the other components is omitted.

Figure 47:
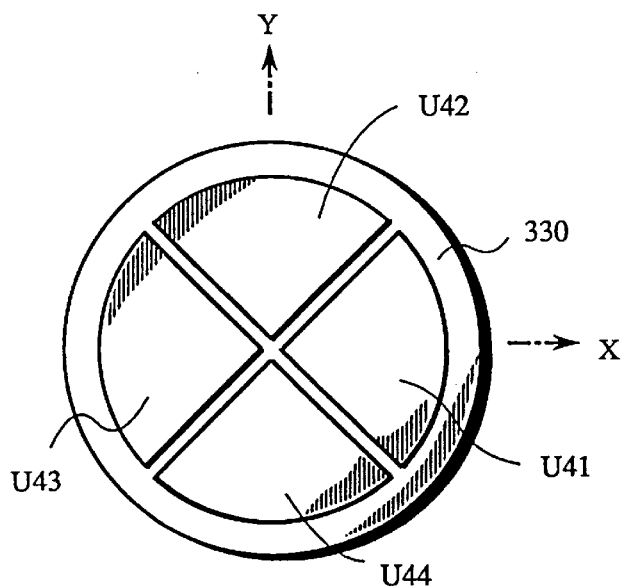
FIG. 47 is a top view of piezoelectric element 330 in the angular velocity sensor shown in FIG. 46, wherein the cross section cut along the X-axis of the piezoelectric element 330 shown in FIG. 47 is shown in FIG. 46.

Four fan-shaped upper electrode layers U41 to U44 are arranged as shown in FIG. 47 on the upper surface of the piezoelectric element 330. The upper electrode layer U41 is disposed on the positive area of the X-axis, the upper electrode layer U42 is disposed on the positive area of the Y-axis, the upper electrode layer U43 is disposed on the negative area of the X-axis and the upper electrode layer U44 is disposed on the negative area of the Y-axis. These upper electrode layers are all symmetrical with respect to the respective coordinate axes. On the other hand, lower electrode layers L41 to L44 which have exactly the same shape as that of the respective electrode layers U41 to U44 are arranged also on the lower surface of the piezoelectric element 330 at positions respectively opposite to the upper electrode layers U41 to U44. Thus, four sets of partial piezoelectric elements are provided between the electrode layers U41 and L41, the electrode layers U42 and L42, the electrode layers U43 and L43 and the electrode layers U44 and L44.

Figure 48:
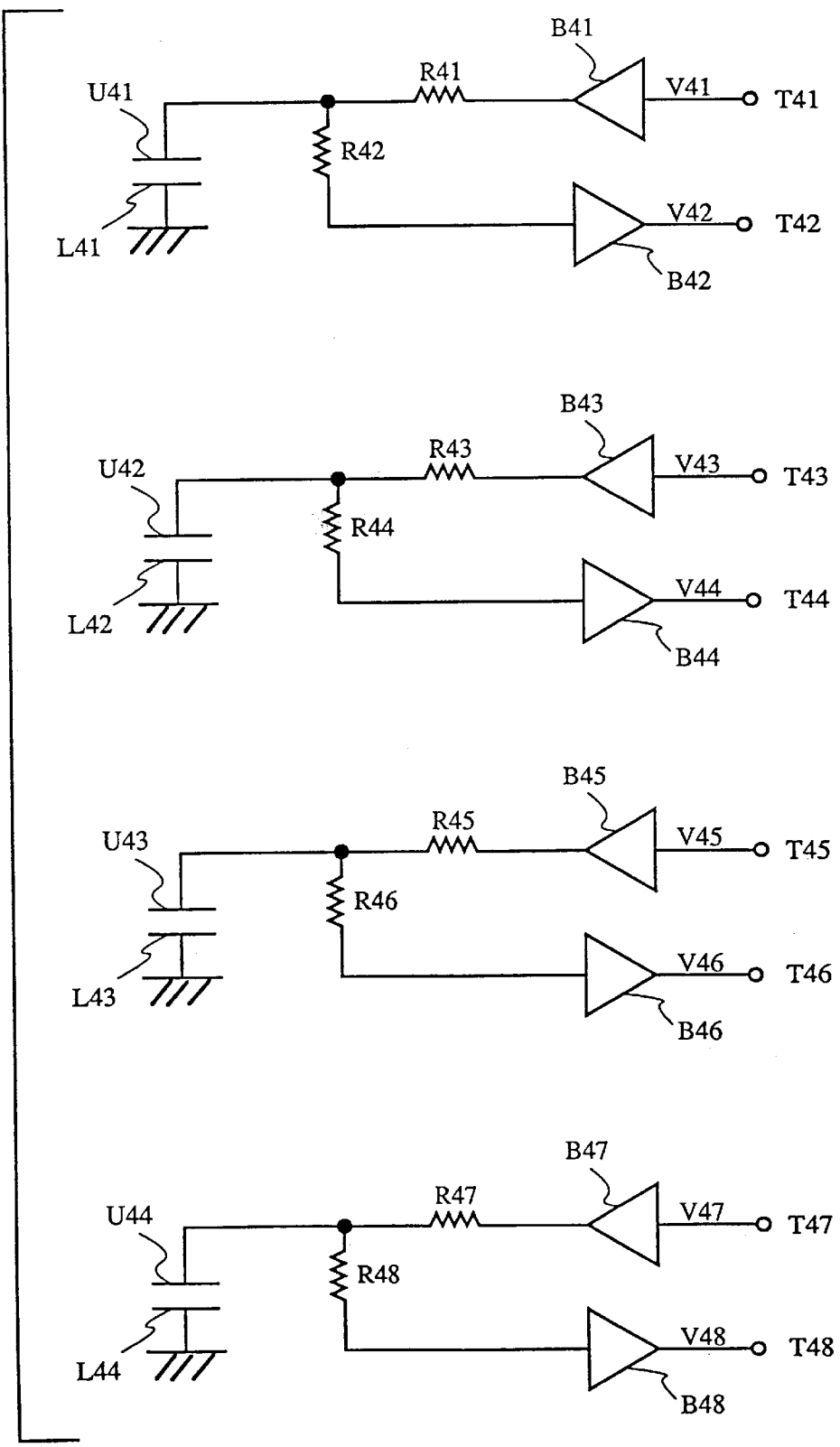
FIG. 48 is a circuit diagram showing an example of a signal processing circuit used for operating the angular velocity sensor shown in FIG. 46.

In order to operate the angular velocity sensor of such a configuration, a signal processing circuit as shown in FIG. 48 is prepared. In this circuit diagram, respective electrode layers U41 to U44, L41 to L44 indicated at the left end are respectively the upper electrode layers U41 to U44 and the lower electrode layers L41 to L44 which have been described above and portions of the piezoelectric element 330 are put between respective electrode layers. In this circuit, B41 to B48 denote buffer circuits and R41 to R48 denote resistors. Drive signal input terminals T41, T43, T45, T47 are terminals for respectively inputting drive voltages V41, V43, V45, V47 to be applied to the upper electrode layers U41, U42, U43, U44 and detection signal output terminals T42, T44, T46, T48 are terminals for respectively outputting actual voltages of the upper electrode layers U41, U42, U43, U44 as detection voltages V42, V44, V46, V48.

In order to allow the weight body 340 to undergo a circular movement along the XY-plane by using this signal processing circuit, it is sufficient to respectively deliver the drive signals S1 to S4 shown in FIG. 17 to the input terminals T41, T43, T45, T47. Stresses with shifted phase in predetermined directions are successively applied to the four sets of partial piezoelectric elements. Thus, the weight body 340 is caused to undergo a circular movement along the XY-plane.

On the other hand, if this signal processing circuit is used, it is possible to detect displacements of the weight body 340 in the respective axes directions. For example, when the weight body 340 is caused to undergo displacement in the positive direction of the X-axis, the portion between the electrode layers U41 and L41 contracts in the longitudinal direction and the portion between the electrode layers U43 and L43 expands in the longitudinal direction. For this reason, negative voltage is outputted as detection voltage V42 and positive voltage is outputted as detection voltage V46. Thus, detection of displacement in the positive direction of the X-axis of the weight body 340 can be made based on a difference between both detection voltages V46 and V42.

In contrast, when the weight body 340 is caused to undergo displacement in the negative direction of the X-axis, detection voltages have a polarity opposite to that of the above-described case. For this reason, sign of the difference between both the detection voltages V46 and V42 is inverted.

Eventually, detections of displacements in both the positive and negative directions of the X-axis can be made based on a difference between the detection voltages V46 and V42 obtained at the output terminals T42, T46. Exactly in the same manner, detections of displacements in both the positive and negative directions of the Y-axis can be made based on a difference between the detection voltages V48 and V44 obtained at the output terminals T44, T48.

Further, in this signal processing circuit, detections of displacements in both the positive and negative directions of the Z-axis can be made. For example, when the weight body 340 is caused to undergo displacement in the positive direction of the Z-axis, stresses in a direction to contract in the longitudinal direction are applied to the piezoelectric element 330 at every portion. For this reason, all the detection voltages V42, V44, V46, V48 become negative. In contrast, when the weight body 340 is caused to undergo displacement in the negative direction of the Z-axis, stresses in a direction to expand in the longitudinal direction are applied to the piezoelectric element 330 at every portion. For this reason, all the detection voltages V42, V44, V46, V48 become positive. Accordingly, detections of displacements in both the positive and negative directions of the Z-axis can be made by increase or decrease of a sum total of the voltages (V42+V44+V46+V48) obtained at the four output terminals T42, T44, T46, T48. Although detection of displacement in the Z-axis direction can be made also by a sum of two voltages (V42+V46) or (V44+V48), it is preferable to use a sum total of the four voltages as described above for carrying out efficient and stable detection It is to be noted that since the respective electrode layers U41 to U44, L41 to L44 all have shape linearly symmetrical with respect to the X-axis or the Y-axis, there is no possibility that any other axis component may interfere with the above-described detection result. For example, in the case where the weight body 340 is caused to undergo displacement in the X-axis direction, the portion between the electrode layers U41 and L41 contracts and the portion between the electrode layers U43 and L43 expands. For this reason, displacement in the X-axis direction can be obtained as a difference between the detection voltages V46 and V42. However, in the case where the weight body 340 is caused to undergo displacement in the Y-axis direction, both the portion between the electrode layers U41 and L41 and the electrode layers U43 and L43 respectively partially contract or expand. Therefore, charges produced are canceled. Thus, no change takes place in the detection voltages V42, V46. In addition, in the case where the weight body 340 is caused to undergo displacement in the Z-axis direction, the portion between the electrode layers U41 and L41 and the portion between the electrode layers U43 and L43 both contract or both contract. Accordingly, when a difference between the detection voltages V46 and V42 is taken, they are canceled.

From the foregoing description, it can be seen that this angular velocity sensor 390 utilizes only four sets of electrode pairs U41 and L41, U42 and L42, U43 and L43 and U44 and L44 to have a function to allow the weight body 340 to undergo a circular movement along the XY-plane and a function to separately detect displacements of the weight body 340 relating both the positive and negative directions of the X-axis, the Y-axis and the Z-axis. In view of the above, if these electrode pairs are utilized as double functional elements which have been described in the chapter §11, angular velocity components ωx, ωy, ωz about the respective axes can be made.

Namely, the drive signals S1 to S4 shown in FIG. 17 are respectively delivered to the input terminals T41, T43, T45, T47 in the environment where any angular velocity is not applied to place the weight body 340 in the state caused to undergo a circular movement along the XY-plane. At this time, voltages V42, V44, V46, V48 outputted from the output terminals T42, T44, T46, T48 are measured in advance. It is a matter of course that these voltage values generate periodical signals varying at the same period as that of the drive signals S1 to S4. Subsequently, this angular velocity sensor 390 is placed in the environment where an angular velocity is actually exerted. Then the drive signals S1 to S4 are delivered to the input terminals T41, T43, T45, T47 to place the weight body 340 in the state caused to undergo a circular movement along the XY-plane and voltages outputted from the output terminals T42, T44, T46, T48 at that time are measured. If these measured voltage values are different from values measured in advance, these differences indicate respective components of the Coriolis force generated by an applied angular velocity. For example, if the detection voltage difference (V46−V42) indicating displacement in the X-axis direction is increased by Δα as compared to a value measured in advance, it can be recognized that a Coriolis force of the magnitude corresponding to Δα is applied in the positive direction of the X-axis.

Eventually, this angular velocity sensor 390 can independently detect a Coriolis force in the X-axis direction, a Coriolis force in the Y-axis direction and a Coriolis force in the Z-axis direction, respectively, in the state where the weight body 340 is caused to undergo a circular movement along the XY-plane. Accordingly, it becomes possible to detect an angular velocity ωx about the X-axis, an angular velocity ωy about the Y-axis and an angular velocity ωz about the Z-axis on the basis of the previously described principle.

Moreover, if positive voltages of the same value are delivered at the same time as voltages V41, V43, V45, V47, it is possible to supply, at the same time, positive charges to the four upper electrode layers U41 to U44. In this case, since the piezoelectric element 330 expands in the longitudinal direction over the entire area, the weight body 340 is permitted to undergo displacement in the negative direction of the Z-axis. In contrast, if negative voltages of the same value are delivered at the same time, it is possible to deliver, at the same time, negative charges to the four upper electrode layers U41 to U44. In this case, since the piezoelectric element 330 contracts in the longitudinal direction over the entire area, the weight body 340 is permitted to undergo displacement in the negative direction of the Z-axis. Although even if charges are supplied only to the upper electrode layers U41 and U43 or to the upper electrode layers U42 and U44, the weight body 340 is permitted to similarly undergo displacement in the Z-axis direction, it is preferable to deliver charges to all of the four electrode layers U41 to U44 in a manner as described above in order for allowing the weight body 340 to undergo efficient and stable displacement. If the above described drive operation in both the positive and negative directions of the Z-axis and the previously described drive operation in both the positive and negative directions of the X-axis are combined together, the weight body 340 is permitted to undergo a circular movement along the XZ-plane.

Further, while it has been described that displacement in the X-axis direction of the weight body 340 is detected based on a difference between the detection voltages V46 and V42 and displacement in the Y-axis direction of the weight body 340 is detected based on a difference between the detection voltages V48 and V44, the reason why such a difference is taken is that the detection accuracy is caused to be improved and displacement component in the Z-axis direction is not caused to interfere with the detection result. Accordingly, if it is the premise that the angular velocity sensor is used in a detection environment such that a Coriolis force in the Z-axis direction is not applied, it is possible to use a voltage value V42 or V46 by itself as a value indicating displacement in the X-axis direction and it is similarly possible to use a voltage value V44 or V48 by itself as a value indicating displacement in the Y-axis direction.

Moreover, while, in the above-described embodiment, the upper electrode layers U41 to U44 and the lower electrode layers L41 to L44 are all separate (individual) electrode layers independent from a physical point of view, either the upper electrodes or the lower electrodes may be replaced by a single common electrode layer from a physical point of view (a disk-shaped common electrode layer as opposed to all of the four fan-shaped electrode layers in the case of this example). For simplification of wiring between electrode layers, it is preferable that such a common electrode layer is provided.

Figure 49:
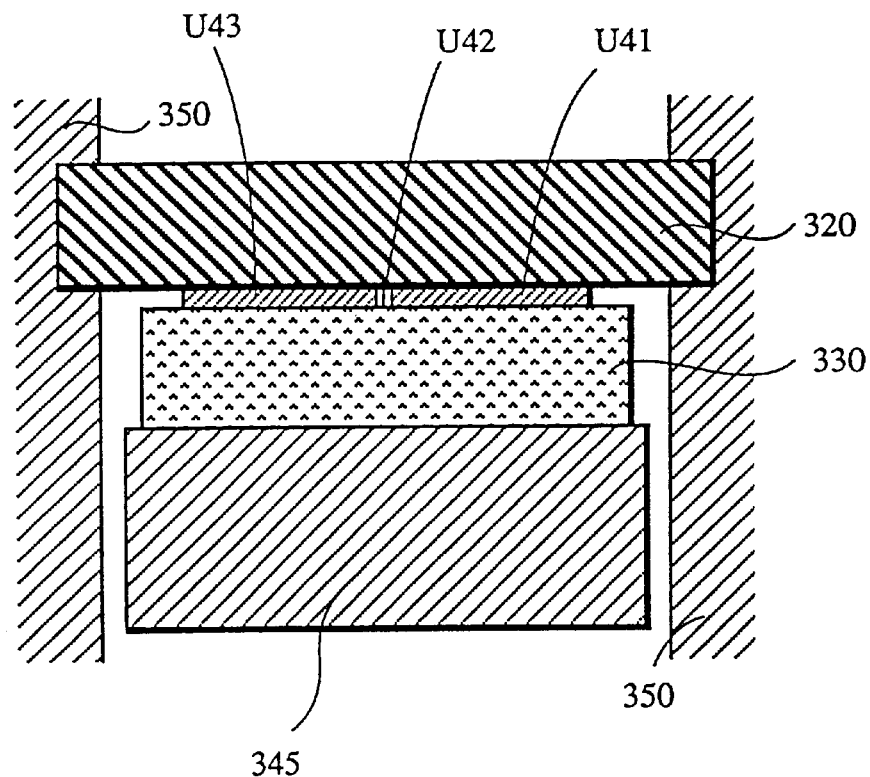
FIG. 49 is a side cross sectional view of a modified example of the angular velocity sensor shown in FIG. 46.

Finally, the side cross sectional view of a simple angular velocity sensor 395 using a piezoelectric element of the type II is shown in FIG. 49. This sensor differs from the angular velocity sensor 390 shown in FIG. 46 in that a conductive weight body 345 is used in place of the flexible substrate 310 and the weight body 340 wherein the lower electrode layers L41 to L44 are omitted. The conductive weight body 345 is a cylindrical block made of metal etc., wherein its outer circumferential portion is caused to be free without being in contact with the sensor casing 350. In other words, the weight body 345 is supported on the sensor casing 350 through the piezoelectric element 330, the upper electrode layers U41 to U44 and the fixed substrate 320 so as to be in hanging state as shown in the figure. Accordingly, the weight body 345 can be moved with a certain degree of freedom within the sensor casing 350.

In the case of the weight body 340 of the angular velocity sensor 390 shown in FIG. 46, since the peripheral portion of the flexible substrate 310 is fixed on the sensor casing 350, the diameter could not be enlarged to much degree. However, in the case of the weight body 345 of the angular velocity sensor 395 shown in FIG. 49, the diameter can be enlarged as far as an enough space is maintained between the weight body 345 and the sensor casing 350 so that the weight body 345 is not in contact with the sensor casing 350 when displacement is caused. By enlarging the weight body, it is possible to improve sensitivity of the sensor because a great mass of the weight body makes a great displacement thereof. Therefore, the structure of the angular velocity sensor 395 has an advantage from a viewpoint of improvement in sensitivity.

Moreover, since the weight body 345 itself is comprised of conductive material, it functions as a common electrode layer. Therefore, the lower electrode layers L41 to L44 become unnecessary. Thus, the entire configuration is very simplified. As stated above, since the angular velocity sensor 395 shown in FIG. 49 is slightly different in structure from the angular velocity sensor 390 shown in FIG. 46, but its operation is exactly the same.

In conclusion, in the angular velocity sensor according to this invention, a Coriolis force exerted to a weight body is detected under the condition that the weight body is caused to undergo an orbital movement within a sensor casing and an angular velocity is obtained by operation (calculation) based on the detected Coriolis force. Therefore it becomes possible to detect angular velocity components with respect to plural different axes with high response.

What is claimed is:

1. An angular velocity sensor comprising:
   a weight body having a first surface;
   a sensor casing for accommodating the weight body therewithin and having a second surface opposite said first surface;
   connecting means for connecting the weight body to the sensor casing, said connecting means can be deformed so that the weight body is moved with a predetermined degree of freedom with respect to the sensor casing;
   driving means for allowing the weight body to carry out an orbital movement along a predetermined orbit within a range of said predetermined degree of freedom by making physical deformation in said connecting means;
   detecting means for detecting a Coriolis force applied to the weight body in a direction along a first axis perpendicular to a tangential direction of the orbital movement; and operation means for obtaining an angular velocity about a second axis perpendicular to both the tangential direction and the first axis on the basis of a tangential velocity of the weight body along said orbit and the detected Coriolis force;

wherein at least one of said driving means and said detecting means comprises at least one capacitance element comprising a pair of electrodes of a first electrode formed on said first surface of the weight body and a second electrode formed on said second surface of the sensor casing.

2. An angular velocity sensor according to claim 1:

wherein the weight body carries out a circular movement within a predetermined plane;

wherein the first axis is located in a direction perpendicular to said plane and the second axis is located in a radial direction of said circular movement;

wherein a component in a direction along said first axis of a force applied to the weight body is detected as a Coriolis force; and wherein an angular velocity about the second axis is obtained on the basis of a tangential velocity of the weight body and said Coriolis force.

3. An angular velocity sensor according to claim 1:

wherein the weight body carries out a circular movement within a predetermined plane;

wherein the first axis is located in a radial direction of said circular movement and the second axis is located in a direction perpendicular to said plane;

wherein a Coriolis force is detected by eliminating a centrifugal force component based on the circular movement from a component along the first axis of a force applied to the weight body; and wherein an angular velocity about the second axis is obtained on the basis of a tangential velocity of the weight body and said Coriolis force.

4. An angular velocity sensor according to claim 1:

wherein the weight body carries out a circular movement within an XY-plane of an XYZ three-dimensional coordinate system having an X-axis, a Y-axis and a Z-axis; and wherein a Coriolis force is detected when the weight body passes through the X-axis and the Y-axis respectively thus to obtain angular velocity components at least about two axes in the XYZ three-dimensional system.

5. An angular velocity sensor according to claim 4:

wherein a component in the Z-axis direction of a force applied to the weight body is detected as a Coriolis force when the weight body passes through the X-axis with a predetermined instantaneous velocity along the Y-axis direction and an angular velocity component about the X-axis is obtained on the basis of the instantaneous velocity and the detected Coriolis force;

wherein a component in the Z-axis direction of a force applied to the weight body is detected as a Coriolis force when the weight body passes through the Y-axis with a predetermined instantaneous velocity along the X-axis direction and an angular velocity component about the Y-axis is obtained on the basis of the instantaneous velocity and the detected Coriolis force; and wherein a component in the X-axis direction of a force applied to the weight body is detected when the weight body passes through the X-axis with a predetermined instantaneous velocity along the Y-axis direction, a Coriolis force is detected by eliminating a centrifugal force component based on the circular movement from the detected component of force and an angular velocity component about the Z-axis is obtained on the basis of the instantaneous velocity and the detected Coriolis force;

thus to obtain angular velocity components about three axes of the X-axis, the Y-axis and the Z-axis.

6. An angular velocity sensor according to claim 1, wherein four electrically independent first said electrodes are formed on the first surface of the weight body and thereby four said capacitance elements are provided.

7. An annular velocity sensor according to claim 1, wherein four electrically independent second said electrodes are formed on the second surface of the sensor casing and thereby four said capacitance elements are provided.

* * * * *